(12) United States Patent
Sugiyama

(10) Patent No.: US 11,534,910 B2
(45) Date of Patent: Dec. 27, 2022

(54) CONTROL DEVICE FOR DISPLAYING A RELATIONSHIP BETWEEN ROBOT OUTPUT AND DEVICE INPUT

(71) Applicant: Seiko Epson Corporation, Tokyo (JP)

(72) Inventor: Atsushi Sugiyama, Taito (JP)

(73) Assignee: SEIKO EPSON CORPORATION

( * ) Notice: Subject to any disclaimer, the term of this patent is extended or adjusted under 35 U.S.C. 154(b) by 865 days.

(21) Appl. No.: 16/369,349

(22) Filed: Mar. 29, 2019

(65) Prior Publication Data
US 2019/0299401 A1    Oct. 3, 2019

(30) Foreign Application Priority Data
Mar. 30, 2018    (JP) .............................. JP2018-066731

(51) Int. Cl.
| | | |
|---|---|---|
| *G06F 3/048* | (2013.01) | |
| *B25J 9/16* | (2006.01) | |
| *G06F 3/04847* | (2022.01) | |
| *G06F 3/0482* | (2013.01) | |

(52) U.S. Cl.
CPC .............. *B25J 9/161* (2013.01); *B25J 9/1664* (2013.01); *G06F 3/0482* (2013.01); *G06F 3/04847* (2013.01); *G06F 2203/04803* (2013.01)

(58) Field of Classification Search
CPC ....... B25J 9/161; B25J 9/1664; G06F 3/0482; G06F 3/04847; G06F 2203/04803
See application file for complete search history.

(56) References Cited

U.S. PATENT DOCUMENTS

| | | | | |
|---|---|---|---|---|
| 5,555,179 A | * | 9/1996 | Koyama | .......... G05B 19/41835 |
| | | | | 700/95 |
| 2002/0022895 A1 | * | 2/2002 | Genise | ............... G05B 19/0426 |
| | | | | 700/15 |
| 2008/0034299 A1 | * | 2/2008 | Hayles | .................. G06F 3/0484 |
| | | | | 715/763 |

(Continued)

FOREIGN PATENT DOCUMENTS

| | | |
|---|---|---|
| JP | H07-072920 A | 3/1995 |
| JP | H09-044219 A | 2/1997 |
| JP | 5429461 B2 | 2/2014 |

*Primary Examiner* — Hua Lu
(74) *Attorney, Agent, or Firm* — Harness, Dickey & Pierce, P.L.C.

(57) ABSTRACT

A control device includes a processor. The processor displays a first image of a robot, first input/output images representing a robot input/output, a second image of a peripheral device, second input/output images representing a device input/output, and an input/output edit screen accepting an input/output relationship between the robot output and a peripheral device input on a display. Each of the robot output and the peripheral device input causes the robot and the peripheral device to perform a synchronous operation or an asynchronous operation that is synchronously or asynchronously performed between the robot and the peripheral device, respectively. When one of the first input/output images corresponds to the synchronous operation, one of the second input/output images corresponds to only the synchronous operation. When another of the first input/output images corresponds to the asynchronous operation, another of the second input/output images corresponds to only the asynchronous operation.

19 Claims, 33 Drawing Sheets

(56) References Cited

U.S. PATENT DOCUMENTS

| | | | |
|---|---|---|---|
| 2013/0145312 A1* | 6/2013 | Dove | G06F 3/0488 |
| | | | 715/800 |
| 2014/0172167 A1* | 6/2014 | Matsukuma | B25J 9/1697 |
| | | | 700/259 |
| 2016/0059413 A1* | 3/2016 | Ogata | B25J 9/1676 |
| | | | 901/41 |
| 2016/0089784 A1* | 3/2016 | Koike | B25J 9/163 |
| | | | 700/250 |
| 2017/0113350 A1* | 4/2017 | Kim | B25J 9/161 |
| 2017/0139556 A1* | 5/2017 | Josephson | H04L 12/2803 |
| 2019/0091860 A1* | 3/2019 | Lipay | B65G 1/137 |

* cited by examiner

FIG. 10

| SERIAL NUMBER | SYNCHRONOUS /ASYNCHRONOUS | INPUT JOB | INPUT NAME | OUTPUT NAME | VARIABLE ON TRANSMISSION SIDE | VARIABLE ON RECEPTION SIDE |
|---|---|---|---|---|---|---|
| 1 | SYNCHRONOUS | ROBOT | WAIT FOR WORKPIECE DISCHARGE | WORKPIECE DISCHARGE | L1_S | L1_R |
| 2 | SYNCHRONOUS | DEVICE | WAIT FOR WORKPIECE REMOVAL | WORKPIECE REMOVAL COMPLETED | L2_S | L2_R |
| 3 | ASYNCHRONOUS | WARNING LAMP | ERROR NOTIFICATION | WORKPIECE GRIPPING ERROR | — | L3_R |
| 4 | | | | DEVICE ERROR | | |

FIG. 11

| JOB 1: ROBOT | JOB 2: DEVICE | JOB 3: WARNING LAMP |
|---|---|---|
| Func Job1 | Func Job2 | Func Job3 |
| ...<br>L1_R = 1 — Oj11<br>Wait L1_S = 1 — Oj12<br>L1_S = 0 — Oj13<br>L1_R = 0 — Oj14<br>... — Oj15 | ...<br>Wait L1_R = 1 — Oj21<br>L1_S = 1 — Oj22<br>... — Oj23 | ... |

CONTROL DEVICE FOR DISPLAYING A RELATIONSHIP BETWEEN ROBOT OUTPUT AND DEVICE INPUT

BACKGROUND

1. Technical Field

The present invention relates to a technology for programming a robot.

2. Related Art

In the related art, there is a user interface for programming a robot. For example, in Japanese Patent No. 5429461, it is possible to create a main sequence based on icons displayed on a main sequence screen and connection lines that connect the icons to each other. In addition, it is possible to create a subsequence based on icons displayed on a subsequence screen and connection lines that connect the icons to each other.

However, in the technology of Japanese Patent No. 5429461, it is difficult to create a sequence including a robot peripheral device and a robot as control targets.

SUMMARY

An advantage of some aspects of the invention is to solve at least a part of the problems described above, and the invention can be implemented as the following aspects or application examples.

A control device for controlling a robot is provided. The control device includes: a first image that represents one robot; one or more first input/output images that respectively represent a robot input/output which is an input/output of the robot; a second image that represents one peripheral device; one or more second input/output images that respectively represent a device input/output which is an input/output of the peripheral device; a display control unit that is capable of displaying an input/output edit screen that is capable of accepting an input/output relationship in which an output of the robot is an input of the peripheral device by associating a first input/output image selected among the one or more first input/output images with a second input/output image selected among the one or more second input/output images, on a display; and an operation control unit that controls the robot based on the input/output relationship.

BRIEF DESCRIPTION OF THE DRAWINGS

The invention will be described with reference to the accompanying drawings, wherein like numbers reference like elements.

FIG. 10 is a table illustrating variables set for realizing synchronous processing and asynchronous processing set on the input/output edit screen.

FIG. 11 is a diagram illustrating a program list for realizing an input/output relationship (refer to FIG. 10 and So11 and Si21 in FIG. 4) of "Synchronous" with a serial number 1.

DESCRIPTION OF EXEMPLARY EMBODIMENTS

A. First Embodiment

A1. Configuration of Robot System

Figure 1:
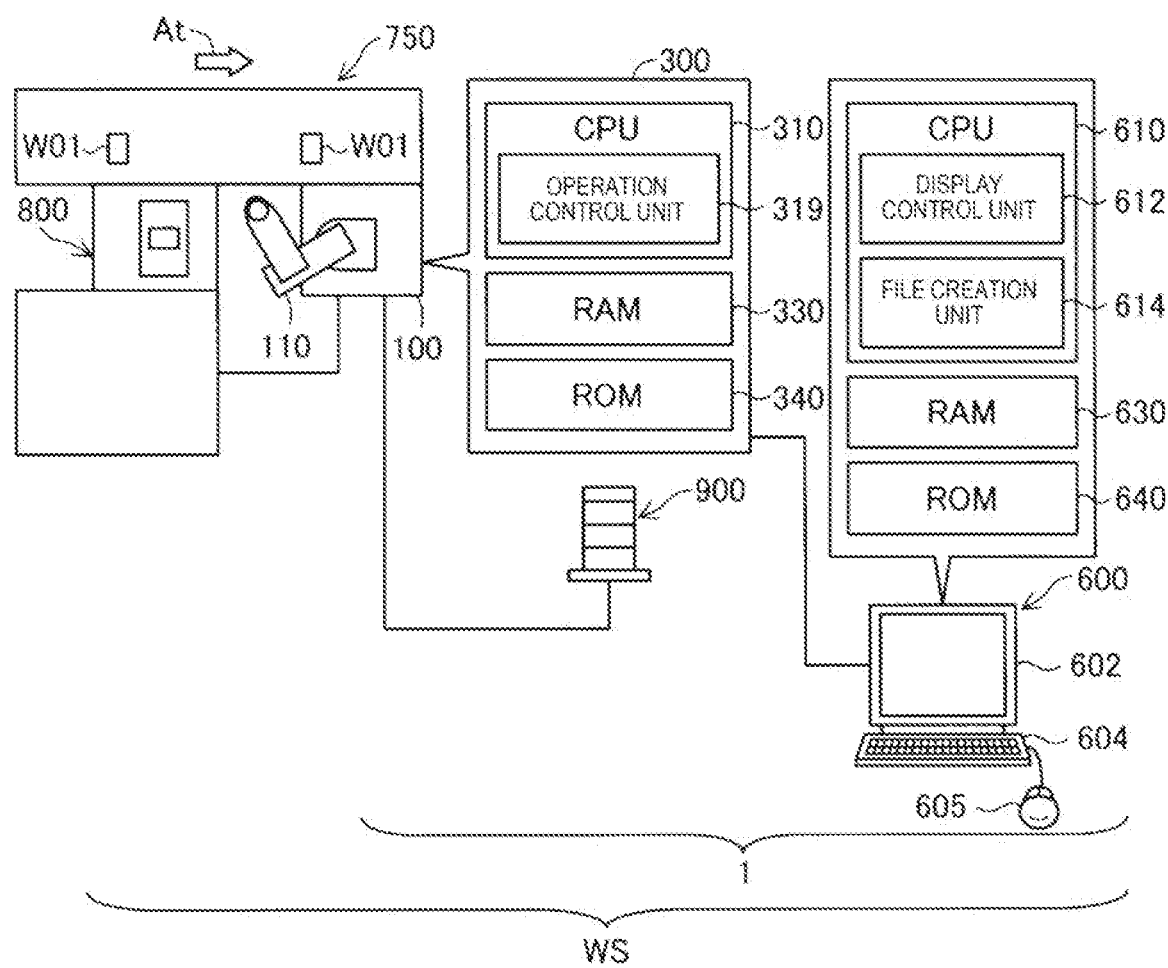
FIG. 1 is an explanatory diagram illustrating a configuration of a workstation including a robot.

FIG. 1 is an explanatory diagram illustrating a configuration of a workstation WS including a robot 100. In the workstation WS, one work is performed by a plurality of configuration elements included in the workstation WS. The workstation WS includes the robot 100, a setting device 600, a processing device 800, a transport device 750, and a warning lamp 900, as configuration elements.

The robot 100 is a 4-shaft robot having a robot control device 300 and an arm 110.

The arm 110 has four joints. Three of the four joints are twisted joints. One of the four joints is a linear motion joint. The robot 100 makes each of the four joints rotate or go straight with a servo motor, and accordingly, it is possible to dispose an end effector attached to a distal end portion of the arm 110 in a posture of being designated in a position designated in a three-dimensional space. In addition, a point representing the position of the end effector in the three-dimensional space is also referred to as "control point" or tool center point (TCP).

The robot control device 300 is a control device that controls the arm 110 and the end effector. The robot control device 300 is accommodated in a housing of the robot 100. The robot control device 300 includes a computer including a CPU 310 which is a processor, a RAM 330, and a ROM 340. The CPU 310 realizes various functions which will be described later by loading a computer program stored in the ROM 340 into the RAM 330 and executing the computer program. FIG. 1 illustrates a functional unit of the CPU 310 of the robot control device 300 that controls the robot 100 as an "operation control unit 319".

The setting device 600 generates an operation sequence that defines an operation of the robot 100. The setting device 600 is a computer including a display 602 that functions as an output device, and a keyboard 604 and a mouse 605 that function as input devices. The setting device 600 further includes a CPU 610 as a processor, a RAM 630, and a ROM 640. The CPU 610 realizes various functions which will be described later by loading a computer program stored in the ROM 640 into the RAM 630 and executing the computer program.

The setting device 600 is connected to the robot control device 300. The operation sequence generated by the setting device 600 is transmitted to the robot control device 300. The robot control device 300 operates the robot 100 according to the operation sequence received from the setting device 600.

In addition, the setting device 600 may be connected to the robot control device 300 via a teaching pendant. The teaching pendant can generate the operation sequence that defines the operation of the robot 100 alone, that is, without cooperating with the setting device 600.

The robot 100 including the robot control device 300 and the setting device 600 are collectively referred to as a robot system 1.

The processing device 800 is a device that performs predetermined processing with respect to a workpiece W01. The processing device 800 operates together with the robot 100. In addition, in the specification, "A operates together with B" means that A operates in cooperation with B. Further, "A operates together with B" does not require A and B to move at the same time as an essential requirement. The processing device 800 and the warning lamp 900 are collectively referred to as "peripheral device" of the robot. The "peripheral device" of the robot is a device that performs work in cooperation with the robot. The "peripheral device" of a robot X may be a robot Y different from the robot X.

The processing device 800 is supplied with the workpiece W01 from the robot 100 and performs predetermined processing with respect to the received workpiece W01. In addition, the processed workpiece W01 is discharged from the processing device 800 and carried from the processing device 800 to the transport device 750 by the robot 100.

The transport device 750 is a belt conveyor including a roller and a belt. The transport device 750 moves the belt in a direction indicated by an arrow At in FIG. 1 by driving the roller. The transport device 750 loads the workpiece W01 on the belt and transports the workpiece W01 in the direction indicated by the arrow At.

The warning lamp 900 receives a signal from the robot 100 and the processing device 800 and is turned on. The processing device 800 and the warning lamp 900 are connected to the robot control device 300 (refer to FIG. 1) of the robot 100, and are controlled by the robot control device 300. In addition, in the embodiment, the transport device 750 is controlled by a control device other than the robot control device 300.

A2. Creation of Operation Sequence

Figure 2:
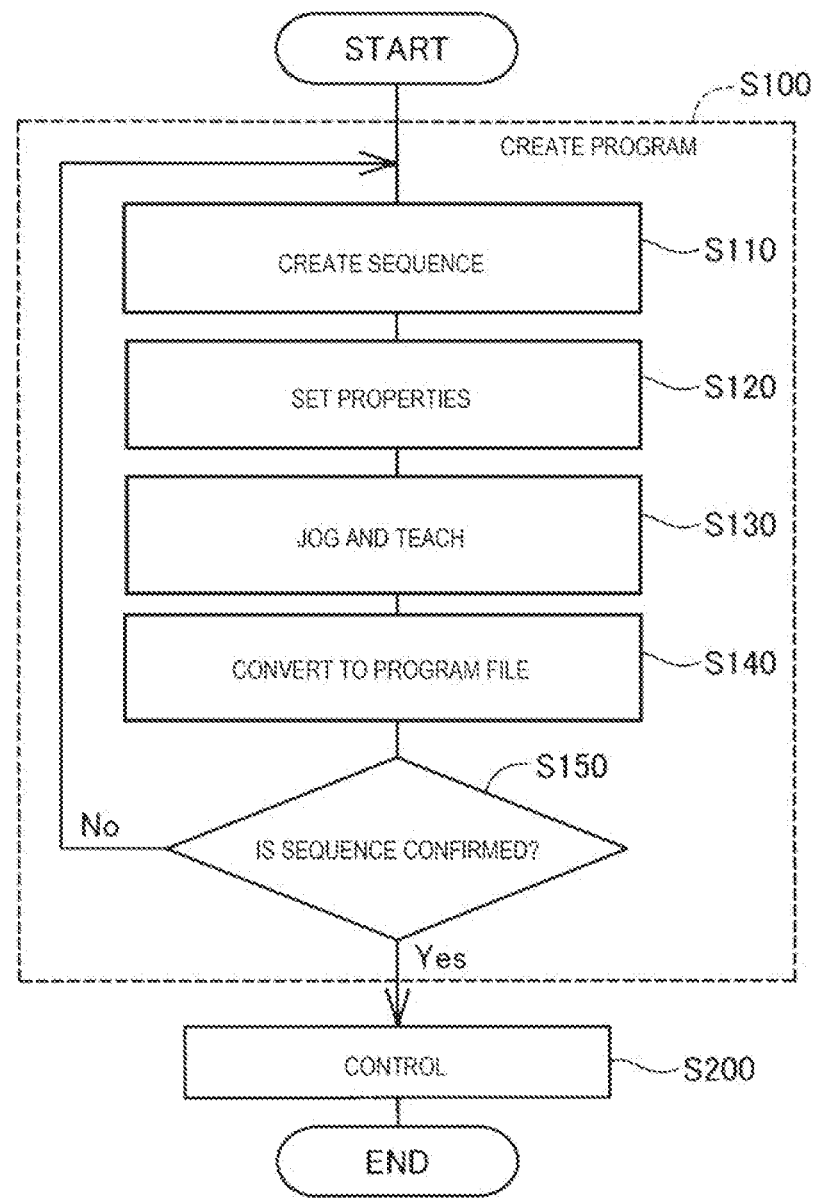
FIG. 2 is a flowchart illustrating a flow of processing related to the workstation.

FIG. 2 is a flowchart illustrating a flow of processing related to the workstation WS. When operating the workstation WS, first, in step S100, a program for operating the workstation WS is created. Step S100 includes steps S110 to S130. The creation of the program is performed by a user via the setting device 600 (refer to FIG. 1).

In step S110, the operation sequence of the robot 100, the processing device 800, and the warning lamp 900 is created. More specifically, the user edits images or characters via an input/output edit screen De0 and a sequence edit screen De1 to be displayed on the display 602 of the setting device 600, and creates the operation sequence of each configuration element. The input/output edit screen De0 and the sequence edit screen De1 will be described later.

In addition, in a stage where the processing of step SI10 is first performed, values of parameters for quantitatively defining the position of the control point in each operation included in the sequence has not yet been determined. The parameters of operation other than parameters for quantitatively defining the position can be defined in step S110. Specific parameters for quantitatively defining each operation are collectively referred to as "properties", not being limited to the parameter of the position.

In step S120, among the properties of each operation of the operation sequence created in step S110, parameters other than the parameters for quantitatively defining the position of the control point are set. More specifically, the user performs processing, such as inputting characters or numbers to a user interface displayed on the display 602 of the setting device 600, selecting one from options, and the like, and sets properties of each operation. In addition, as will be described later, the processing of steps SI10 to S140 can be repeatedly performed. Therefore, before the creation of the operation sequence in step S110 is completed, the processing of step S120 can be performed for each individual operation.

In step S130, among the parameters of each operation of the operation sequence created in step S110, the value of the parameter for determining the control point of the robot 100 is determined. More specifically, the arm 110 and the end effector of the robot 100 are controlled by the user via the setting device 600 and are moved to a desired position, and as the position is stored as a teaching point, the value of the parameter for determining the control point of the robot 100 is determined. The processing is also referred to as "Jog and Teach".

In step S140, by pressing a predetermined button included in the user interface to be displayed on the display 602 of the setting device 600, the operation sequence including the set parameters is converted into a program file. The generated program file is stored in the RAM 630 of the setting device 600 and is also transmitted to the robot control device 300. FIG. 1 illustrates a functional unit of the CPU 610 of the setting device 600 for creating the program file in step S140 as "file creation unit 614".

In step S150, the user determines whether or not the operation sequence created in steps S110 to S130 may be confirmed. In a case of confirming the created operation sequence, the processing proceeds to step S200. In a case of further editing the created operation sequence, the processing returns to step S110.

In step S200, the robot control device 300 operates the workstation WS (refer to FIG. 1) in accordance with the program created in step S100. In other words, in step S110, based on an input/output relationship edited via the input/output edit screen De0 which will be described later and the operation sequence edited via the sequence edit screen De1, the robot control device 300 controls the robot 100, the processing device 800, and the warning lamp 900.

Figure 3:
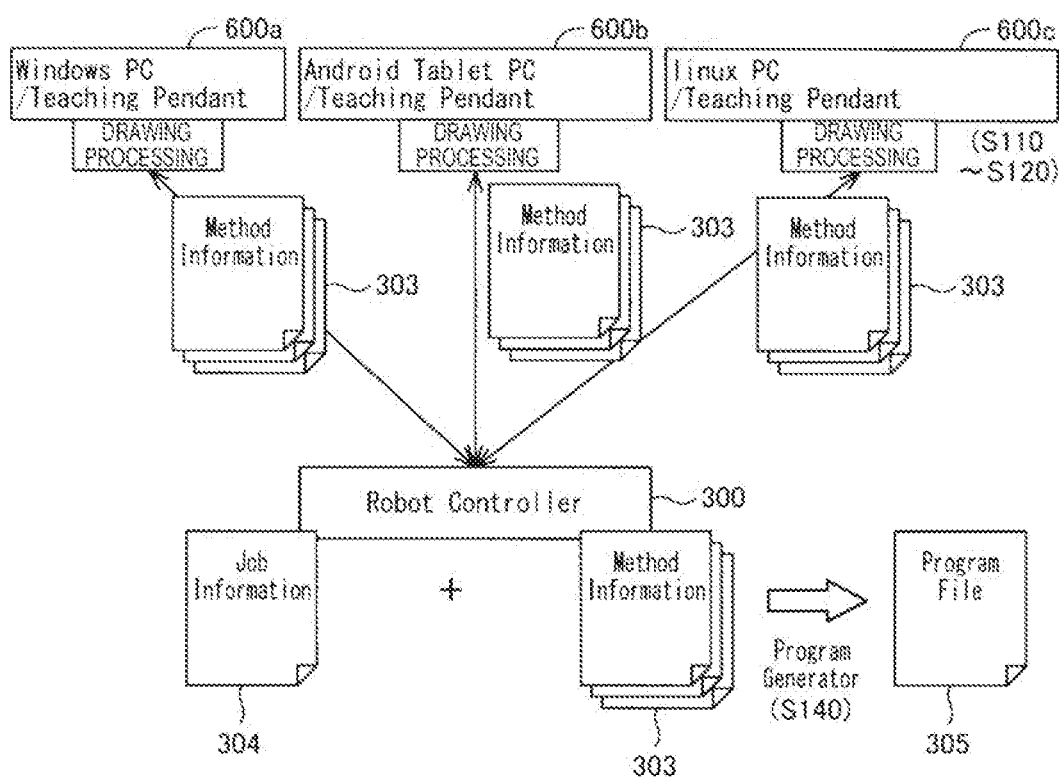
FIG. 3 is a block diagram illustrating processing of a setting device and a robot control device in step S100 of FIG. 2.

FIG. 3 is a block diagram illustrating processing of the setting device 600 and the robot control device 300 in step S100 of FIG. 2. In FIG. 3, as an example of the setting device 600, three setting devices 600 having different OS for controlling the setting device 600 that serves as a computer are illustrated. In other words, as an example of the setting device 600, a computer 600a controlled by Windows (registered trademark), a computer 600b controlled by Android (registered trademark), and a computer 600c controlled by Linux (registered trademark) are illustrated. Each of the computers 600a to 600c may be connected to the robot control device 300 via the teaching pendant.

The robot control device 300 stores method information 303 in the RAM 330 (refer to FIG. 1). The method information 303 is information on each operation that can be included in the operation sequence. For example, the setting device 600 refers to the method information 303 and displays an image that corresponds to the operation. The method information 303 is stored in the RAM 330 of the robot control device 300 as data in a format independent from an operating system (OS). As the method information 303 is newly stored in the RAM 330, an operation that can be executed by the workstation WS is added.

In steps S110 to S130 of FIG. 2, when the operation sequence of each configuration element (specifically, the robot 100, the processing device 800, and the warning lamp 900) of the workstation WS is edited, the setting device 600 creates job information 304. The job information 304 is information in which the operation sequence of one configuration element included in the workstation WS is defined. The job information 304 includes information on the operations that configure the operation sequence and the arrangement order of the operations, and the information on the properties (parameters) of each operation. The job information 304 is created for each configuration element which is a control target included in the workstation WS.

The method information 303 includes information in which an operation is correlated with an expression in a programming language representing the operation. In step S140 of FIG. 3, the setting device 600 converts the operation sequence into a program file 305 with reference to the job information 304 of each configuration element of the workstation WS and the method information 303 of each operation.

A3. First User Interface for Creating Operation Sequence

(1) Configuration of Input/Output Edit Screen

In the embodiment, in the setting device 600, two types of user interfaces are prepared as the user interface (refer to S110 in FIG. 2) for creating the operation sequence. A first user interface is a user interface that can designate the input/output relationship in which an output of any one of the configuration elements of the workstation WS, such as the robot and the processing device, is considered as an input of any other one. A second user interface is a user interface in which the operation sequence of the configuration element can be edited with respect to one of the configuration elements of the workstation WS by arranging the operations on the screen. Here, the designation of the input/output relationship by the first user interface will be described.

Figure 4:
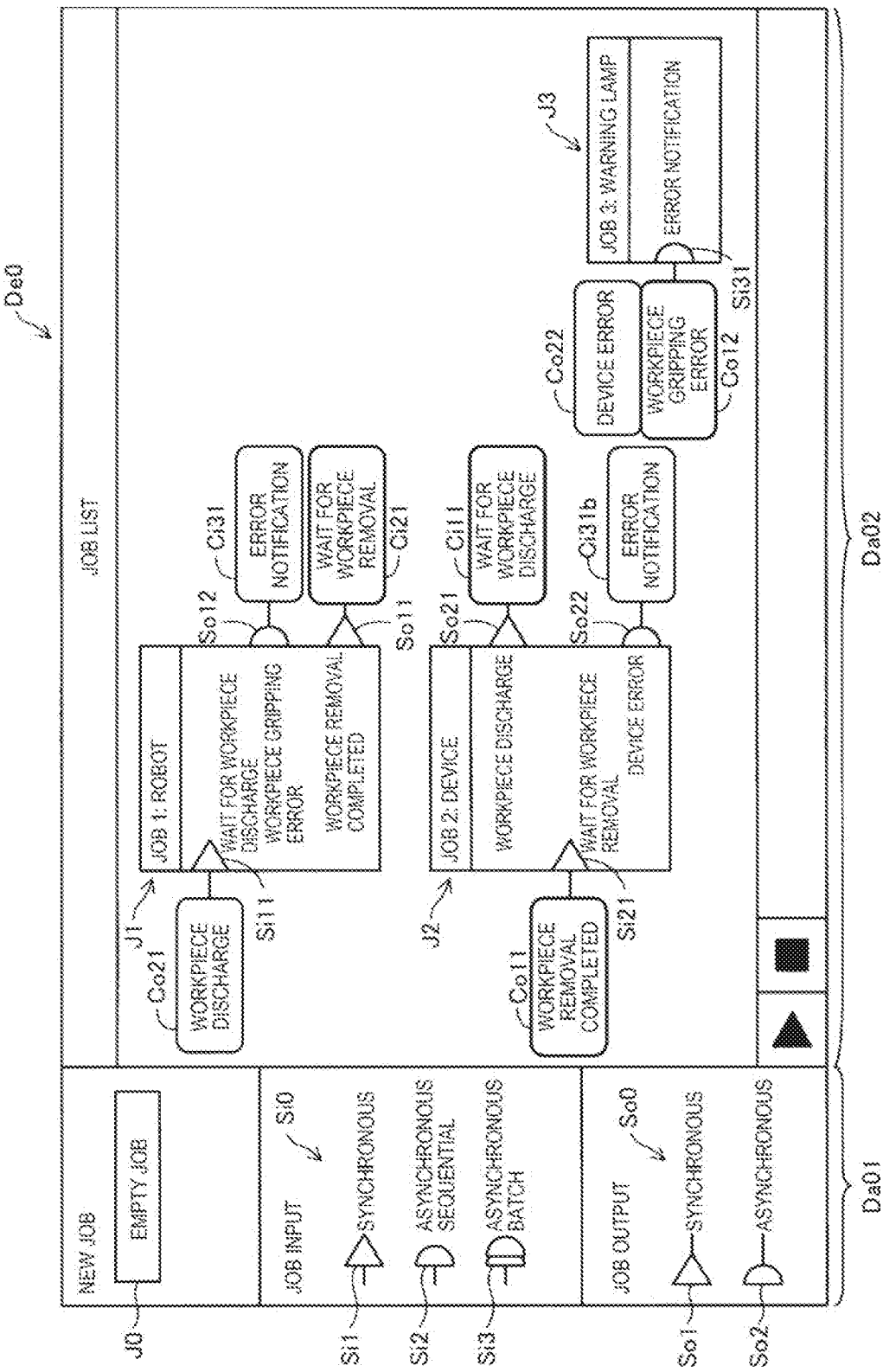
FIG. 4 is a diagram illustrating an input/output edit screen to be displayed on a display of the setting device in step S110 of FIG. 2.

FIG. 4 is a diagram illustrating the input/output edit screen De0 to be displayed on the display 602 of the setting device 600 in step S110 of FIG. 2. The input/output edit screen De0 is a screen to be displayed on the display 602 in a case where an "Application Edit" tab is selected among the tabs displayed on the display 602 in step S110 of FIG. 2. In addition, in order to make it easy to understand the technology, illustration of the tab is omitted in FIG. 4.

The input/output edit screen De0 includes a first display part Da01 and a second display part Da02. The first display part Da01 and the second display part Da02 are displayed in parallel in this order from the left to the right on the display 602 of the setting device 600.

The first display part Da01 is a user interface that presents a target set and edited at the second display part Da02. The first display part Da01 includes an image J0 of "Empty Job", an image Si0 of a plurality of types of "JobIn", and an image So0 of a plurality of types of "JobOut". The image Si0 of "JobIn" includes an image Si1 of "Synchronous", an image Si2 of "Asynchronous Sequential", and an image Si3 of "Asynchronous Batch". The image So0 of "JobOut" includes an image So1 of "Synchronous" and an image So2 of "Asynchronous".

The second display part Da02 is a user interface in which an input/output relationship in which an output of any one of the robot 100, the processing device 800, and the warning lamp 900 is considered as an input of any other one can be designated. At the second display part Da02, as the input/output relationship of the configuration element of the workstation WS is defined, at least a part of the contents of "Application" for defining the operation sequence at the workstation WS is determined.

In a state of FIG. 4, the second display part Da02 includes a job image J1 of "Job 1 Robot", a job image J2 of "Job 2 Device", and a job image J3 of "Job 3 Warning Lamp". The job image J1 of "Job 1 Robot" represents one robot 100. The job image J2 of the "Job 2 Device" represents the processing device 800 that operates together with the robot 100. The job image J3 of the "Job 3 Warning Lamp" represents the warning lamp 900 that operates together with the robot 100.

In the job image J1 of "Job 1 Robot", an input image Si11, an output image So12, and an output image So11 are added. The input image Si11, the output image So12, and the output image So11 represent inputs and outputs of the robot 100. In the job image J2 of "Job 2 Device", an input image Si21, an output image So21, and an output image So22 are added. The input image Si21, the output image So21, and the output image So22 represent inputs and outputs of the processing device 800. In the job image J3 of "Job 3 Warning Lamp", an input image Si31 is added. The input image Si31 represents an input of the warning lamp 900. In the specification, the input image and the output image are collectively referred to as "Input/output Image".

In the embodiment, concepts of "Job", "JobIn", "JobOut", and "Association" are used in creating the operation sequence. Hereinafter, "Job", "JobIn", "JobOut", and "Association" will be described.

(2) Job

The "Job" means (i) a subject of the operation, or (ii) a set of operations grouped for each subject of the operation. The "Job" is a concept that corresponds to the configuration element (in the embodiment, the robot 100, the processing device 800, and the warning lamp 900) which is a control target, included in the workstation WS. One or more pieces of "Job" is subordinate to one "Application".

The image J0 of "Empty Job" illustrated at the upper left of FIG. 4 is a user interface for providing a job to the application. The "Empty Job" means a job for which the corresponding configuration element is not specifically designated among the configuration elements included in the workstation WS. By dragging and dropping the "Empty Job" J0 displayed at the first display part Da01 to the second display part Da02, the empty job is set for the second display part Da02. The name of the job is set as a property of the empty job set in this manner. As the name of the job, for example, a name that is easy for the user to understand, such as "Robot", "Device", or "Warning Lamp", is set. The job image J1 of "Job 1 Robot", the job image J2 of "Job 2 Device", and the job image J3 of "Job 3 Warning Lamp" displayed at the second display part Da02 of FIG. 4 are displayed within the second display part Da02 through the processing.

As a conceptual classification, the "Job" includes "Motion Job" that follows the movement with respect to other configuration elements and "Monitoring Job" that does not follow the movement with respect to other configuration elements. The "Motion Job" is, for example, the robot 100, the processing device 800, or a set of the operations of the robot 100 and the processing device 800. The "Monitoring Job" is, for example, the warning lamp 900 or a set of the operations of the warning lamp 900.

(3) Job Input

The "JobIn" is an input to the job that corresponds to an input to a configuration element included in the workstation WS. The "JobIn" includes "Synchronous Job Input" and "Asynchronous Job Input".

The "Synchronous Job Input" is a job input for setting the operation sequence in which a certain job X receives an output from another job Y as an input and performs a certain operation at the timing of the input. On the input/output edit screen De0, the "Synchronous Job Input" is set for the job X, and in association with "Synchronous Job Output" set for the job Y, the operation sequence for synchronizing an operation associated with the "Synchronous Job Input" in the job X and an operation associated with the "Synchronous Job Output" in the job Y is set.

For example, in order to set the operation sequence for synchronizing and performing processing in which the processing device 800 discharges the certain workpiece W01 and processing in which the robot 100 grips the workpiece W01 discharged from the processing device 800, the following setting is performed with respect to the job that corresponds to the robot 100. In other words, in the "Job 1 Robot" J1, the job input that serves as a trigger of the operation of gripping the workpiece W01 is set as the "Synchronous Job Input" and is associated with the job output (synchronous job output) of "Workpiece Discharge" of the "Job 2 Device" J2.

The image Si1 of "Synchronous" including a figure having a triangular shape in the "JobIn" Si0 illustrated at the middle part on the left side of FIG. 4 is a user interface for providing the "Synchronous Job Input" to the job within the second display part Da02. By dragging and dropping the "Synchronous" Si1 onto the job displayed within the second display part Da02, the "Synchronous Job Input" is set for the job. The name of the job input is set as a property of the job input set in this manner. As the name of the job input, for example, a name that is easy for the user to understand, such as "Wait for Workpiece Discharge" or "Wait for Workpiece Removal", is set. The input image Si11 of "Wait for Workpiece Discharge" of the "Job 1 Robot" J1 and the input image Si21 of "Wait for Workpiece Removal" of the "Job 2 Device" J2 which are displayed at the second display part Da02 of FIG. 4 are displayed within the second display part Da02 through the processing.

The "Asynchronous Job Input" is a job input for setting the operation sequence in which a certain job receives an output from another job as an input and performs a certain operation triggered by the input. However, the operation triggered by the "Asynchronous Job Input" is not synchronized with the timing of the input. The "Asynchronous Job Input" includes "Asynchronous Sequential Job Input" and "Asynchronous Batch Job Input".

An operation associated with the "Asynchronous Sequential Job Input" is performed as much as the number of times or time that corresponds to the number of received inputs in a case where a plurality of inputs are received. On the input/output edit screen De0, the "Asynchronous Sequential Job Input" is set for the job X, and in association with "Asynchronous Job Output" set for the job Y, the operation sequence for performing an operation associated with the "Asynchronous Sequential Job Input" in the job X, triggered by the operation associated with the "Asynchronous Job Output" in the job Y, is set.

For example, in order to set an operation sequence in which the warning lamp 900 is turned on and the warning lamp 900 is turned on as much as the number of times that corresponds to the number of outputs of a workpiece gripping error, triggered by the robot 100 causing the workpiece gripping error, the following setting is performed. In other words, in the "Job 3 Warning Lamp" J3, a job input associated with the turning-on of the warning lamp is set as the "Asynchronous Sequential Job Input" and associated with a job output (asynchronous job output) of the "Workpiece Gripping Error" of the "Job 1 Robot" J1.

The image Si2 of "Asynchronous Sequential" including a figure including a semicircular shape in the "JobIn" Si0 illustrated at the middle part on the left side of FIG. 4 is a user interface for providing the "Asynchronous Sequential Job Input" to the job within the second display part Da02. By dragging and dropping the "Asynchronous Sequential" Si2 onto the job displayed within the second display part Da02, the "Asynchronous Sequential Job Input" is set for the job. The name of the job input is set as a property of the job input set in this manner. As the name of the asynchronous sequential job input, for example, a name that is easy for the user to understand, such as "Error Notification", is set. The input image Si31 of "Error Notification" of the "Job 3 Warning Lamp" J3 displayed at the second display part Da02 of FIG. 4 is displayed within the second display part Da02 through such processing.

An operation associated with the "Asynchronous Batch Job Input" is performed with constant contents (for example, a fixed time or a constant number of times) regardless of the number of times of received inputs. On the input/output edit screen De0, the "Asynchronous Batch Job Input" is set for the job X, and in association with the "Asynchronous Job Output" set for the job Y, the operation sequence for performing an operation associated with the "Asynchronous Batch Job Input" in the job X, triggered by the operation associated with the "Asynchronous Job Output" in the job Y, is set.

For example, in order to set an operation sequence in which the warning lamp 900 is turned on and the warning lamp 900 is turned on only by the fixed time regardless of the number of times of outputs of the workpiece gripping error, triggered by the robot 100 causing the workpiece gripping error, the following setting is performed. In other words, in the "Job 3 Warning Lamp" J3, a job input associated with the turning-on of the warning lamp is set as the "Asynchronous Batch Job Input" and associated with a job output (asynchronous job output) of the "Workpiece Gripping Error" of the "Job 1 Robot" J1.

The image Si3 of "Asynchronous Batch" including a figure having a shape in which two semicircular shapes overlap each other in the "JobIn" Si0 illustrated at the middle part on the left side of FIG. 4 is a user interface for providing the "Asynchronous Batch Job Input" to the job within the second display part Da02. By dragging and dropping the "Asynchronous Batch" Si3 onto the job displayed within the second display part Da02, the asynchronous batch job input is set for the job. The name of the job input is set as a property of the job input set in this manner. As the name of the asynchronous batch job input, for example, a name that is easy for the user to understand, such as "Error Notification", is set. In addition, in the example of FIG. 4, the job input of the "Asynchronous Batch" is not set.

(4) Job Output

The "JobOut" is an output from a job corresponding to an output from the configuration element included in the workstation WS. The "JobOut" includes the "Synchronous Job Output" and the "Asynchronous Job Output".

The "Synchronous Job Output" is a job output for setting the operation sequence in which the certain job Y transmits an output to the other job X and performs an operation at the timing of the output. On the input/output edit screen De0, the "Synchronous Job Output" is set for the job Y, and in association with the "Synchronous Job Input" set for the job X, the operation sequence for synchronizing an operation associated with the "Synchronous Job Output" in the job Y and an operation associated with the "Synchronous Job Input" in the job X is set.

The image So1 of "Synchronous" including a figure having a triangular shape in the "JobOut" So0 illustrated at the lower part on the left side of FIG. 4 is a user interface for providing the "Synchronous Job Output" to the job within the second display part Da02. By dragging and dropping the "Synchronous" So1 onto the job displayed within the second display part Da02, the synchronous job output is set for the job. The name of the job output is set as a property of the job output set in this manner. As the name of the job output, for example, a name that is easy for the user to understand, such as "Workpiece Discharge" or "Workpiece Removal Completed", is set. The output image So21 of "Workpiece Discharge" of the "Job 2 Device" J2 and the output image So11 of "Workpiece Removal Completed" of the "Job 1 Robot" J1 which are displayed at the second display part Da02 of FIG. 4 are displayed within the second display part Da02 through the processing.

The "Asynchronous Job Output" is a job output for setting the operation sequence in which the certain job Y transmits an output to the other job X and performs an operation triggered by the output. However, in the processing that follows the "Asynchronous Job Output", the operation in the job Y is not synchronized with the timing of the output. On the input/output edit screen De0, the "Asynchronous Job Output" is set for the job Y, and in association with the "Asynchronous Sequential Job Input" or the "Asynchronous Batch Job Input" set for the job X, the operation sequence for performing an operation associated with the "Asynchronous Sequential Job Input" or the "Asynchronous Batch Job Input" in the job X, triggered by the output in the job Y, is set.

For example, in order to set an operation sequence in which the processing device 800 turns on the warning lamp 900 triggered by an occurrence of an error, the following setting is performed. In other words, in the "Job 2 Device" J2, a job output associated with the device error is set as the "Asynchronous Job Output" and is associated with a job input (asynchronous job input) of the "Error Notification" of the "Job 3 Warning Lamp" J3.

The image So2 of "Asynchronous" including a figure having a semicircular shape in the "JobOut" So0 illustrated at the lower part on the left side of FIG. 4 is a user interface for providing the "Asynchronous Job Output" to the job within the second display part Da02. By dragging and dropping the "Asynchronous" So2 onto the job displayed within the second display part Da02, the asynchronous job output is set for the job. The name of the job output is set as a property of the job output set in this manner. As the name of the asynchronous job output, for example, a name that is easy for the user to understand, such as "Workpiece Gripping Error" or "Device Error", is set. The output image So12 of "Workpiece Gripping Error" of the "Job 1 Robot" J1 and the output image So22 of "Device Error" of the "Job 2 Device" J2 which are displayed at the second display part Da02 of FIG. 4 are displayed within the second display part Da02 through the processing.

In the embodiment, by associating the input/output image of the robot 100 and the input/output image of other configuration elements with each other, it is possible to designate whether or not the processing to be executed in association with an output for designating the input/output relationship in one of the robot 100 and other configuration elements and the processing to be executed in association with an input for designating the input/output relationship in the other one are synchronized with each other (refer to Da01 of FIG. 4). Therefore, it is possible to easily create a sequence of the robot 100 and other configuration elements that follows synchronous processing.

In the embodiment, by associating the input/output image of the robot 100 and the input/output image of other configuration elements with each other, it is possible to designate whether the processing to be executed in association with a target output in one of the robot 100 and other configuration elements and the processing to be executed in association with a target input in the other one are performed as sequential processing without synchronization or as batch processing without synchronization (refer to Si2 and Si3 of FIG. 4). Therefore, it is possible to easily create a sequence of the robot and the processing device followed by the asynchronous sequential processing and the asynchronous batch processing.

(5) Association of Job Output and Job Input

The "Association" is processing for combining and correlating the job output and the job input with each other. On the input/output edit screen De0, by associating the input/output image selected among the input/output images of the robot 100 and the input/output image selected among the input/output images of other configuration elements (here, the processing device 800 and the warning lamp 900) with each other, it is possible to designate the input/output relationship in which the output of one of the robot 100 and other configuration elements is the input of the other one.

The job output of "Synchronous" can only be associated with the job input of "Synchronous". The job output of "Asynchronous" can only be associated with the job input of "Asynchronous Sequential" or "Asynchronous Batch". In the specification, the job input of "Asynchronous Sequential" and the job input of "Asynchronous Batch" are collectively referred to as the job input of "Asynchronous".

The association between the job output and the job input is not limited to one-to-one association. In other words, it is also possible to associate one job output with two or more job inputs. It is also possible to associate two or more job outputs with one job input.

The association between the job output and the job input is performed as follows at the second display part Da02 of the input/output edit screen De0. In other words, when clicking an output image SoXX ("XX" is a two-digit number) of a certain job with the mouse, the color of the output image SoXX changes. In addition, one or more input images SiYY ("YY" is a two-digit number) that can be correlated with the output image SoXX of which the color has changed is blinkingly displayed. In this state, when clicking any of the input images SiYY of another job which is a partner of the association with the mouse, the association of the job input and the job output is performed.

Even in a case of clicking the input image SiYY first and then clicking the output image SoXX with the mouse, similar processing is performed. In other words, when the input image SiYY is clicked, the color of the input image SiYY is changed, and one or more output images SoXX that can be correlated with the input image SiYY are blinkingly displayed. After this, when any one of the blinking output images SoXX is clicked, the job input and the job output are associated with each other.

On the input/output edit screen De0, the name of the job output of the partner of the association is displayed by being connected with a line in the input image representing the job input associated with the job output. For example, the output image So21 of "Workpiece Discharge" of the "Job 2 Device" J2 is associated with the input image Sill of the "Wait for Workpiece Discharge" of the "Job 1 Robot" J1. Therefore, the input image Sill of "Wait for Workpiece Discharge" of the "Job 1 Robot" J1 includes the image Co21 of "Workpiece Discharge" that corresponds to the output image So21 of "Workpiece Discharge" of the "Job 2 Device" J2.

On the input/output edit screen De0, the name of the job input of the partner of the association is displayed by being connected with a line in the output image representing the job output associated with the job input. For example, the output image So21 of "Workpiece Discharge" of the "Job 2 Device" J2 includes the image Ci11 of "Wait for Workpiece Discharge" that corresponds to the input image Sill of the "Wait for Workpiece Discharge" of the "Job 1 Robot" J1.

On the input/output edit screen De0, for example, the output image So12 of "Workpiece Gripping Error" of the "Job 1 Robot" J1 and the output image So22 of "Device Error" of the "Job 2 Device" J2 are correlated with the input image Si31 of "Error Notification" of the "Job 3 Warning Lamp" J3.

As a result, an image Co22 of "Device Error" that corresponds to the output image So22 of "Device Error" of the "Job 2 Device" J2 and an image Co12 of "Workpiece Gripping Error" that corresponds to the output image So12 of "Workpiece Gripping Error" of the "Job 1 Robot" J1 are displayed by being connected with a line to the input image Si31 of "Error Notification" of the "Job 3 Warning Lamp" J3. An image Ci31 of "Error Notification" that corresponds to the input image Si31 of "Error Notification" of the "Job 3 Warning Lamp" J3 is displayed by being connected with a line to the output image So12 of "Workpiece Gripping Error" of the "Job 1 Robot" J1. An image Ci31b of "Error Notification" that corresponds to the input image Si31 of "Error Notification" of the "Job 3 Warning Lamp" J3 is displayed by being connected with a line to the output image So22 of "Device Error" of the "Job 2 Device" J2.

(6) Transition Example of Input/Output Edit Screen

Figure 5:
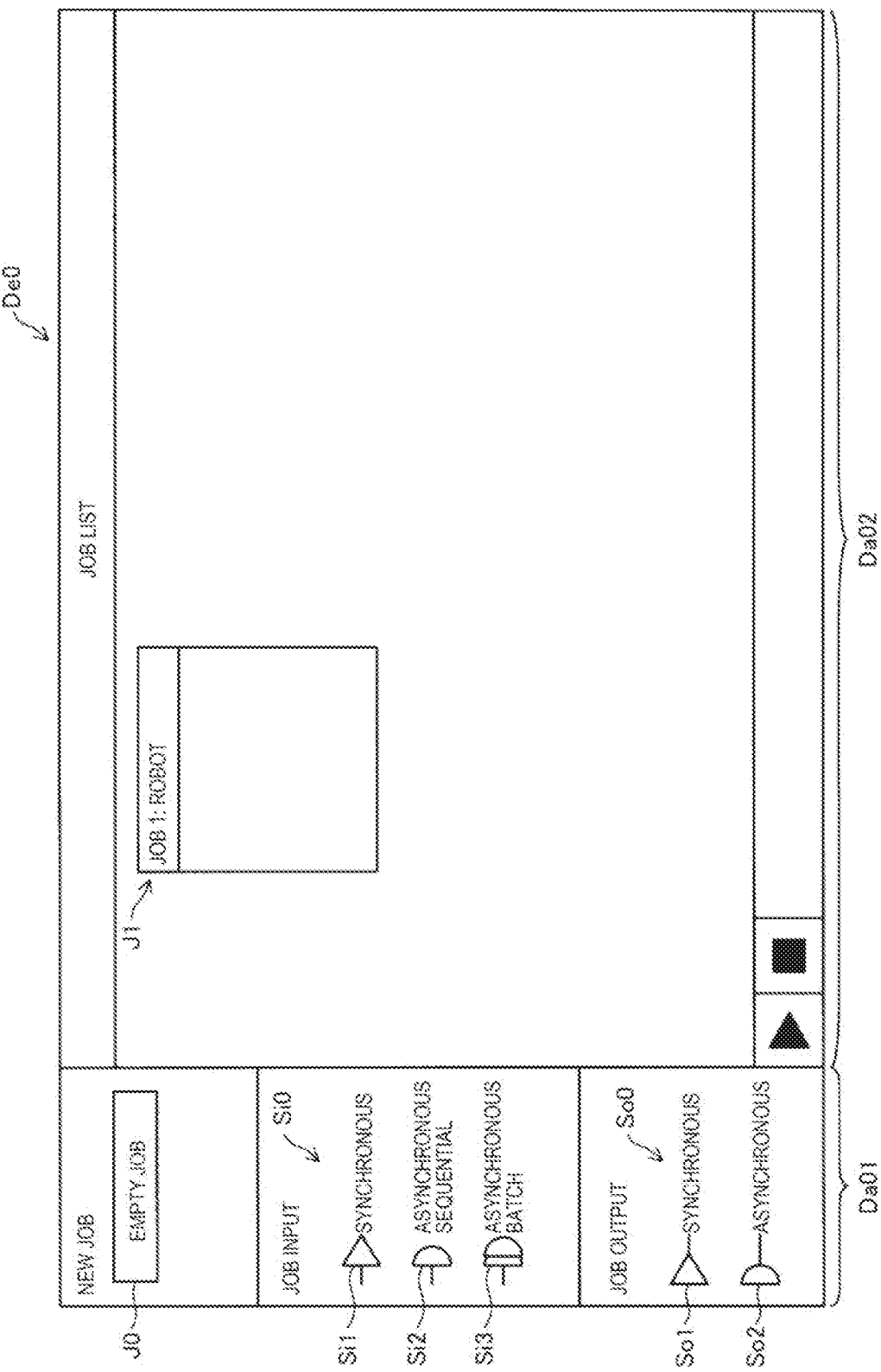
FIG. 5 illustrates a state where "Job 1 Robot" is set at a second display part of the input/output edit screen.

FIG. 5 illustrates a state where the "Job 1 Robot" J1 is set at the second display part Da02 of the input/output edit screen De0. At the second display part Da02 of the input/output edit screen De0, from a state where nothing is displayed, by dragging and dropping the imageJ0 of "Empty Job" within the first display part Da01 into the second display part Da02, and by setting the name (here, "Robot") that serves as a property with respect to the job, a state of FIG. 5 is realized.

Figure 6:
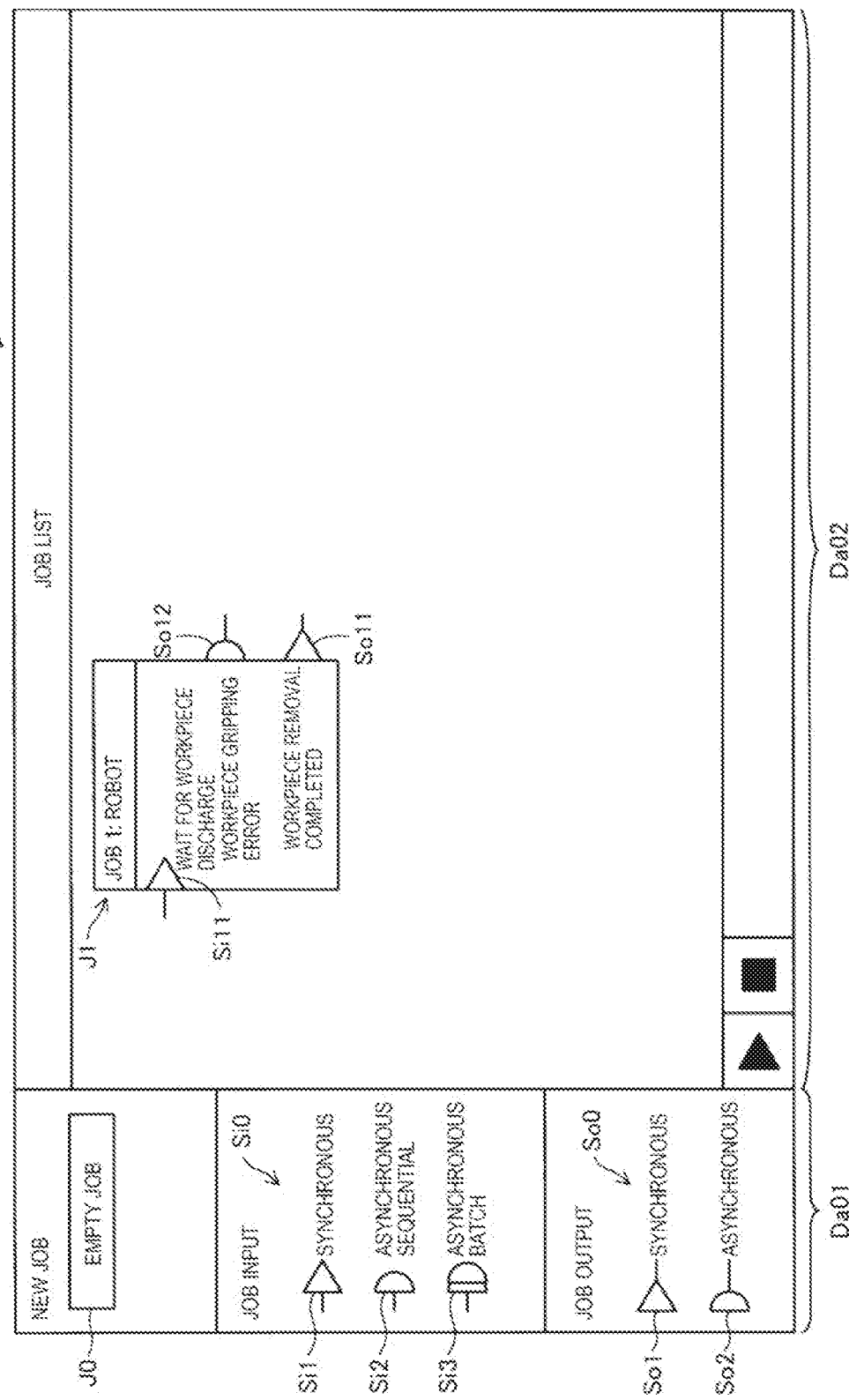
FIG. 6 illustrates a state where an input image for synchronous input, an asynchronous sequential output image, and an output image for synchronous output are set for the "Job 1 Robot".

FIG. 6 illustrates a state where the input image Si11 for synchronous input, the asynchronous sequential output image So12, and the output image So11 for synchronous output are set for the "Job 1 Robot" J1. From the state of the input/output edit screen De0 of FIG. 5, by dragging and dropping the image Si1 of "Synchronous" in the image Si0 of "JobIn" within the first display part Da01, and the image So1 of "Synchronous" and the image So2 of "Asynchronous" in the image So0 of "JobOut" onto the "Job 1 Robot" J1, and by setting the name that serves as a property with respect to each input/output, a state of FIG. 6 is realized.

On the input/output edit screen De0, the input image and the output image can be added to the "Job 1 Robot" J1 in this manner. In addition, in the specification, the input image and the output image are also collectively referred to as "Input/output Image".

Figure 7:
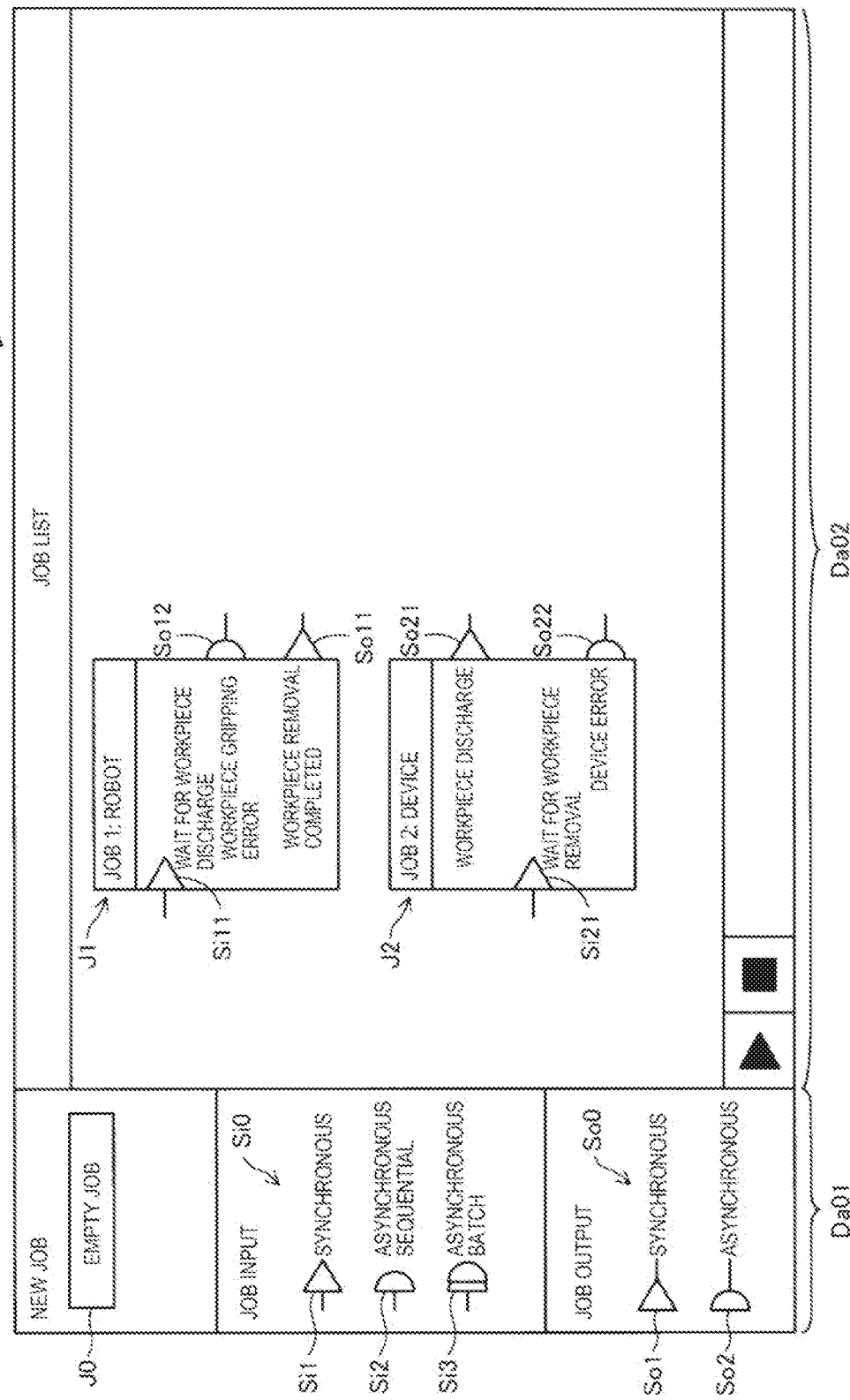
FIG. 7 illustrates a state where "Job 2 Device" is set, and further, an input image for synchronous input, an output image for synchronous output, and an asynchronous sequential output image are set for the "Job 2 Device".

FIG. 7 illustrates a state where the "Job 2 Device" J2 is set, and further, the input image Si21 for synchronous input, the output image So21 for synchronous output, and the asynchronous sequential output image So22 are set for the "Job 2 Device" J2. From the state of the input/output edit screen De0 of FIG. 6, by performing the following processing, a state of FIG. 7 is realized. In other words, the image J0 of the "Empty Job" within the first display part Da01 is dragged and dropped to the second display part Da02, and the name (here, "Device") that serves as the property is set for the job. The image Si1 of "Synchronous" in the image Si0 of "JobIn" within the first display part Da01, and the image So1 of "Synchronous" and the image So2 of "Asynchronous" in the image So0 of "JobOut" are dragged and dropped onto the "Job 2 Device" J2, and the name that serves as a property with respect to each input/output is set.

On the input/output edit screen De0, it is possible to add the input/output image to the job (here, "Job 2 Device" J2) other than the "Job 1 Robot" J1 in this manner.

Figure 8:
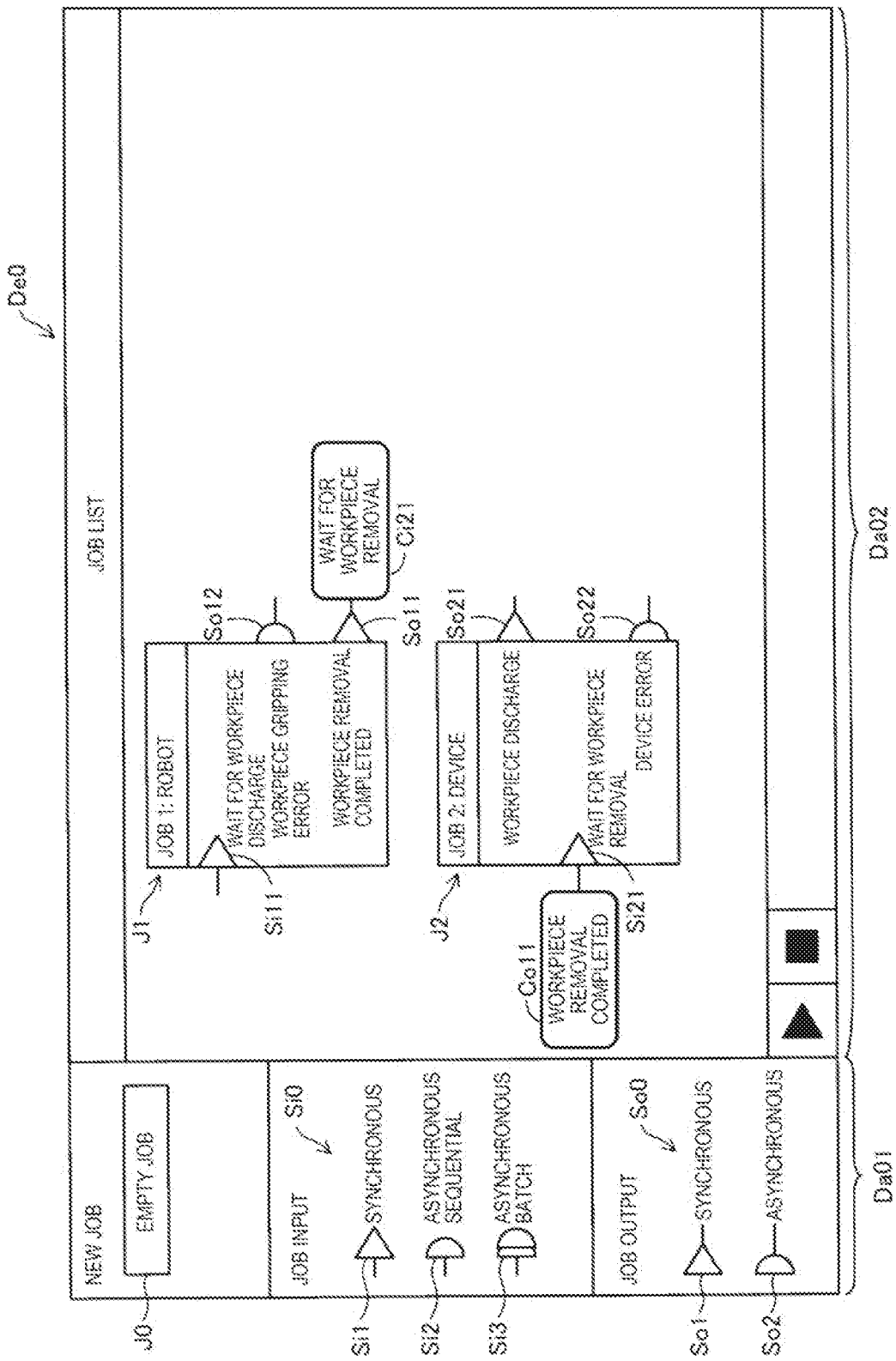
FIG. 8 illustrates a state where the output image for synchronous output of the "Job 1 Robot" and the input image for synchronous input of the "Job 2 Device" are associated with each other.

FIG. 8 illustrates a state where the output image So11 for synchronous output of the "Job 1 Robot" J1 and the input image Si21 for synchronous input of the "Job 2 Device" J2 are associated with each other. From the state of the input/output edit screen De0 of FIG. 7, by performing the following processing, a state of FIG. 8 is realized. In other words, the output image So11 for synchronous output of the "Job 1 Robot" J1 is clicked and then the input image Si21 for synchronous input of the "Job 2 Device" J2 is clicked. As a result, the output image So11 for synchronous output of the "Job 1 Robot" J1 and the input image Si21 for synchronous input of the "Job 2 Device" J2 are associated with each other. As a result, the image Ci21 of "Wait for Workpiece Removal" is added to the output image So11 for the synchronous output of the "Job 1 Robot" J1. The display Co11 of "Workpiece Removal Completed" is added to the input image Si21 for synchronous input of the "Job 2 Device" J2.

In this manner, on the input/output edit screen De0, the output image which is an output image of the robot 100 and is correlated with the input image of other configuration elements (here, the processing device 800 and the warning lamp 900), is an image different from the output image which is an output image of the robot 100 and is not correlated with the input image of other configuration elements. Therefore, the user can easily specify the output image of the robot 100 which is not correlated with the input of other configuration elements, and can correlate the output image with the input image of other configuration elements.

In addition, on the input/output edit screen De0, the input image which is an input image of the configuration elements (here, the processing device 800 and the warning lamp 900) other than the robot 100 and is associated with the output image of the robot 100, is an image different from the input image which is an input image of the configuration elements other than the robot 100 and is not correlated with the output image of the robot 100. Therefore, the user can easily specify the output image of other configuration elements which is not correlated with the input of the robot 100, and can correlate the output image with the input image of the robot 100.

From the state of the input/output edit screen De0 of FIG. 8, by performing the following processing, the state of FIG. 4 is realized. In other words, the image J0 of "Empty Job" within the first display part Da01 is dragged and dropped to the second display part Da02, and the name (here, "Warning Lamp") that serves as the property is set for the job. The image Si2 of "Asynchronous Sequential" in the image Si0 of "JobIn" within the first display part Da01 is dragged and dropped onto the "Job 3 Warning Lamp" J3, and the name (here, "Error Notification") that serves as a property with respect to the input/output is set.

In addition, the input image Si31 of "Error Notification" of the "Job 3 Warning Lamp" J3, and the output image So12 of "Workpiece Gripping Error" of the "Job 1 Robot" J1 and the output image So22 of "Device Error" of the "Job 2 Device" J2 are associated with each other. The output image So21 of "Workpiece Discharge" of the "Job 2 Device" J2 and the input image Si11 of "Wait for Workpiece Discharge" of the "Job 1 Robot" J1 are associated with each other. As a result, the state of FIG. 4 is realized.

In this manner, on the input/output edit screen De0, the input image which is an input image of the robot 100 and is correlated with the output image of other configuration elements (here, the processing device 800 and the warning lamp 900), is an image different from the input image which is an input image of the robot 100 and is not correlated with the output image of other configuration elements. Therefore, the user can easily specify the input image of the robot 100 which is not correlated with the output of other configuration elements, and can correlate the output of other configuration elements with the second input image.

In addition, on the input/output edit screen De0, the output image which is an output image of the configuration elements (here, the processing device 800 and the warning lamp 900) other than the robot 100 and is correlated with the input image of the robot 100, is an image different from the output image which is an output image of the configuration elements other than the robot 100 and is not correlated with the input image of the robot 100. Therefore, the user can easily specify the output image of other configuration elements which is not correlated with the input of the robot 100, and can correlate the output image with the input image representing the input of the robot 100.

A4. Second User Interface for Creating Operation Sequence

Hereinafter, the designation of the input/output relationship by the second user interface will be described. A second user interface is a user interface in which the operation sequence of the configuration element can be edited with respect to one of the configuration elements of the workstation WS by arranging the operations on the screen.

Figure 9:
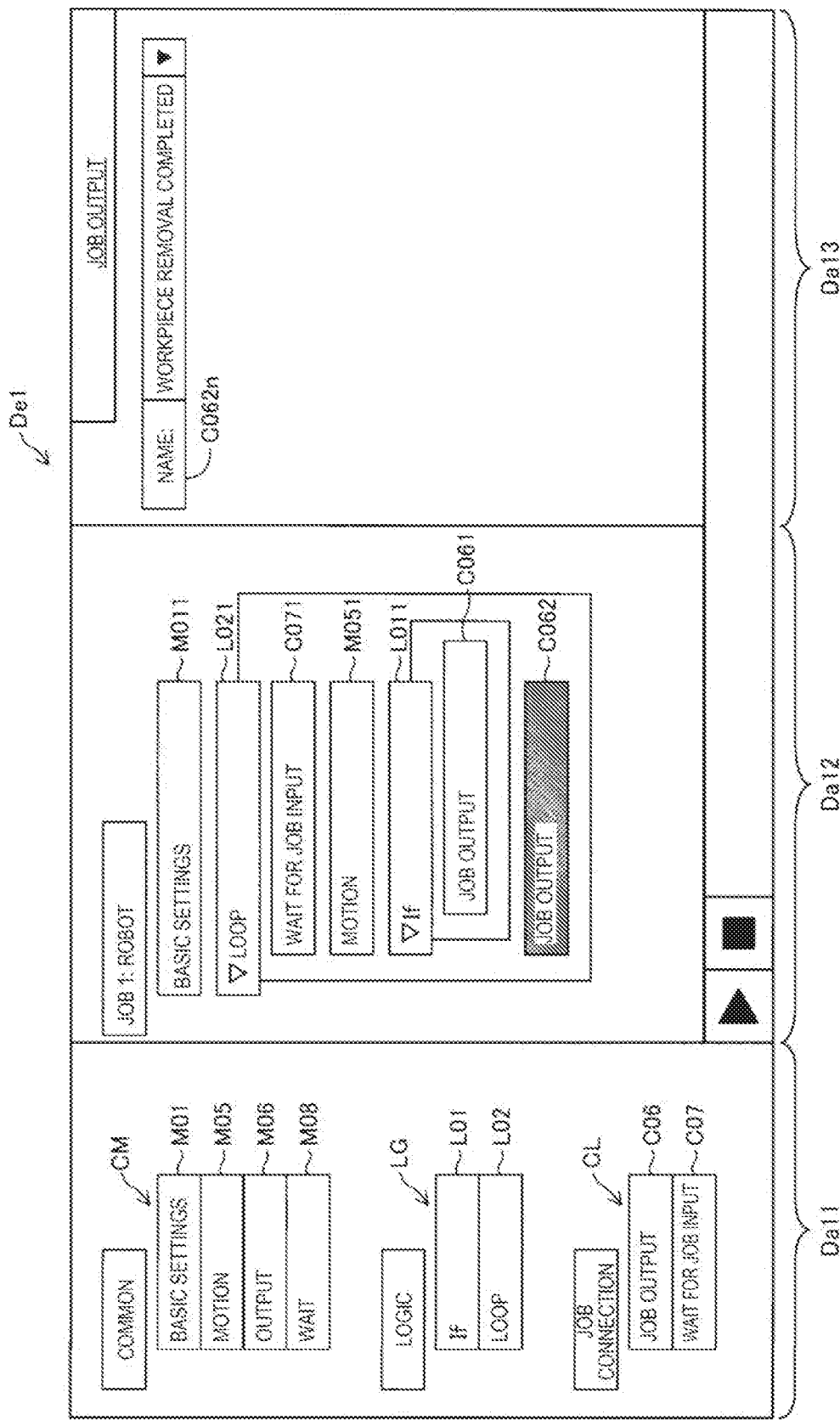
FIG. 9 is a diagram illustrating a sequence edit screen to be displayed on the display of the setting device in step S110 of FIG. 2.

FIG. 9 is a diagram illustrating the sequence edit screen De1 to be displayed on the display 602 of the setting device 600 in step SI10 of FIG. 2. The sequence edit screen De1 is a user interface in which an image representing one operation is selected among the images representing a plurality of operations and the operation sequence of the robot can be edited by arranging the image on the screen. In addition, in the specification, "Edit" is not limited to modifying a part or the entirety of already existing operation sequences, but also includes generation of an operation sequence from a state where an operation sequence is not defined at all.

In a state where the input/output edit screen De0 (refer to FIG. 4) is displayed, in a case where the image of one job is selected and a button of "Job Edit" to be displayed on the display 602 is pressed, the sequence edit screen De1 is displayed on the display 602. In addition, in order to make it easy to understand the technology, illustration of the button of the "Job Edit" is omitted in FIGS. 4 to 8.

By providing the sequence edit screen De1 in the setting device 600, after designating the input/output relationship in the collaboration between the processing device 800 and the warning lamp 900 that operate together with the robot 100 and the robot 100 on the input/output edit screen De0 (refer to FIG. 4), it is possible to edit the operation sequence of the robot 100 on the sequence edit screen De1.

The sequence edit screen De1 includes a first display part Da11, a second display part Da12, and a third display part Da13. The first display part Da11, the second display part Da12, and the third display part Da13 are displayed in parallel in this order from the left to the right on the display 602 of the setting device 600.

The first display part Da11 is a user interface representing a plurality of selectable operations. The first display part Da11 includes an operation image CM representing a plurality of selectable operations. In an example of FIG. 9, the operation image CM representing the operation includes "Motion" M05, "Output" M06, and "Wait" M08. The first display part Da11 also includes other displays. In addition, in the embodiment, the following description will be made while "Basic Settings" M01 is "operation image" in a broad sense. Through the user interfaces, processing described below is added to the operation sequence edited by the second display part Da12.

The "Basic Settings" M01 is a user interface for adding processing for determining basic settings of one operation subject, such as the robot 100 or the processing device 800. The "Motion" M05 is a user interface for adding an operation for moving the control target. The "Output" M06 is a user interface for adding an operation for outputting a signal to the outside by the control target that serves as an operation subject. The "Wait" M08 is a user interface for adding an operation for stopping the processing until a predetermined event occurs.

The first display part Da11 further includes an operation image LG representing a plurality of logics that can be selected in creating the operation sequence. In the example of FIG. 9, the operation image LG includes "If" L01 and "Loop" L02. In addition, in the embodiment, the following description about the technology will be made while the "If" L01 and the "Loop" L02 are also "operation image" in a broad sense.

The first display part Da11 further includes an operation image CL that represents cooperation of selectable operations in creating the operation sequence. In the example of FIG. 9, the operation image CL includes "JobOut" C06 and "Wait for JobIn" C07.

The "JobOut" C06 is a user interface for adding processing for performing an output to a designated port of other configuration elements of the workstation WS, triggered by the associated operation. The "JobOut" C06 corresponds to the image So1 of "Synchronous" and the image So2 of "Asynchronous" included in the image So0 of the "JobOut" of the input/output edit screen De0 (refer to FIG. 4).

The "Wait for JobIn" C07 is a user interface for adding processing for performing a predetermined operation waiting for an input to the designated port from other configuration elements of the workstation WS. The "Wait for JobIn" C07 corresponds to the image Si1 of "Synchronous", the image Si2 of "Asynchronous Sequential", and the image Si3 of "Asynchronous Batch" included in the image Si0 of "JobIn" of the input/output edit screen De0 (refer to FIG. 4).

The second display part Da12 is a user interface in which the operation sequence is displayed as the arrangement of operations selected via the first display part Da11 and the operation sequence can be edited by editing the arrangement operations. At the second display part Da12, the operation sequence of the job designated on the input/output edit screen De0 is displayed in a format of an arrangement of images representing the operations. By dragging and dropping each display of the first display part Da11 to the second display part Da12, it is possible to add operations or logics to the operation sequence at the second display part Da12. At the second display part Da12, the operation sequence can be edited by editing the arrangement of images representing the operations.

At the second display part Da12, the operation sequence is displayed as the arrangement of displays representing the operation selected via the first display part Da11. In the example of FIG. 9, images M011, L021, C071, M051, L011, C061, and C062 representing the operations are respectively displayed in one row and are arranged in parallel from top to bottom.

The "Loop" L021 is displayed at the second display part Da12 by dragging the "Loop" L02 of the first display part Da11 to the second display part Da12. The "Motion" M051 is displayed at the second display part Da12 by dragging the "Motion" M05 of the first display part Da11 to the second display part Da12. Similarly, among the displays within the second display part Da12, a display of which the first three digits of the sign attached to the display match the sign attached to the display within the first display part Da11, is a display displayed within the second display part Da12 by dragging the corresponding display within the first display part Da11.

However, the "Basic Settings" M011, the "Wait for JobIn" C071, the "If" L011, the "JobOut" C061, and the "JobOut" C062 are switched from the input/output edit screen De0 first and are displayed at the time when the sequence edit screen De1 is displayed.

The "Wait for JobIn" C071 corresponds to the setting of the input image Si11 (wait for workpiece discharge) representing the synchronous job input in the job image J1 of "Job 1 Robot" on the input/output edit screen De0, and is displayed at the second display part Da12 of the sequence edit screen De1. The "If" L011 and the "JobOut" C061 correspond to the setting of the output image So12 (workpiece gripping error) representing the asynchronous job output in the job image J1 of "Job 1 Robot" on the input/output edit screen De0, and is displayed at the second display part Da12 of the sequence edit screen De1. The "JobOut" C062 corresponds to the setting of the output image So11 (workpiece removal completed) representing the synchronous job output in the job image J1 of "Job 1 Robot" on the input/output edit screen De0, and is displayed at the second display part Da12 of the sequence edit screen De1. The "Basic Settings"

M011 is unconditionally displayed when the sequence edit screen De1 is first switched from the input/output edit screen De0 and displayed.

FIG. 9 illustrates a state where the display C062 of "JobOut" among each operation displayed at the upper part of the second display part Da12 is clicked. The display C062 of "JobOut" is displayed in a color different from that before being clicked.

The third display part Da13 is a user interface in which properties of operations included in the operation sequence displayed at the second display part Da12 are displayed and the values of the properties can be set. More specifically, at the third display part Da13, the property of the selected operation among the operations included in the operation sequence displayed at the second display part Da12 are displayed. Specific contents of the selected operation property are set via the third display part Da13 (refer to S120 of FIG. 2).

In the state of FIG. 9, since the display C062 of "JobOut" is selected at the second display part Da12, at the third display part Da13, a screen for setting the property of the job output (here, name C062n) is displayed. With respect to other job inputs and job outputs C071 and C061, similarly, properties can also be set via the third display part Da13.

In other words, with respect to the input/output of the robot 100 in which the input/output image is displayed on the input/output edit screen De0 and the input/output of the other configuration elements in which the input/output image is displayed on the input/output edit screen De0, the properties can be set via the third display part Da13. Therefore, the user can set the properties of each input/output on the sequence edit screen De1 after designating the input/output relationship in the collaboration of the configuration elements that operate together with the robot 100 and the robot 100 on the input/output edit screen De0.

The program file 305 including the input/output relationship edited via the input/output edit screen De0 (refer to FIG. 4), the operation sequence edited via the sequence edit screen De1 (refer to FIG. 9), and the information of the properties set via the sequence edit screen De1A, is created in step S140 of FIG. 2.

FIG. 1 illustrates the functional unit of the CPU 610 of the setting device 600 which displays the input/output edit screen De0 and the sequence edit screen De1 on the display 602 that serves as the display unit as "display control unit 612".

A5. Specific Contents of Synchronous Processing and Asynchronous Processing

Hereinafter, processing contents when the program file 305 is created based on the input/output relationship edited via the input/output edit screen De0 (refer to FIG. 4) will be described.

FIG. 10 is a table illustrating variables set for realizing the synchronous processing and the asynchronous processing set on the input/output edit screen De0. When the program file 305 is created in step S140 of FIG. 2, serial numbers are added to all correlated input/output relationships on the set input/output edit screen De0 (refer to the left end of FIG. 10).

The serial number 1 is added to the pair of synchronous processing of the input image Si11 of "Wait for Workpiece Discharge" of the "Job 1 Robot" J1 and the output image So21 of "Workpiece Discharge" of the "Job 2 Device" J2 (refer to FIG. 4). The serial number 2 is added to the pair of synchronous processing of the input image Si21 of "Wait for Workpiece Removal" of the "Job 2 Device" J2 and the output image So11 of "Workpiece Removal Completed" of the "job 1 device" J1.

The serial number 3 is added to the asynchronous sequential pair of the input image Si31 of "Error Notification" of the "Job 3 Warning Lamp" J3 and the output image So12 of "Workpiece Gripping Error" of the "Job 1 Robot" J1. The serial number 4 is added to the asynchronous sequential pair of the input image Si31 of "Error Notification" of the "Job 3 Warning Lamp" J3 and the output image So22 of "Device Error" of the "Job 2 Device" J2. In the input/output relationship of the serial numbers 3 and 4, the input side is the input image Si31 of "Error Notification" of the "Job 3 Warning Lamp" J3.

For the synchronous input/output relationship with the serial number 1, a variable L1_S on the transmission side and a variable L1_R on the reception side are allocated. For the synchronous input/output relationship with the serial number 2, a variable L2_S on the transmission side and a variable L2_R on the reception side are allocated. For the asynchronous input/output relationship with the serial numbers 3 and 4, only a variable L3_R on the reception side is commonly allocated.

FIG. 11 is a diagram illustrating a program list for realizing the input/output relationship (refer to FIG. 10 and So11 and Si21 in FIG. 4) of "Synchronous" with the serial number 1. The program list illustrated in FIG. 11 is a part of the program file 305 created in step S140 of FIG. 2.

Figure 12:
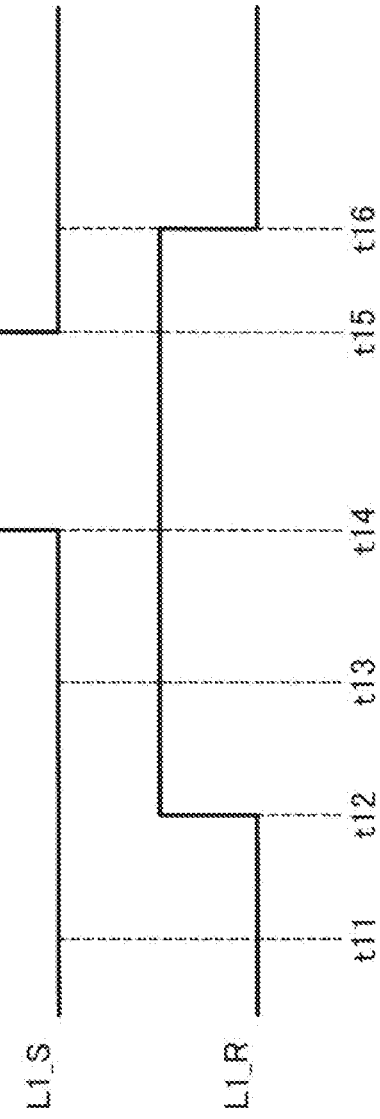
FIG. 12 is a time chart of variables set for realizing the input/output relationship of "Synchronous" with the serial number 1.

FIG. 12 is a time chart of the variables L1_S and L1_R set for realizing the input/output relationship of "Synchronous" with the serial number 1. Hereinafter, with reference to FIG. 12, along FIG. 11, the contents of the program list for realizing the input/output relationship of "Synchronous" with the serial number 1 and the progress method of the processing will be described. Although not illustrated in FIG. 11, initial values of the variables L1_S and L1_R are 0 (refer to t11 in FIG. 12).

In the job 1 (robot 100), the variable L1_R is set to 1 in Cj11 in a case where a state where the processing to be executed in synchronization with the processing of the job 2 (processing device 800) can be executed is achieved (refer to t12 of FIG. 12). The processing of setting the variable L1_R to 1 represents "Output" in the job 1 (refer to So11 of FIG. 4). In the job 1 (robot 100), thereafter, in Cj12, an operation of waiting until the variable L1_S becomes 1 is designated (refer to t13 of FIG. 12).

In the job 2 (processing device 800), in Cj21, an operation of waiting until the variable L1_R becomes 1 is designated (refer to t11 of FIG. 12). When the variable L1_R becomes 1 (refer to Cj11 and t12 in FIG. 12) by the job 1 (robot 100), in the job 2 (processing device 800), the variable L1_S is set to 1 in Cj22 (refer to t14 of FIG. 12). The processing of setting the variable L1_S to 1 represents "Input" in the job 2 (refer to Si21 of FIG. 4). In the job 2 (processing device 800), thereafter, processing Cj23 described following Cj22 is executed. The processing Cj23 described following Cj22 is processing to be executed in association with the input from the job 1 (robot 100). In other words, the processing Cj23 described following Cj22 is processing to be executed in synchronization with the processing of the job 1 (robot 100).

When the variable L1_S becomes 1 (Cj22), in the job 1 (robot 100), in Cj13, the variable L1_S is set to 0 (refer to t15 of FIG. 12). Further, in Cj14, the variable L1_R is set to 0 (refer to t16 in FIG. 12). In other words, the variables L1_S and L1_R are set to initial values. In the job 1 (robot 100), thereafter, processing Cj15 described following Cj14 is executed. The processing Cj15 described following Cj14 is processing to be executed in association with the output to the job 2 (processing device 800). In other words, the processing Cj15 described following Cj14 is processing to be executed in synchronization with the processing of the job 2 (processing device 800).

The processing Cj15 in the job 1 (robot 100) and the processing Cj23 in the job 2 (processing device 800) are synchronized with each other by the above program. The program list for realizing the input/output relationship (refer to FIG. 10) of "Synchronous" with the serial number 2 is also created so as to perform processing in which the variables L2_S and L2_R are similarly used.

With such a program, the input/output relationship of "Synchronous" is realized with simple processing. As a result, it is possible to reduce a processing load of the CPU 310 of the robot control device 300 that executes the control and to reduce the region occupied in the RAM 330.

Figure 13:
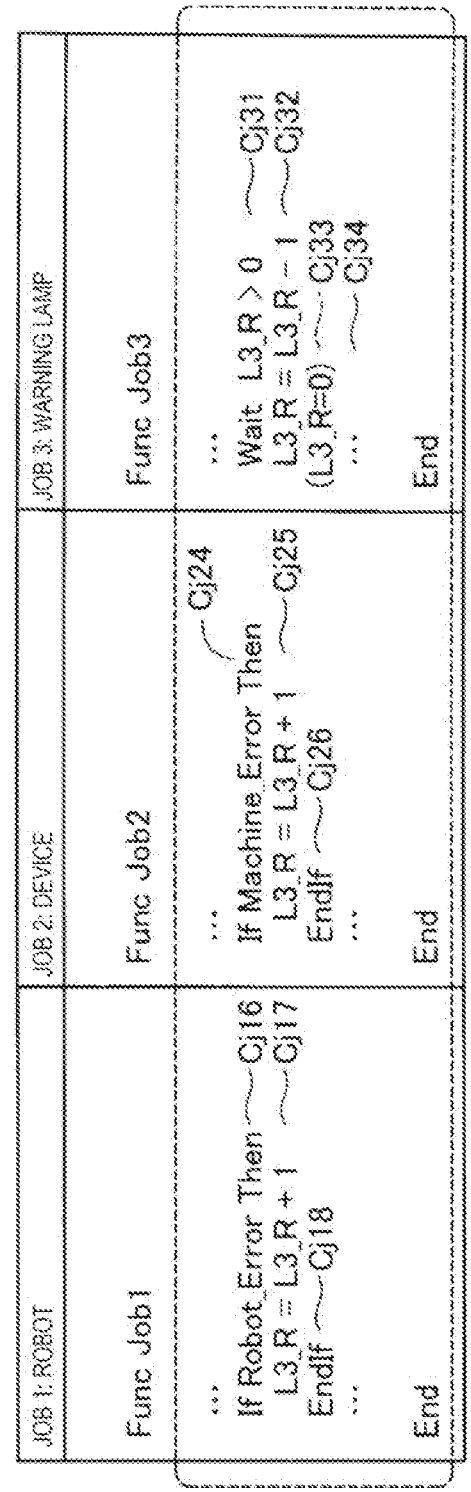
FIG. 13 is a diagram illustrating a program list for realizing an input/output relationship (refer to FIG. 10 and So12 and Si31 in FIG. 4) of "Asynchronous Sequential" with a serial number 3.

FIG. 13 is a diagram illustrating the program list for realizing the input/output relationship (refer to FIG. 10 and So12 and Si31 in FIG. 4) of "Asynchronous Sequential" with the serial number 3. The program list illustrated in FIG. 13 is a part of the program file 305 created in step S140 of FIG. 2.

Figure 14:
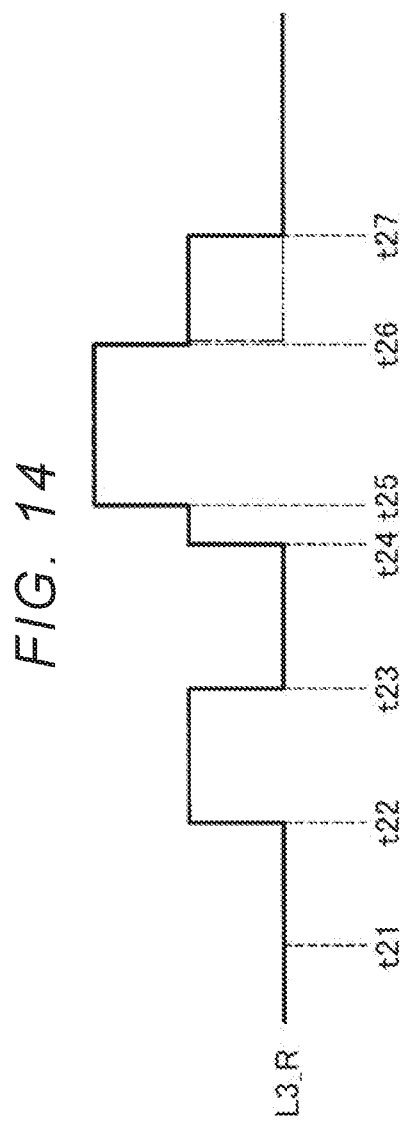
FIG. 14 is a time chart of a variable set for realizing an input/output relationship of "Asynchronous" with the serial number 3.

FIG. 14 is a time chart of the variable L3_R set for realizing an input/output relationship of "Asynchronous" with the serial number 3. Hereinafter, with reference to FIG. 14, along FIG. 13, the contents of the program list for realizing the input/output relationship of "Asynchronous Sequential" with the serial number 3 and the progress method of the processing will be described. Although not illustrated in FIG. 13, an initial value of the variable L3_R is 0 (refer to t21 in FIG. 14).

First, the contents of the program list of the job 1 (robot 100) and the job 3 (warning lamp 900) and the progress method of processing will be described assuming a case where an error occurs in the robot 100 and no error occurs in the processing device 800.

In a case where an error occurs in the robot 100, the variable L3_R is increased by 1 in Cj16, Cj17, and Cj18 of the job 1 (robot 100) (refer to t22 in FIG. 14). The processing of increasing the variable L3_R only by 1 represents "Output" in the job 1 (robot 100). In the job 1 (robot 100), thereafter, processing described following Cj18 is executed. The processing is processing to be executed when the error of the job 1 (robot 100) is associated with the output to the job 3 (warning lamp 900). In other words, the processing is processing in which the error of the job 1 (robot 100) triggers the processing of the job 3 (warning lamp 900).

Meanwhile, in the job 3 (warning lamp 900), in Cj31, an operation of waiting until the variable L3_R becomes larger than 0 is designated (refer to t21 of FIG. 14). When the variable L3_R is increased by 1 and becomes larger than 0 (refer to Cj17 and t22 in FIG. 14) by the job 1 (robot 100), in the job 3 (warning lamp 900), the variable L3_R is reduced by 1 in Cj32 (refer to t23 of FIG. 14). The processing of reducing the variable L3_R by 1 represents "Input" in the job 3 (refer to Si31 of FIG. 4). In the job 3 (warning lamp 900), thereafter, processing Cj34 described following Cj32 is executed.

The processing Cj34 described following Cj32 is, for example, processing of turning on the warning lamp 900 for a predetermined time. The processing Cj34 described following Cj32 is processing to be executed in association with the input from the job 1 (robot 100). In other words, the processing Cj34 described following Cj32 is processing to be executed triggered by the processing of the job 1 (robot 100).

Next, the contents of the program list of the job 1 (robot 100), the job 2 (processing device 800), and the job 3 (warning lamp 900) and the progress method of processing will be described assuming a case where an error occurs in the robot 100 and then an error also occurs in the processing device 800.

In a case where an error occurs in the robot 100, the variable L3_R is increased by 1 in Cj16 and Cj17 of the job 1 (robot 100) (refer to t24 in FIG. 14). In the job 1 (robot 100), thereafter, processing described following Cj18 is executed. The processing is processing to be executed when the error of the job 1 (robot 100) is associated with the output to the job 3 (warning lamp 900). In other words, the processing is processing in which the error of the job 1 (robot 100) triggers the processing of the job 3 (warning lamp 900).

Next, in a case where an error occurs in the processing device 800, the variable L3_R is increased by 1 in Cj24 and Cj25 of the job 2 (processing device 800) (refer to t25 in FIG. 14). The processing of increasing the variable L3_R only by 1 represents "Output" in the job 2 (processing device 800). In a case where an error occurs in the robot 100 and then an error also occurs in the processing device 800, the variable L3_R becomes 2 at the time t25. In the job 2 (processing device 800), thereafter, processing described following Cj26 is executed. The processing is processing to be executed when the error of the job 2 (processing device 800) is associated with the output to the job 3 (warning lamp 900). In other words, the processing is processing in which the error of the job 2 (processing device 800) triggers the processing of the job 3 (warning lamp 900).

In the job 3 (warning lamp 900), in Cj31, an operation of waiting until the variable L3_R becomes larger than 0 is designated. When the variable L3_R is increased by 1 by the job 1 (robot 100), the variable L3_R is increased by 1 by the job 2 (processing device 800), and as a result of this, when the variable L3_R becomes 2 (refer to Cj17, Cj25, t24, and t25 in FIG. 14), in the job 3 (warning lamp 900), the variable L3_R is reduced by 1 in Cj32 (refer to t26 of FIG. 14). The processing of reducing the variable L3_R only by 1 represents "Input" in the job 3 (warning lamp 900). As a result, the variable L3_R becomes 1. In the job 3 (warning lamp 900), thereafter, the processing Cj34 (turning-on of the warning lamp 900 for a predetermined time) described following Cj32 is executed. Although not described, after this, the processing of the job 3 (warning lamp 900) returns to Cj31.

In Cj31 and Cj32 of the job 3 (warning lamp 900), since the variable L3_R is still larger than 0, the variable L3_R is reduced by 1 (refer to t27 in FIG. 14). As a result, the variable L3_R becomes 0. In the job 3 (warning lamp 900), thereafter, the processing Cj34 (turning-on of the warning lamp 900 for a predetermined time) described following Cj32 is executed.

As a result of such processing, corresponding to the fact that the error occurs two times in total in the job 1 (robot 100) and the job 2 (processing device 800) (refer to t24 and t25 of FIG. 14), in the job 3 (warning lamp 900), the processing Cj34 (turning-on of the warning lamp 900 for a predetermined time) described following Cj32 is executed two times (refer to t26 and t27 in FIG. 14).

With such a program, the input/output relationship of "Asynchronous Sequential" is realized with simple structure. As a result, it is possible to reduce a processing load of the CPU 310 of the robot control device 300 that executes the control and to reduce the region occupied in the RAM 330.

In addition, in a case of realizing the input/output relationship of "Asynchronous Batch", in the job 3 (warning lamp 900), processing of Cj33 is described instead of the processing of Cj32. As a result, as illustrated by one-dot chain line in FIG. 14, the initial value of the variable L3_R becomes 0 at the time t26. In other words, the variable L3_R is set to the initial value. The processing of setting the variable L3_R to be the initial value represents "Input" in the job 3 (refer to Si31 of FIG. 4).

By such processing, in a case where the error occurs two times in total in the job 1 (robot 100) and the job 2 (processing device 800) (refer to t24 and t25 of FIG. 14), in the job 3 (warning lamp 900), the processing Cj34 (turning-on of the warning lamp 900 for a predetermined time) described following Cj32 is executed one time (refer to t26 in FIG. 14).

With such a program, the input/output relationship of "Asynchronous Batch" is realized with simple structure. As a result, it is possible to reduce a processing load of the CPU 310 of the robot control device 300 that executes the control and to reduce the region occupied in the RAM 330.

The job image J1 of the "Job 1 Robot" in the embodiment is also referred to as "first image". The input image Si11, the output image So12, and the output image So11 following the job image J1 are also referred to as "first input/output image". The processing device 800 is also referred to as "peripheral device". The warning lamp 900 is also referred to as "peripheral device". The "peripheral device" is a device other than the robot represented by the "first image" on the input/output edit screen. The job image J2 of the "Job 2 Device" is also referred to as "second image". The input image Si21, the output image So21, and the output image So22 following the job image J2 are also referred to as "second input/output image". The job image J3 of the "Job 3 Warning Lamp" is also referred to as "second image". The input image Si31 following the job image J3 is also referred to as "second input/output image". The display 602 of the setting device 600 is also referred to as "display unit" in the specification. The robot control device 300 and the setting device 600 are collectively referred to as "control device". In the robot 100, a part other than the robot control device 300 controlled by the robot control device 300 is also referred to as "Robot".

B. Second Embodiment

B1. First User Interface for Creating Operation Sequence (1) Configuration of Input/Output Edit Screen In the workstation of a second embodiment, the configuration of the input/output edit screen and the sequence edit screen to be displayed on the display 602 of the setting device 600 is different from the configuration of the input/output edit screen De0 and the sequence edit screen De1 of the first embodiment. Other points of the workstation of the second embodiment are the same as those of the workstation WS (refer to FIG. 1) of the first embodiment. In addition, the same names as the names of the configurations referred to in the first embodiment will be given to the configurations that correspond to the configurations referred to in the first embodiment.

Figure 15:
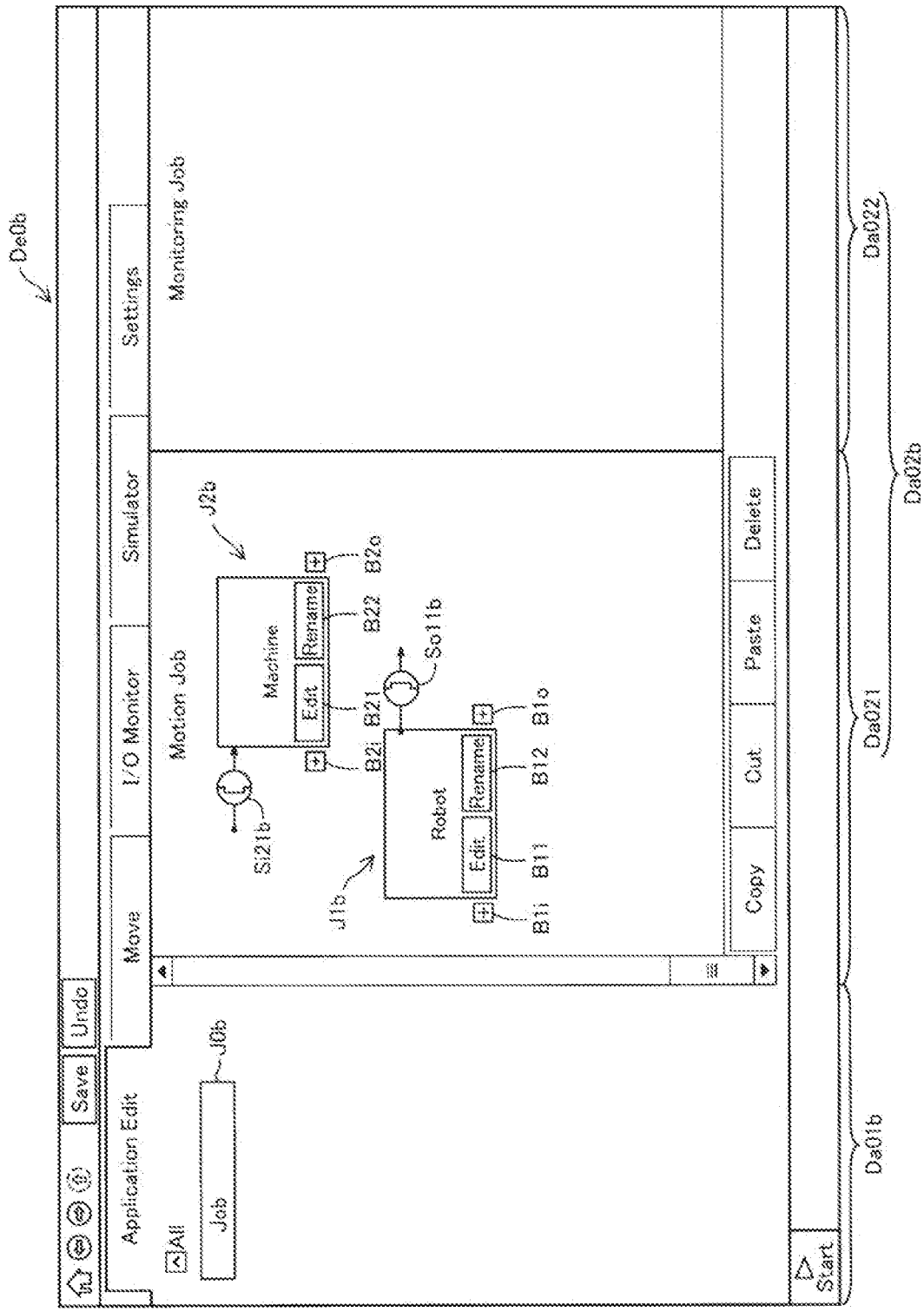
FIG. 15 is a diagram illustrating an input/output edit screen of a second embodiment to be displayed on the display of the setting device in step S110 of FIG. 2.

FIG. 15 is a diagram illustrating an input/output edit screen De0b of the second embodiment to be displayed on the display 602 of the setting device 600 in step S110 of FIG. 2. The input/output edit screen De0b is a screen to be displayed on the display 602 in a case where an "Application Edit" tab is selected among the tabs displayed on the display 602 in step S110 of FIG. 2.

The input/output edit screen De0b includes a first display part Da01b and a second display part Da02b.

Similar to the first display part Da01 of the first embodiment, the first display part Da01b is a user interface that presents an object to be set and edited at the second display part Da02b. The first display part Da01b includes an image J0b of "Job" representing an empty job. In addition, on the input/output edit screen De0b of the second embodiment, the input/output image is added for the second display part Da02b. Therefore, at the first display part Da01b, the user interface (refer to Si0 and So0 in FIG. 4) for adding the input/output image is not displayed.

Similar to the second display part Da02 of the first embodiment, the second display part Da02b is a user interface in which an input/output relationship in which an output of any one of the robot 100, the processing device 800, and the warning lamp 900 is considered as an input of any other one can be designated. The second display part Da02b includes a motion job part Da021 and a monitor ring job part Da022.

The motion job part Da021 is a user interface for editing the input/output relationship of the "Motion Job". In the embodiment, the "Motion Job" is the robot 100, the processing device 800, or a set of the operations of the robot 100 and the processing device 800. The motion job part Da022 is a user interface for editing the input/output relationship of the "Motion Job". In the embodiment, the "Monitoring Job" is the warning lamp 900 or a set of the operations of the warning lamp 900.

In a state of FIG. 15, the motion job part Da021 includes a job image J1b representing a job of the robot 100 and a job image J2b representing a job of the processing device 800. An output image So11b is added to the job image J1b representing the job of the robot 100. An input image Si21b is added to the job image J2b representing the job of the processing device 800.

The job image J1b includes an "Edit" button B11, a "Rename" button B12, an input addition button B1i, and an output addition button B1o.

The "Edit" button B11 is a button for opening a sequence edit screen De1b of which the job is an editing target. The sequence edit screen De1b will be described later. The "Rename" button B12 is a button for giving a name to the job or changing the name added to the job. In the example of FIG. 15, after editing with the "Rename" button B12, the name "Robot" is added to the job image J1b.

The input addition button B1i is a user interface for adding the job input to the job. When the input addition button B1i is pressed, an input image representing a job input is added to the left side of the job image. The output addition button B1o is a user interface for adding the job output to the job. When the output addition button B1o is pressed, an output image representing a job output is added to the right side of the job image (refer to So11b of FIG. 15).

The job image J2b is also configured similarly to the job image J1b. In the job image J2b, after being edited by a "Rename" button B22, the name "Machine" is given.

The output image So11b represents the output of the robot 100. The output image So11b is added to the job image J1b by the output addition button B1o. The input image Si21b represents the input of the processing device 800. The input image Si21b is added to the job image J2b by the input addition button B2i. The output image So11b and the input image Si21b are correlated with each other.

(2) Transition Example of Input/Output Edit Screen

Figure 16:
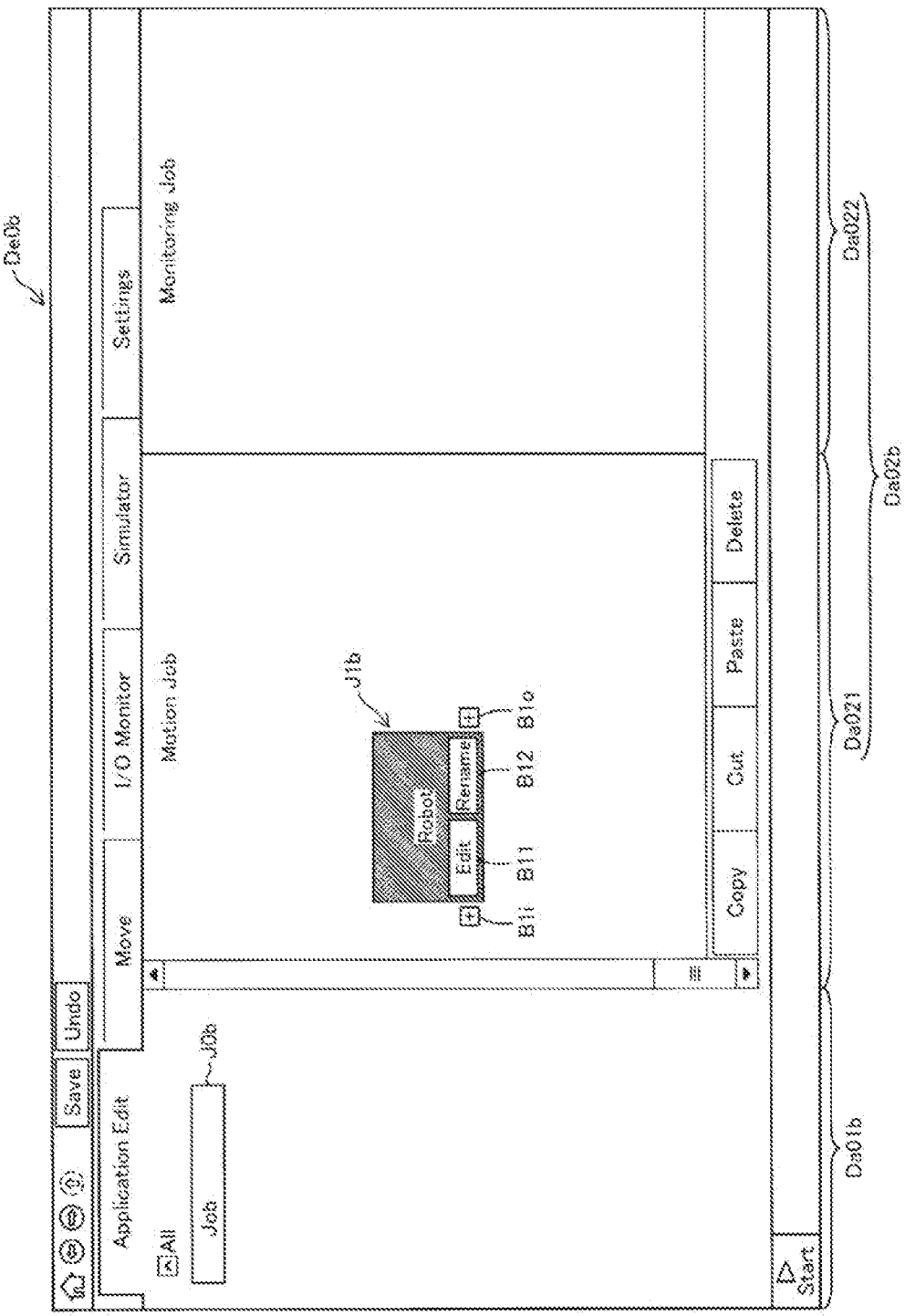
FIG. 16 illustrates a state where a job image is set at a motion job part of the input/output edit screen.

FIG. 16 illustrates a state where the job image Jib is set at the motion job part Da021 of the input/output edit screen De0b. At the motion job part Da021 of the input/output edit screen De0b, from a state where nothing is displayed, by dragging and dropping the image J0b of "Job" within the first display part Da01b into the motion job part Da021, and by setting the name (here, "Robot") that serves as a property with respect to the job, a state of FIG. 16 is realized. In FIG. 16, since the job image J1b is being edited, the display is performed in a color different from that of the job image J1b in FIG. 15.

Figure 17:
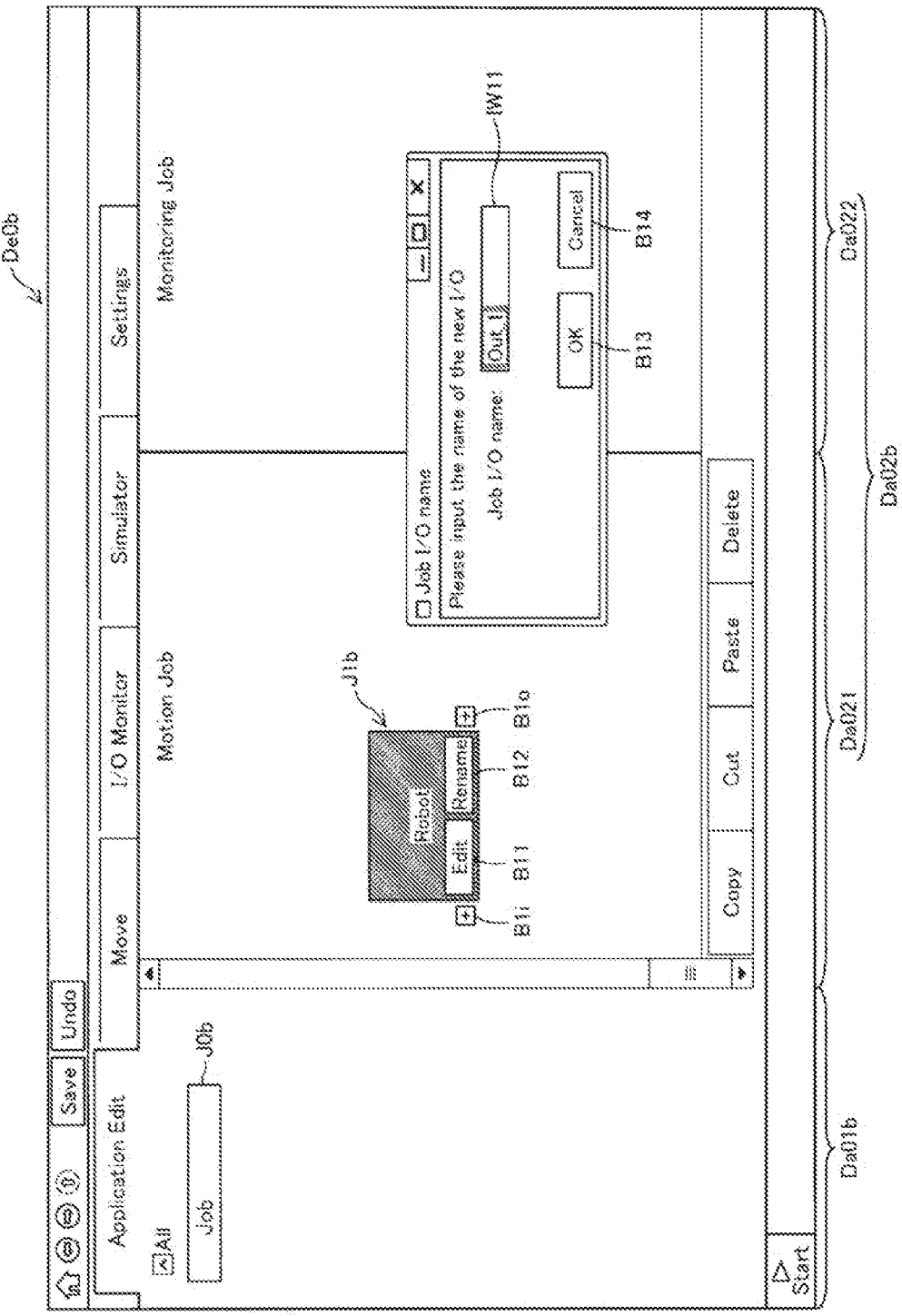
FIG. 17 illustrates the input/output edit screen when a job output is set for the job image.

FIG. 17 illustrates the input/output edit screen De0b when the job output is set for the job image J1b. From the state of the input/output edit screen De0b of FIG. 16, by pressing the output addition button B1o, an input window IW11 for designating the name of the job output added to the job image J1b is displayed. In the example of FIG. 16, the name "Out_1" is input. When an "OK" button B13 is pressed, the job output having the name input into the input window IW11 is set for the job image J1b. When a "Cancel" button B14 is pressed, the setting of the job output for the job image J1b is canceled. In FIG. 17, since the job image Jib is being edited, the display is performed in a color different from that of the job image J1b in FIG. 15.

Figure 18:
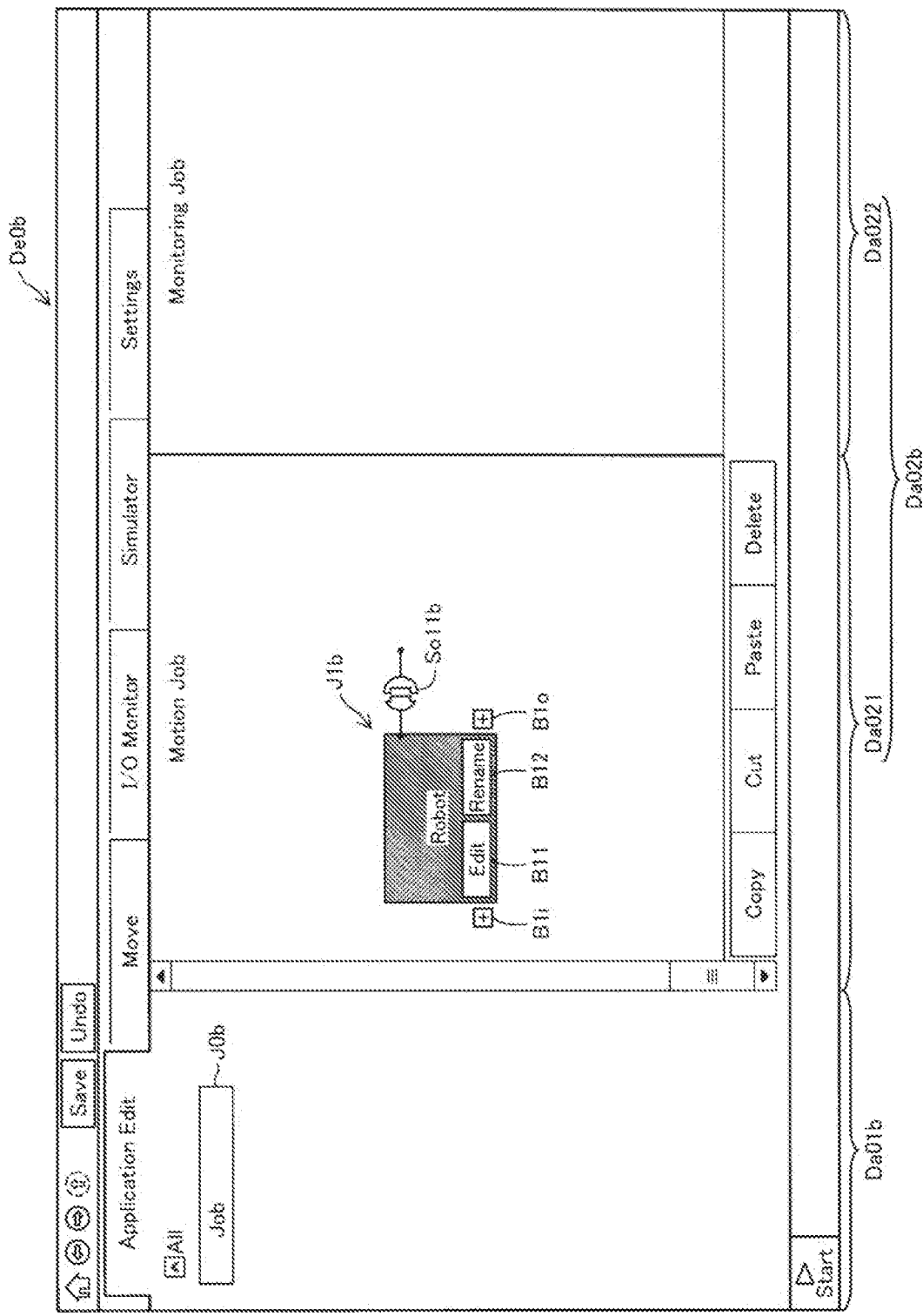
FIG. 18 illustrates the input/output edit screen in a state where an output image of the job output is set for the job image.

FIG. 18 illustrates the input/output edit screen De0b in a state where the output image So11b of the job output is set for the job image J1b. The output image So11b in FIG. 18 is an image different from the output image So11b in FIG. 15 since the output image So11b is not associated with the job input of another job. The output image So11b in FIG. 18 illustrates a state where a connector is not coupled. The output image So11b in FIG. 15 illustrates a state where the connector is coupled. In FIG. 18, since the job image J1b is being edited, the display is performed in a color different from that of the job image J1b in FIG. 15.

Figure 19:
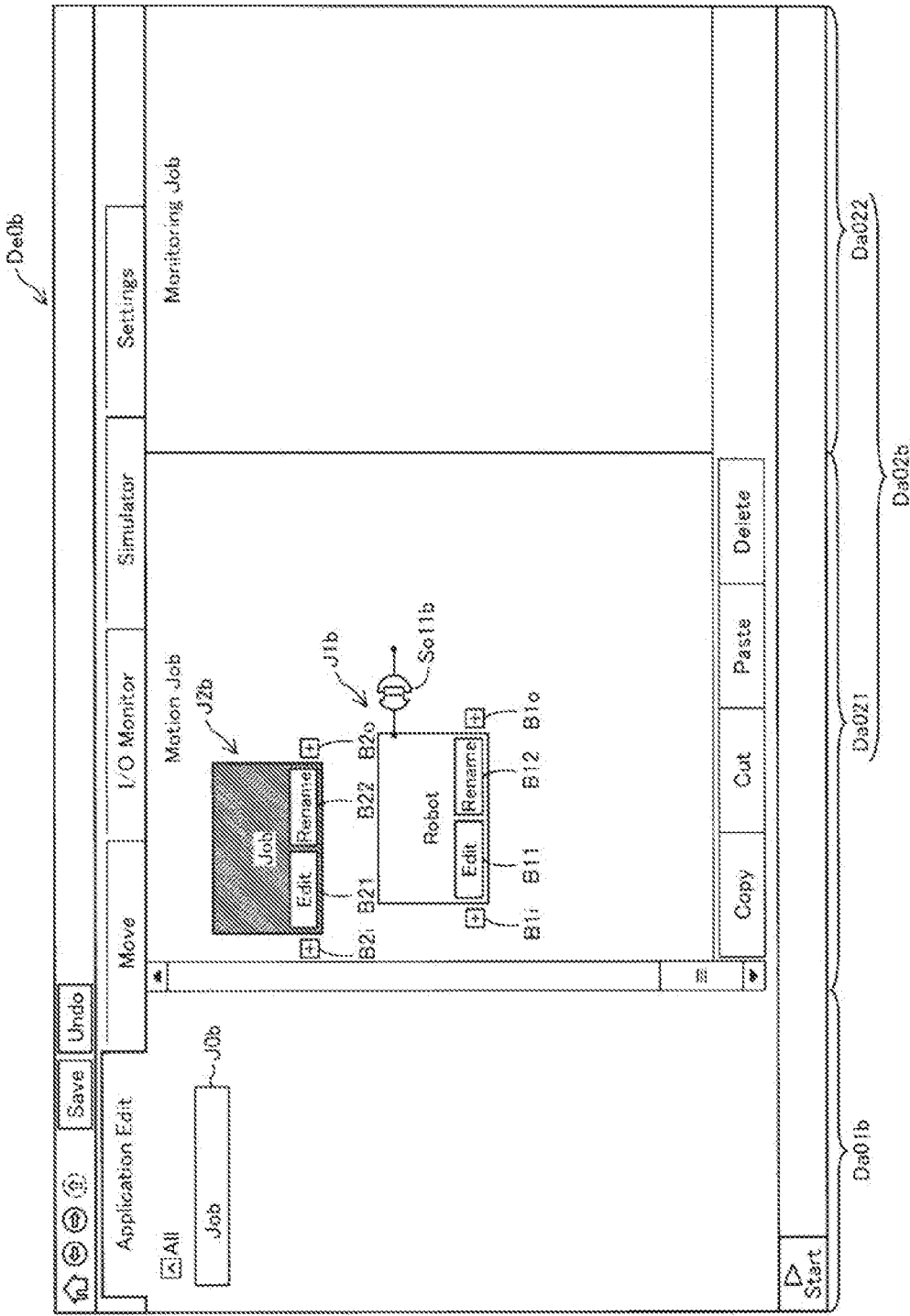
FIG. 19 illustrates a state where a job image is set at the motion job part of the input/output edit screen.

FIG. 19 illustrates a state where the job screen J2b is set at the motion job part Da021 of the input/output edit screen De0b. A state of FIG. 19 is realized by dragging and dropping the image J0b of "Job" within the first display part Da01b into the motion job part Da021. In the state of FIG. 19, since the job image J2b has not been named yet, the "Machine" of FIG. 15 is not displayed, and simply, "Job" is displayed. In FIG. 19, since the job image J2b is being edited, the display is performed in a color different from that of the job image J2b in FIG. 15.

Figure 20:
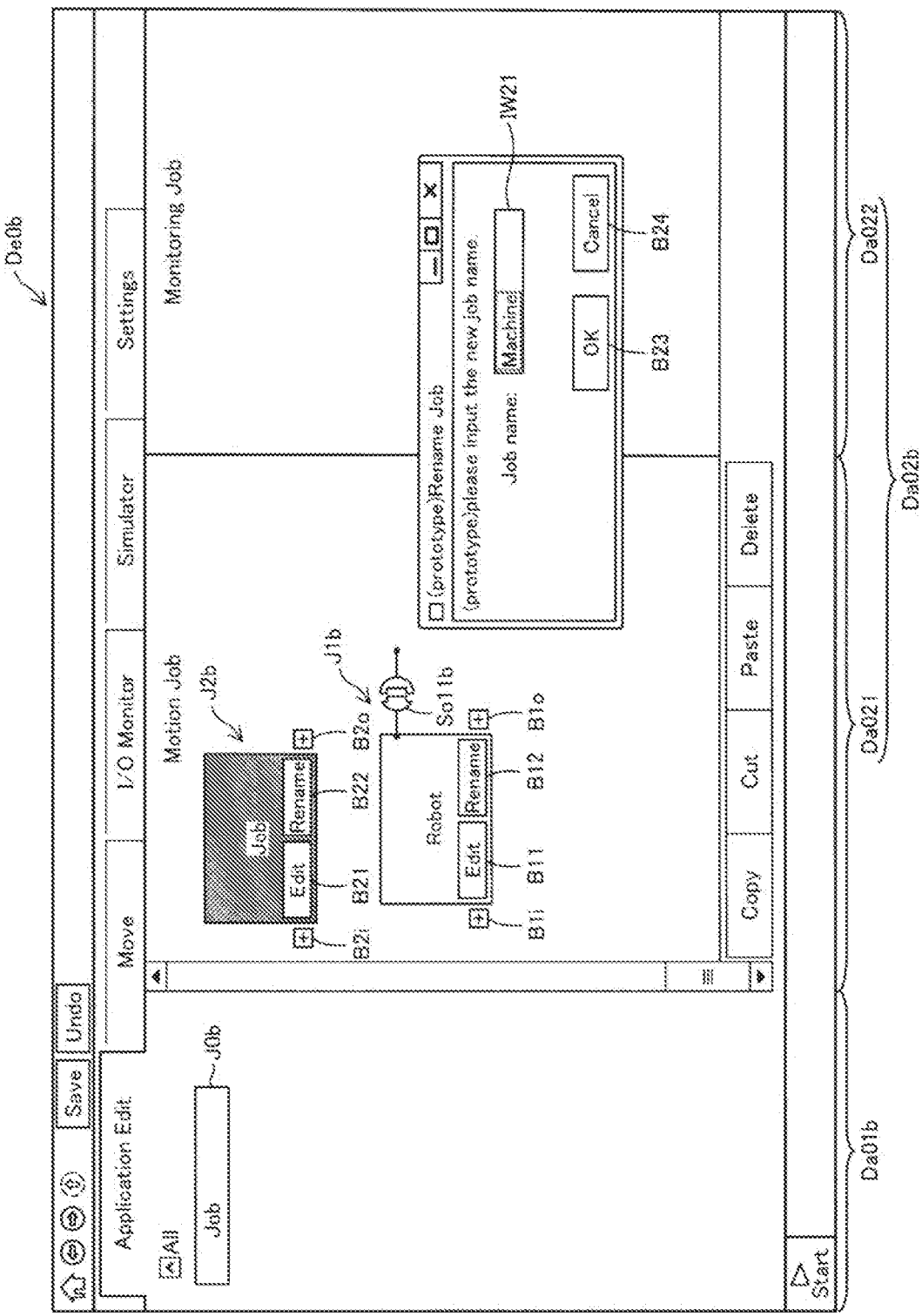
FIG. 20 illustrates the input/output edit screen when a name is set for the job image.

FIG. 20 illustrates the input/output edit screen De0b when a name is set for the job image J2b. From the state of the input/output edit screen De0b of FIG. 19, by pressing the "Rename" button B22, an input window IW21 for designating the name of the job output added to the job image J2b is displayed. In the example of FIG. 20 the name "Machine" is input. When an "OK" button B23 is pressed, the name input into the input window IW21 is set for the job image J2b. When a "Cancel" button B24 is pressed, the setting of the name for the job image J2b is canceled. In FIG. 20, since the job image J2b is being edited, the display is performed in a color different from that of the job image J2b in FIG. 15.

Figure 21:
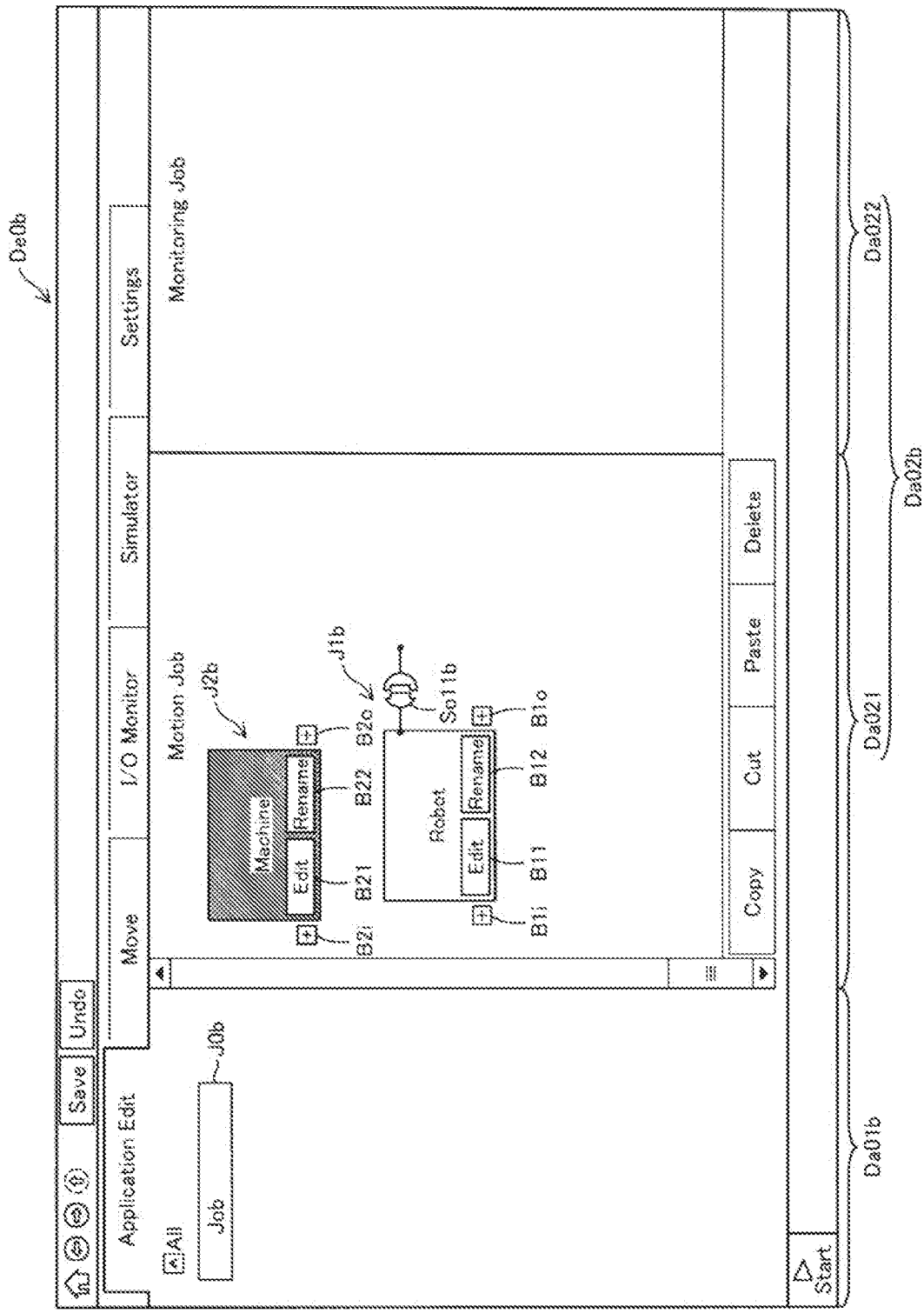
FIG. 21 illustrates a state where a name "Machine" is set for the job image.

FIG. 21 illustrates a state where the name "Machine" is set for the job image J2b. In a state of FIG. 20, by pressing the "OK" button B23, a state of FIG. 21 is realized.

Figure 22:
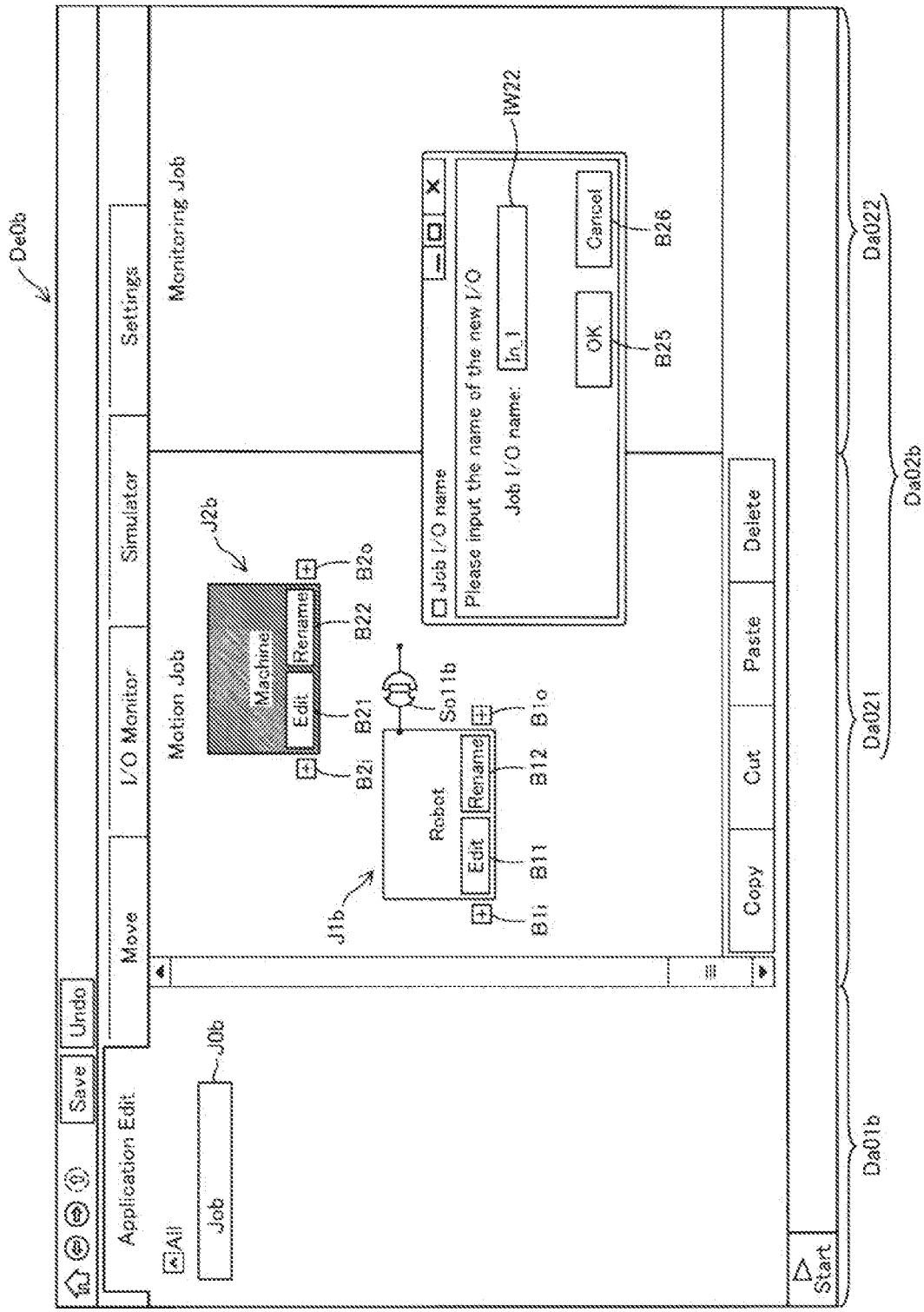
FIG. 22 illustrates the input/output edit screen when a job input is set for the job image.

FIG. 22 illustrates the input/output edit screen De0b when the job input is set for the job image J2b. From the state of the input/output edit screen De0b of FIG. 21, by pressing the input addition button B2i, an input window IW22 for designating the name of the job input added to the job image J1b is displayed. In the example of FIG. 22, the name "In_1" is input. When an "OK" button B25 is pressed, the job input having the name input into the input window IW22 is set for the job image J2b. When a "Cancel" button B26 is pressed, the setting of the job input for the job image Jib is canceled. In FIG. 22, since the job image J2b is being edited, the display is performed in a color different from that of the job image J2b in FIG. 15.

Figure 23:
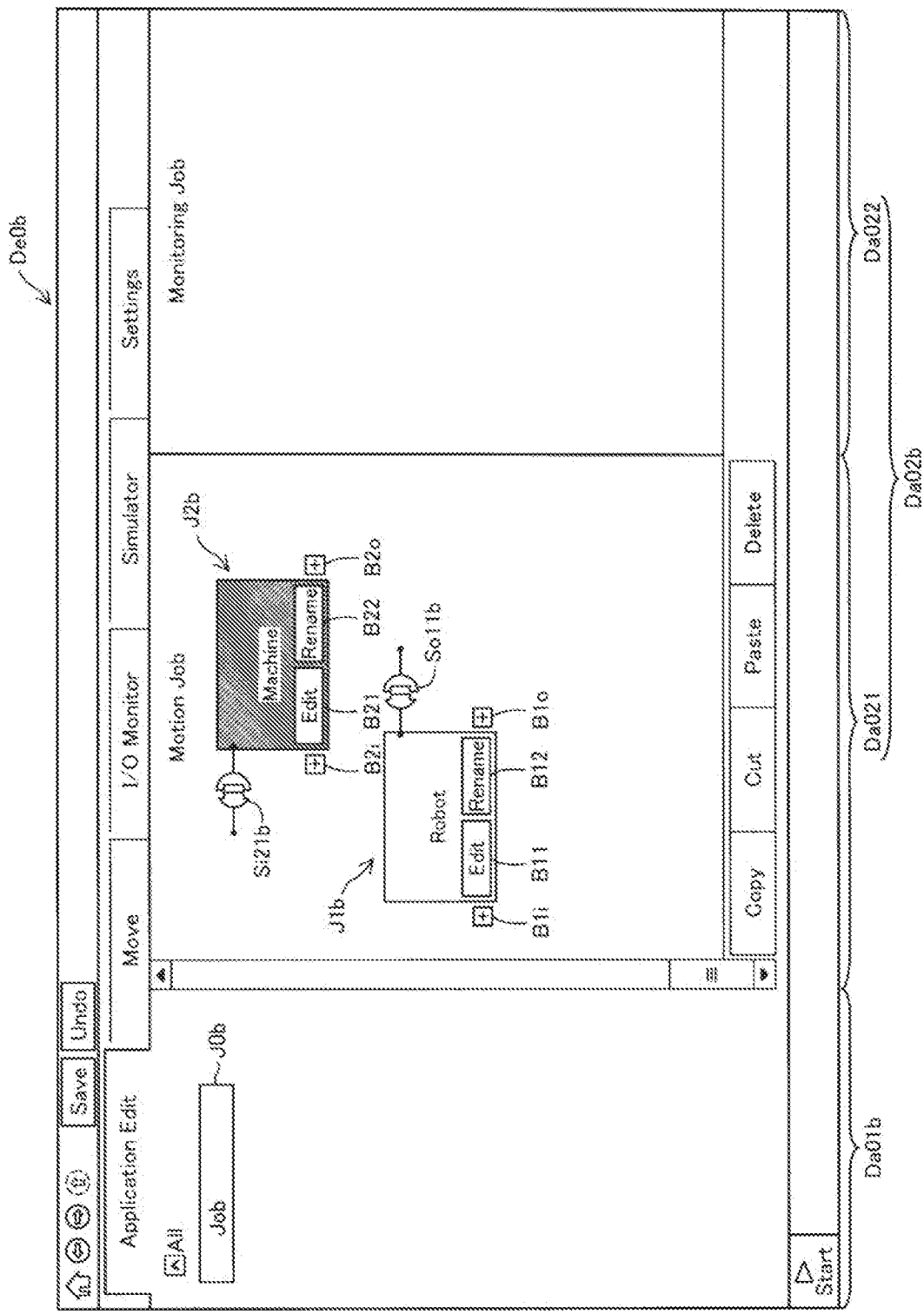
FIG. 23 illustrates the input/output edit screen in a state where an input image of the job input is set for the job image.

FIG. 23 illustrates the input/output edit screen De0b in a state where the input image Si21b of the job input is set for the job image J2b. The input image Si21b in FIG. 23 is an image different from the input image Si21b in FIG. 15 since the input image Si21b is not associated with the job output of another job. The input image Si21b in FIG. 23 illustrates a state where the connector is not coupled. The input image Si21b in FIG. 15 illustrates a state where the connector is coupled. In FIG. 23, since the job image J2b is being edited, the display is performed in a color different from that of the job image J2b in FIG. 15.

Figure 24:
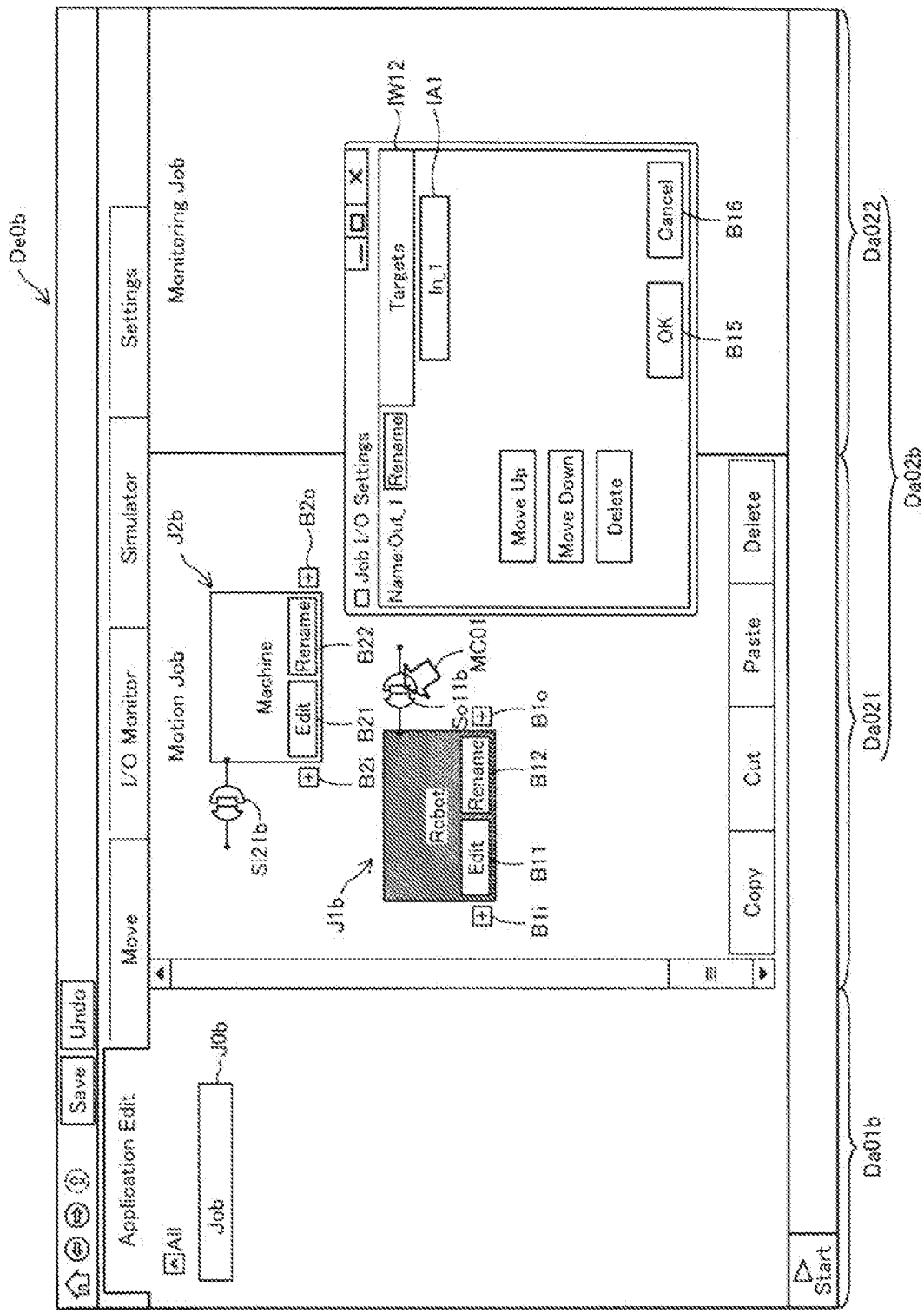
FIG. 24 illustrates the input/output edit screen when the output image of the job image is associated with another job input.

FIG. 24 illustrates the input/output edit screen De0b when the output image So11b of the job image J1b is associated with another job input. From the state of the input/output edit screen De0b of FIG. 23, as the mouse cursor is superimposed on the output image So11b, a user interface IW12 for designating the job output associated with the output image So11b is displayed. In the example of FIG. 24, "In_1" IA1 representing the input image Si21b of the job image J2b is displayed as a candidate for a partner of association.

In addition, in the example of FIG. 24, at the second display part Da02b, only the job input that corresponds to the input image Si21b of the job image J2b is set as the job input. Therefore, only the display "In_1" IA1 representing the input image Si21b of the job image J2b is the candidate for the partner of association to be displayed in the user interface IW12. However, in a case where a plurality of job inputs are set at the second display part Da02b, a plurality of candidates for the partner of association can be displayed in the user interface IW12.

Figure 25:
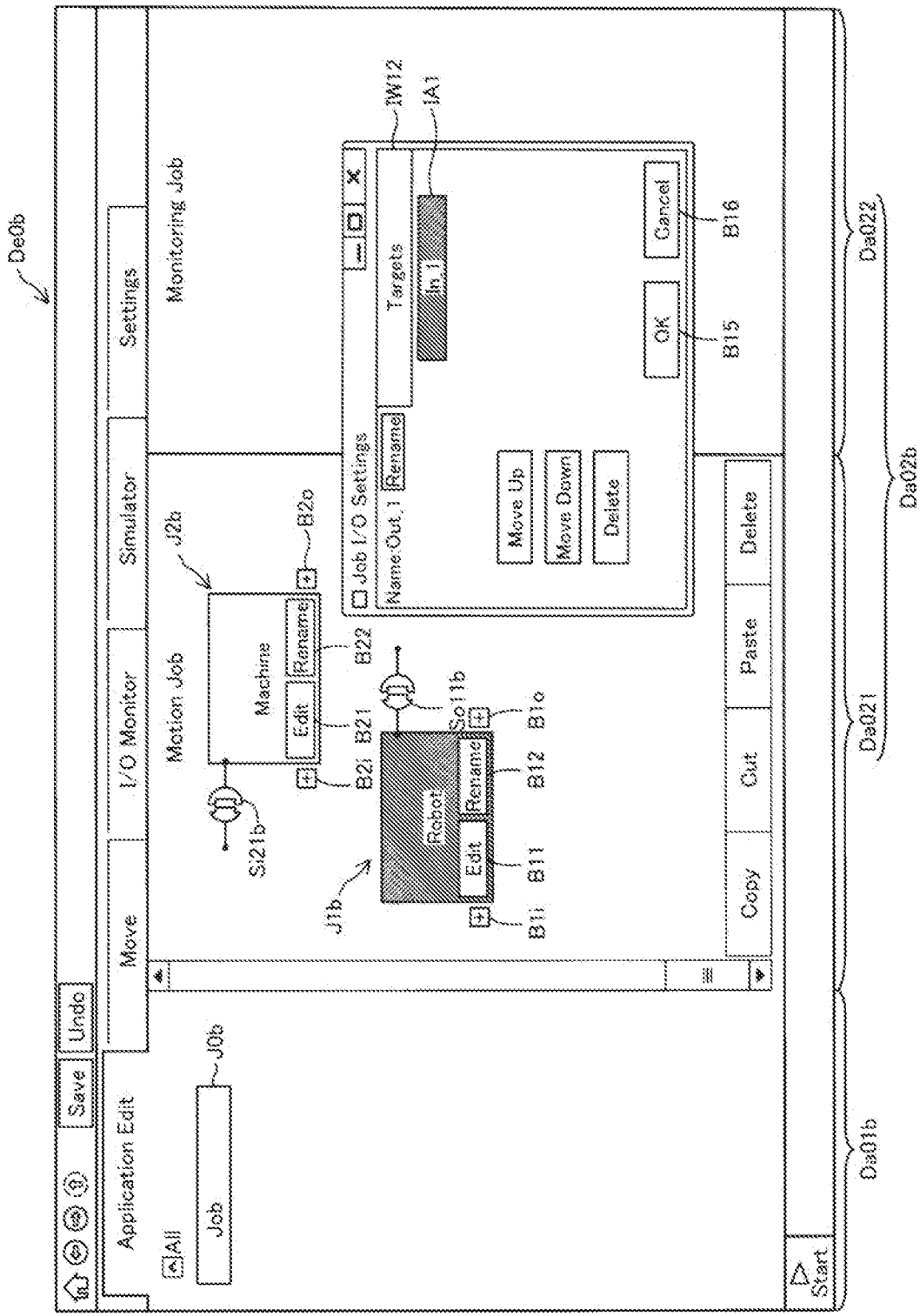
FIG. 25 illustrates the input/output edit screen in a state where "In_1" representing the input image of the job image is selected, in a user interface.

FIG. 25 illustrates the input/output edit screen De0b in a state where the "In_1" IA1 representing the input image Si21b of the job image J2b is selected, in the user interface IW12. In FIG. 16, since the display "In_1" IA1 has been selected, the display "In_1" IA1 is displayed in a color different from the display "In_1" IA1 in FIG. 24. When an "OK" button B15 is pressed, the input image Si21b that corresponds to the "In_1" IA1 selected in the user interface IW12 is set as a partner of association of the output image So11b. When the "Cancel" button B16 is pressed, the setting of a partner of association of the output image So11b is canceled.

Figure 26:
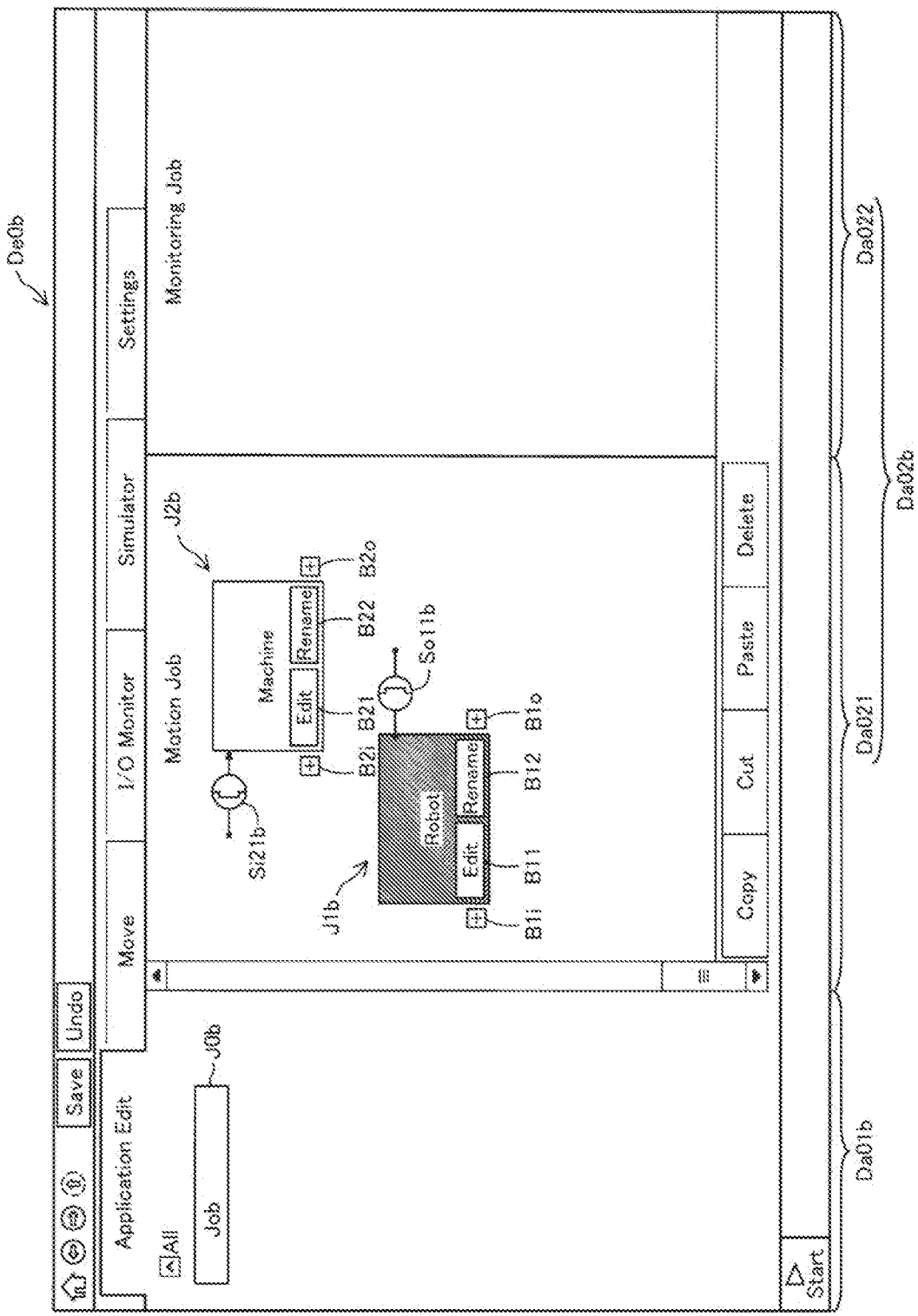
FIG. 26 illustrates a state where the input image of the job image is set as a partner of association of the output image of the job image.

FIG. 26 illustrates a state where the input image Si21b of the job image J2b is set as a partner of association of the output image So11b of the job image J1b. In a state of FIG. 25, by pressing the "OK" button B15, a state of FIG. 26 is realized. The output image So11b in FIG. 26 is an image different from the output image So11b in FIGS. 18 to 25 since the output image So11b is associated with the job input of another job. The output image So11b in FIG. 26 illustrates a state where the connector is coupled. In addition, the input image Si21b in FIG. 26 is an image different from the input image Si21b in FIGS. 23 to 25 since the input image Si21b is associated with the job output of another job. The input image Si21b in FIG. 26 illustrates a state where the connector is coupled. In FIG. 26, since the job image J1b is being edited, the display is performed in a color different from that of the job image J1b in FIG. 15.

In addition, similarly to the job image J1b of the robot 100 at the motion job part Da021 and the job image J2b of the processing device 800, at the monitoring job part Da022, the job image of the warning lamp 900 can be displayed, and the input/output of the warning lamp 900 can be edited.

B2. Second User Interface for Creating Operation Sequence

Figure 27:
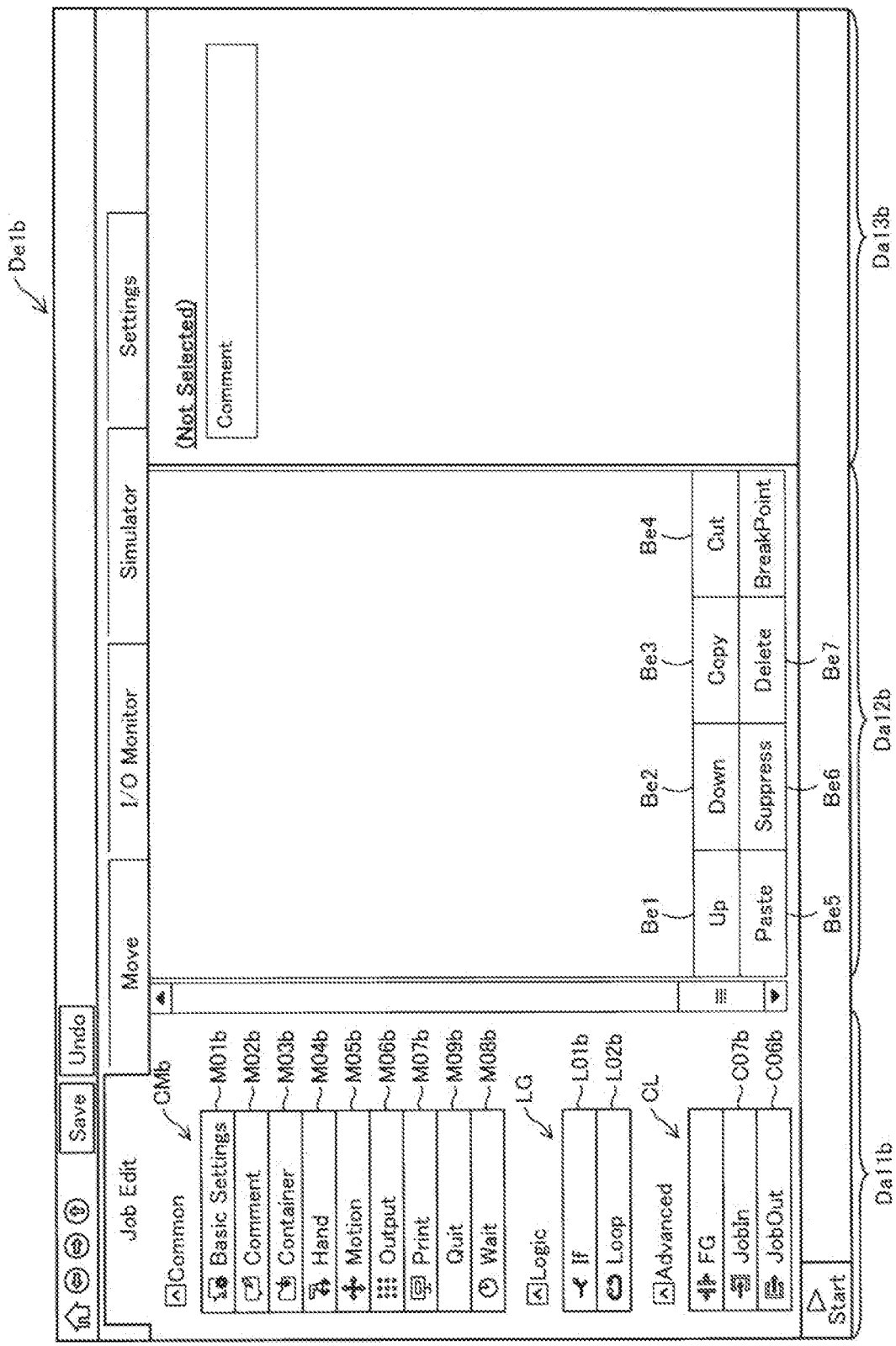
FIG. 27 is a diagram illustrating a sequence edit screen of the second embodiment to be displayed on the display of the setting device in step S110 of FIG. 2.

FIG. 27 is a diagram illustrating a sequence edit screen De1b of a second embodiment to be displayed on the display 602 of the setting device 600 in step S110 of FIG. 2. The sequence edit screen De1b is a user interface in which images representing one or more operations are selected among the images representing a plurality of operations and the operation sequence of the robot can be edited by arranging the image on the screen.

In a case where the image of one job is selected and the "Edit" button is pressed on the input/output edit screen De0b (refer to FIG. 15), the sequence edit screen De1b is displayed on the display 602. The operation sequence of the job to which the pressed "Edit" button belongs is the editing target on the sequence edit screen De1b. For example, in a state of FIG. 26, by pressing the "Edit" button B11 of the job image J1b, a state of FIG. 27 is realized.

The sequence edit screen De1b includes a first display part Da11b, a second display part Da12b, and a third display part Da13b.

The first display part Da11b is a user interface representing a plurality of selectable operations. The first display part Da11b includes an operation image CMb representing a plurality of selectable operations. The operation image CM representing the operation in the example of FIG. 27 includes "Hand" M04b, "Motion" M05b, "Output" M06b, "Print" M07b, "Wait" M08b, and "Quit" M09b. The first display part Da11 also includes other displays. In addition, in the embodiment, "Basic Settings" M01b, "Comment" M02b, and "Container" M03b are also defined as "operation image" in a broad sense and will be described below.

The "Basic Settings" M01b is a user interface for adding processing for determining basic settings of one operation subject, such as the robot 100 or the processing device 800. The "Comment" M02b is a user interface for adding comments to be embedded in the program list expressed in a programming language. The comments are embedded in the program list in order to make the contents of the operation sequence easier for the user to understand.

The "Container" M03b is a user interface for adding a plurality of sets of operations. The "Hand" M04b is a user interface for adding processing of which a control target is a manipulator that serves as an end effector. The "Motion" M05b is a user interface for adding an operation for moving the control target. The "Output" M06b is a user interface for adding an operation for outputting a signal to the outside by the control target that serves as an operation subject. The "Print" M07b is a user interface for adding an operation for outputting a message that can be recognized by the user to the outside by a control target that serves as an operation subject. The "Wait" M08b is a user interface for adding an operation for stopping the processing until a predetermined event occurs. The "Quit" M09b is a user interface for adding processing for stopping the operation that has been done so far.

The first display part Da11b further includes an operation image LG representing a plurality of logics that can be selected in creating the operation sequence. In the example of FIG. 6, the operation image LG representing the operation includes "If" L01b and "Loop" L02b. In addition, in the embodiment, the following description about the technology will be made while the "If" L01b and the "Loop" L02b are also "operation image" in a broad sense.

The first display part Da11b further includes an operation image CL that represents cooperation of selectable operations in creating the operation sequence. In the example of FIG. 9, the operation image CL includes "JobOut" C06b and "JobIn" C07b.

The "JobOut" C06b is a user interface for adding processing for performing an output to a designated port of other configuration elements of the workstation WS, triggered by the associated operation. The "JobIn" C07b is a user interface for adding processing for performing a predetermined operation waiting for an input to the designated port from other configuration elements of the workstation WS.

At the second display part Da12b, the operation sequence is displayed in a format of arrangement of operations selected via the first display part Da11b. At the second display part Da12b, the operation sequence can be edited by editing the arrangement of the operations. In a state of FIG. 28, since the user has not yet selected the operation that configures the operation sequence, the image representing the operation sequence is not displayed at the second display part Da12b. By selecting and clicking the display from the operation image CM of the first display part Da11b, the user can arrange the operations that configure the operation sequence at the second display part Da12b.

Edit buttons Be1 to Be7 are included in the lower part of the second display part Da12b. The functions of the edit buttons Be1 to Be7 will be described later.

At the third display part Da13b, the properties of the operations included in the operation sequence displayed at the second display part Da12b are displayed, and the values of the properties are set. In the state of FIG. 27, since the operations that configure the operation sequence have not yet been selected, the image related to the properties of the operations is not displayed at the third display part Da13b.

Figure 28:
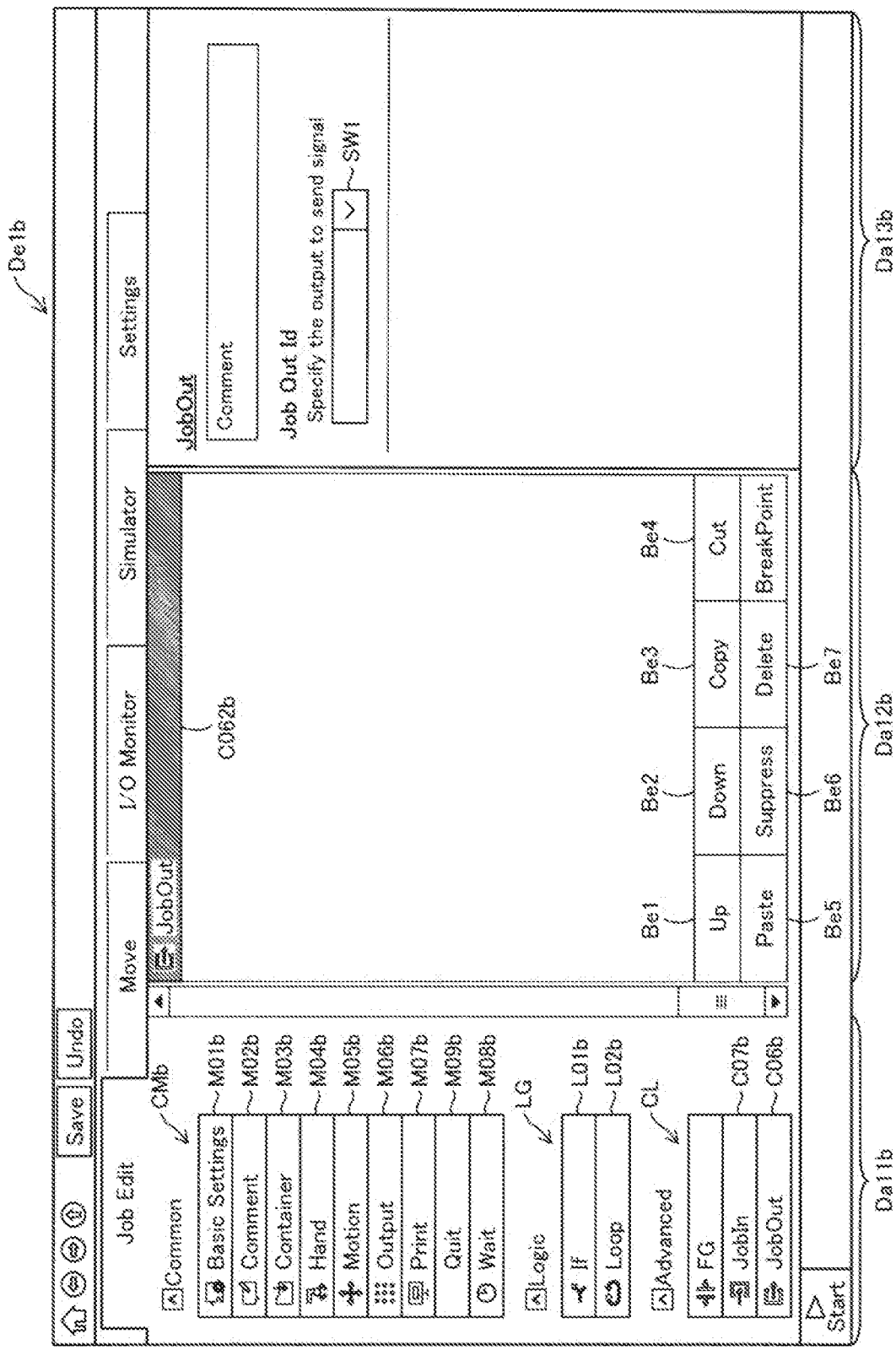
FIG. 28 illustrates the sequence edit screen in a state where an operation of the job output is added to a job of the robot which is an editing target.

FIG. 28 illustrates the sequence edit screen De1b in a state where an operation of the job output is added to the job of the robot 100 which is an editing target. In the state of FIG. 27, by pressing the "JobOut" C06b of the first display part Da11b, the state of FIG. 28 is realized. At the second display part Da12b of the sequence edit screen De1b, "JobOut" C062b that corresponds to the operation of the job output of the robot 100 is displayed.

The edit buttons Be1 to Be7 are displayed at the lower part of the second display part Da12b. The operation displayed at the upper part of the second display part Da12b can be edited by the edit buttons Be1 to Be7. When the user clicks and selects a display that corresponds to each operation displayed at the upper part of the second display part Da12b and presses the "Up" edit button Be1, the clicked operation moves to the next higher row in the display at the upper part of the second display part Da12b. Similarly, when the "Down" edit button Be2 is pressed, the clicked operation moves to the next lower row in the display at the upper part of the second display part Da12b. However, in the state of FIG. 28, since only the output image "JobOut" C062b is displayed as the operation, the "Up" edit button Be1 and the "Down" edit button Be2 do not substantially function.

Similarly, the "Copy" edit button Be3 has a copy function. The "Cut" edit button Be4 shows a cutting function. The copy or cut operation is stored in the RAM 630 (refer to FIG. 1) and is pasted within the display at the upper part of the second display part Da12b by pressing the "Paste" edit button Be5.

The "Delete" edit button Be7 shows a cutting function. When the user clicks and selects a display that corresponds to each operation displayed at the upper part of the second display part Da12b and presses the "Suppress" edit button Be6, the clicked operation is processed similarly to that in a case of not being displayed at the upper part of the second display part Da12b in processing of steps S120 to S140 and processing of S200 of FIG. 2 while being displayed at the part of the second display part Da12b.

At the third display part Da13b, the properties of the selected operations among the operations included in the operation sequence displayed at the second display part Da12b are displayed. Specific contents of the selected operation properties are set via the third display part Da13b (refer to S120 of FIG. 2). In the state of FIG. 28, since the operation of the "JobOut" C062b is selected at the second display part Da12b, at the third display part Da13b, a screen for setting the properties of the operation of the job output represented by the "JobOut" C062b is displayed.

At the third display part Da13b, a user interface SW1 for designating an output destination port of the job output, that is, an output port, is displayed as a property of the operation of the job output represented by the "JobOut" C062b.

Figure 29:
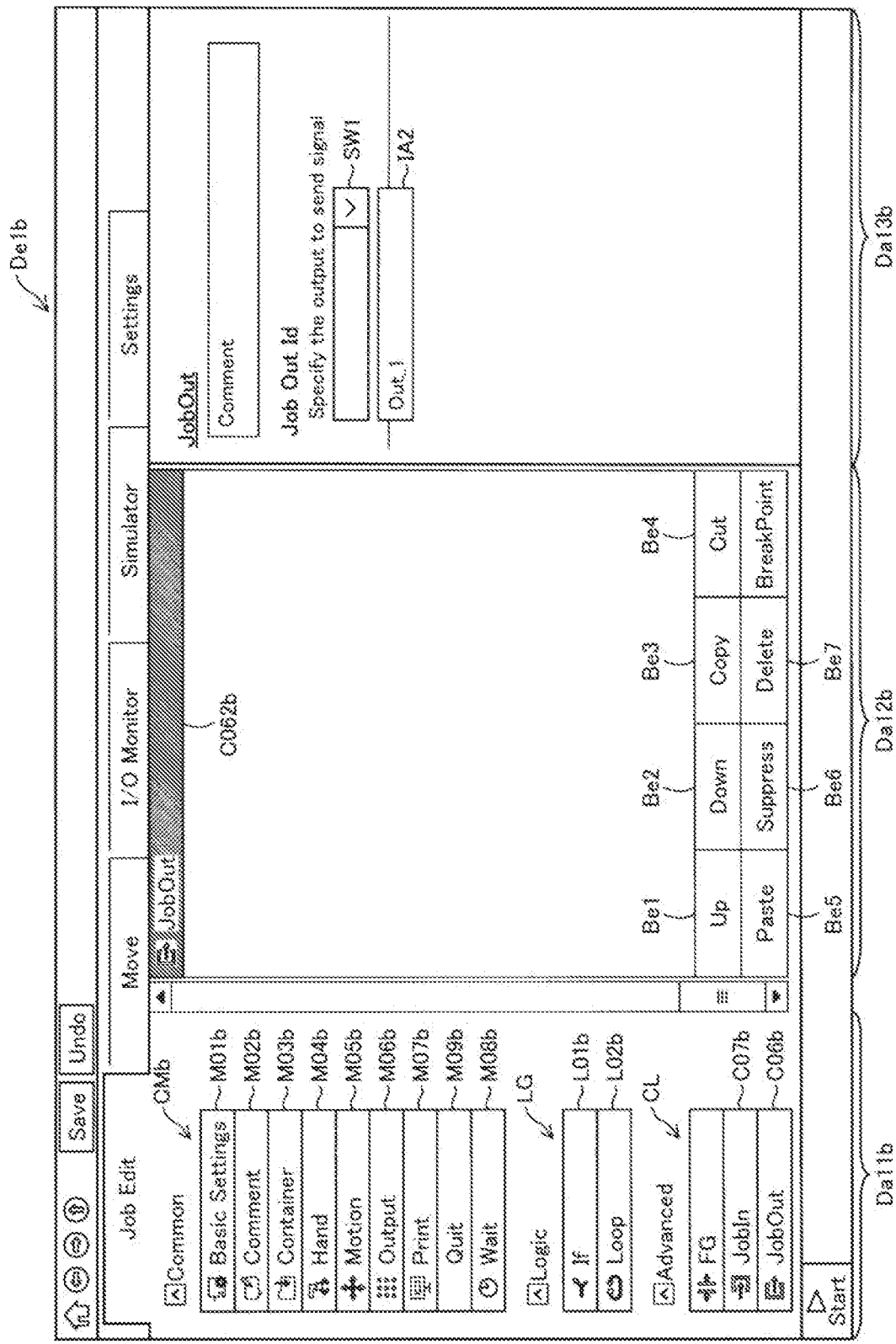
FIG. 29 illustrates the input/output edit screen when an output port of the job output of "JobOut" is designated.

FIG. 29 illustrates the input/output edit screen De1b when the output port of the job output of "JobOut" C062b is designated. As the user interface SW1 is clicked from the state of the input/output edit image screen De1b of FIG. 28, a candidate for the output port of the job output of the "JobOut" C062b is displayed. In FIG. 29, "Out_1" IA2 representing only the output image So11b (refer to FIG. 26) set for the job image J1b at this time is displayed as a candidate for the output port of the job output.

Figure 30:
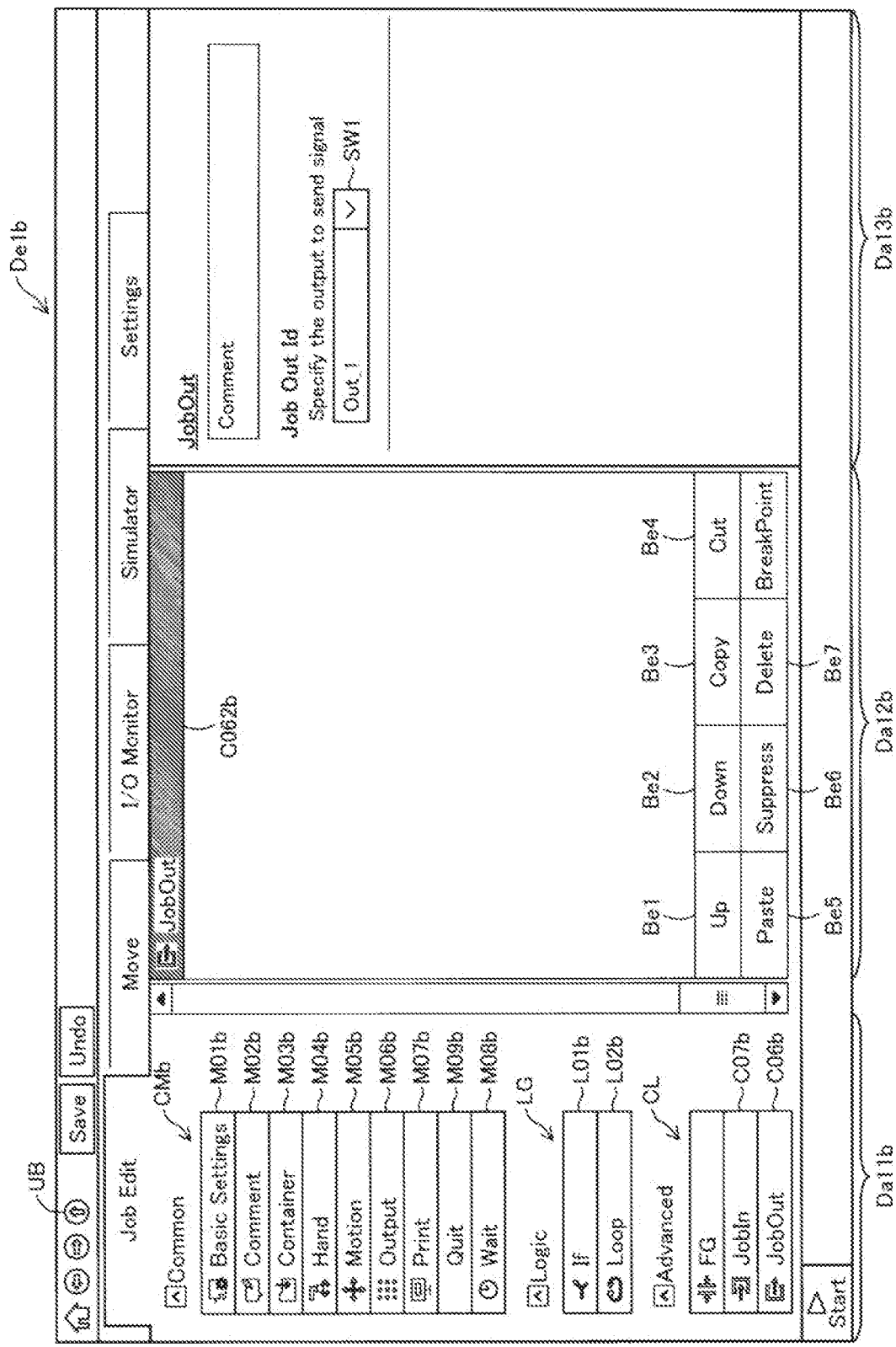
FIG. 30 illustrates the input/output edit screen in a state where "Out_1" representing the output image of the job image is selected, in a user interface.

FIG. 30 illustrates the input/output edit screen De1b in a state where the "Out_1" representing the output image So11b of the job image J1b is selected, in the user interface SW1. After this, when the button UB illustrated in the upper left is pressed, the input/output edit screen De0b is displayed (refer to FIG. 26).

Figure 31:
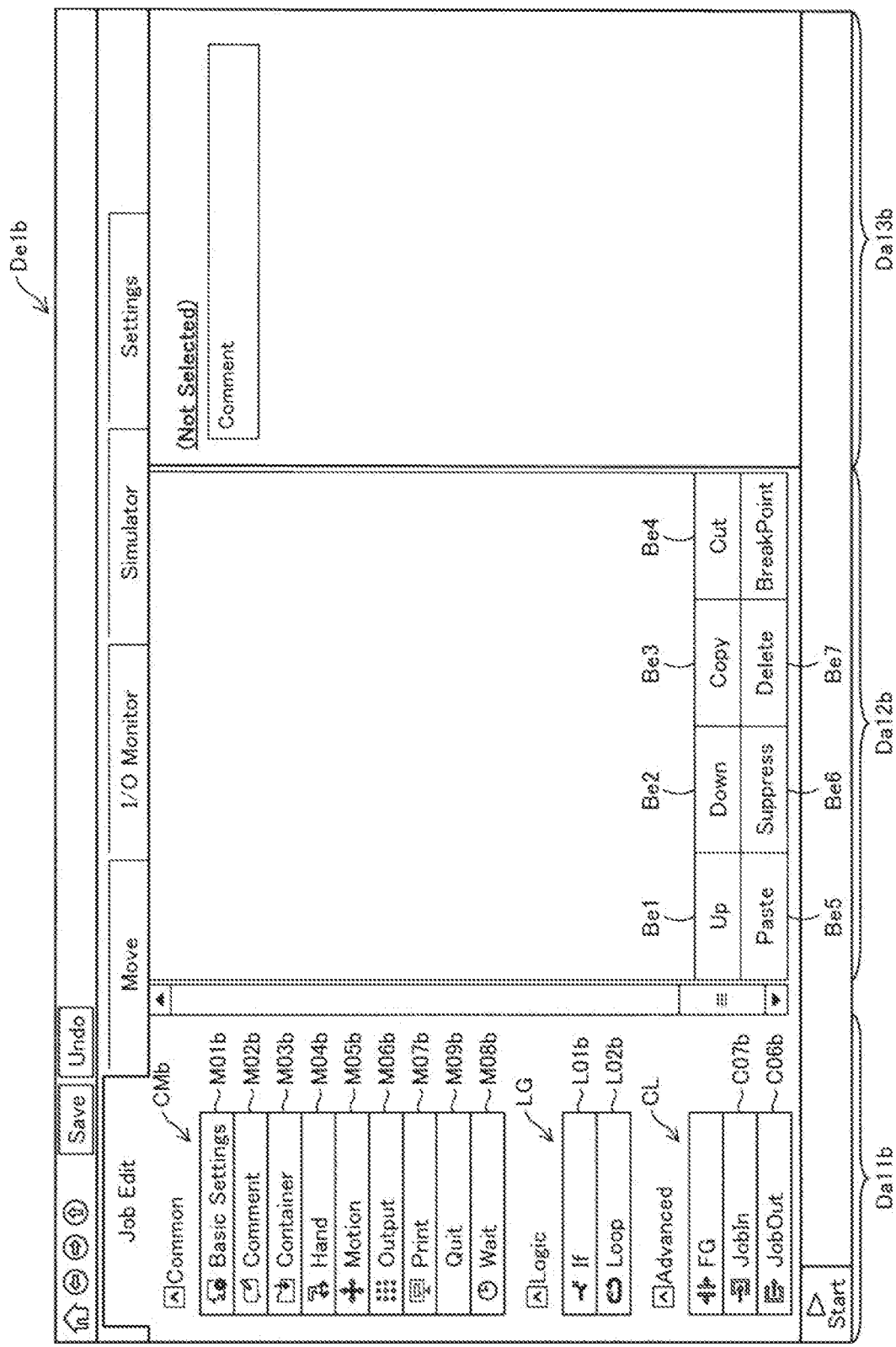
FIG. 31 is a diagram illustrating the sequence edit screen of the second embodiment to be displayed on the display of the setting device in step S110 of FIG. 2.

FIG. 31 is a diagram illustrating the sequence edit screen De1b of the second embodiment to be displayed on the display 602 of the setting device 600 in step S110 of FIG. 2. For example, in the state of FIG. 26, by pressing the "Edit" button B21 of the job image J2b, a state of FIG. 31 is realized.

In the state of FIG. 31, since the user has not yet selected the operation that configures the operation sequence, the image representing the operation sequence is not displayed at the second display part Da12b. In addition, since the operation that configures the operation sequence has not yet been selected, the image related to the property of the operation is not displayed at the third display part Da13b.

Figure 32:
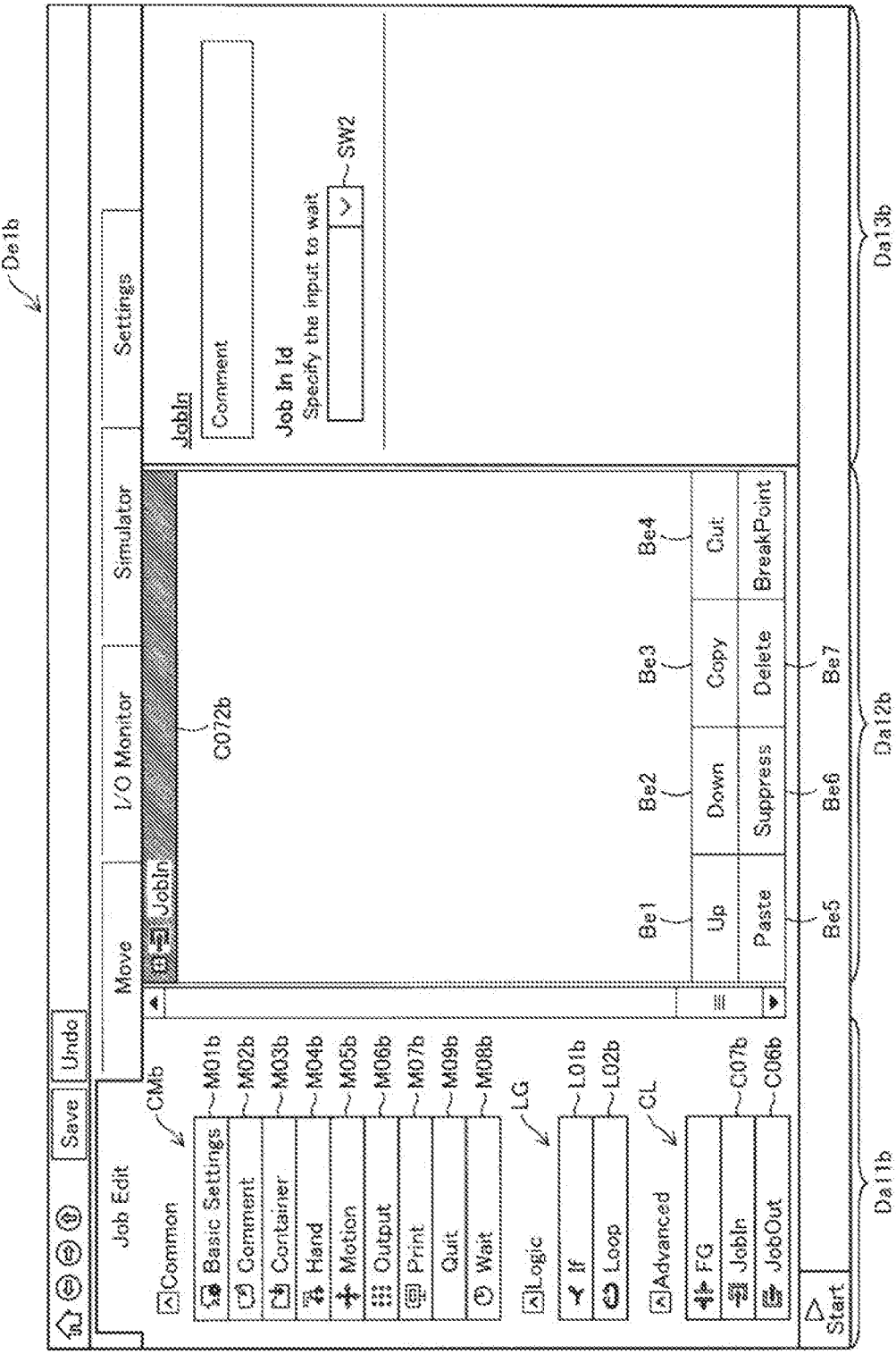
FIG. 32 illustrates the sequence edit screen in a state where an operation of the job input is added to a job of a processing device which is an editing target.

FIG. 32 illustrates the sequence edit screen De1b in a state where an operation of the job input is added to the job of the processing device 800 which is an editing target. In the state of FIG. 31, by pressing the "JobIn" C07b of the first display part Da11b, a state of FIG. 32 is realized. At the second display part Da12b of the sequence edit screen De1b, "JobIn" C072b that corresponds to the operation of the job input of the processing device 800 is displayed.

In the state of FIG. 32, since the "JobIn" C072b is selected at the second display part Da12b, at the third display part Da13b, a screen for setting the properties of the job output represented by the "JobIn" C072b is displayed.

At the third display part Da13b, a user interface SW2 for designating a port of for receiving the job input, that is, an input port, is displayed as properties of the operations of the job input represented by the "JobIn" C072b.

Figure 33:
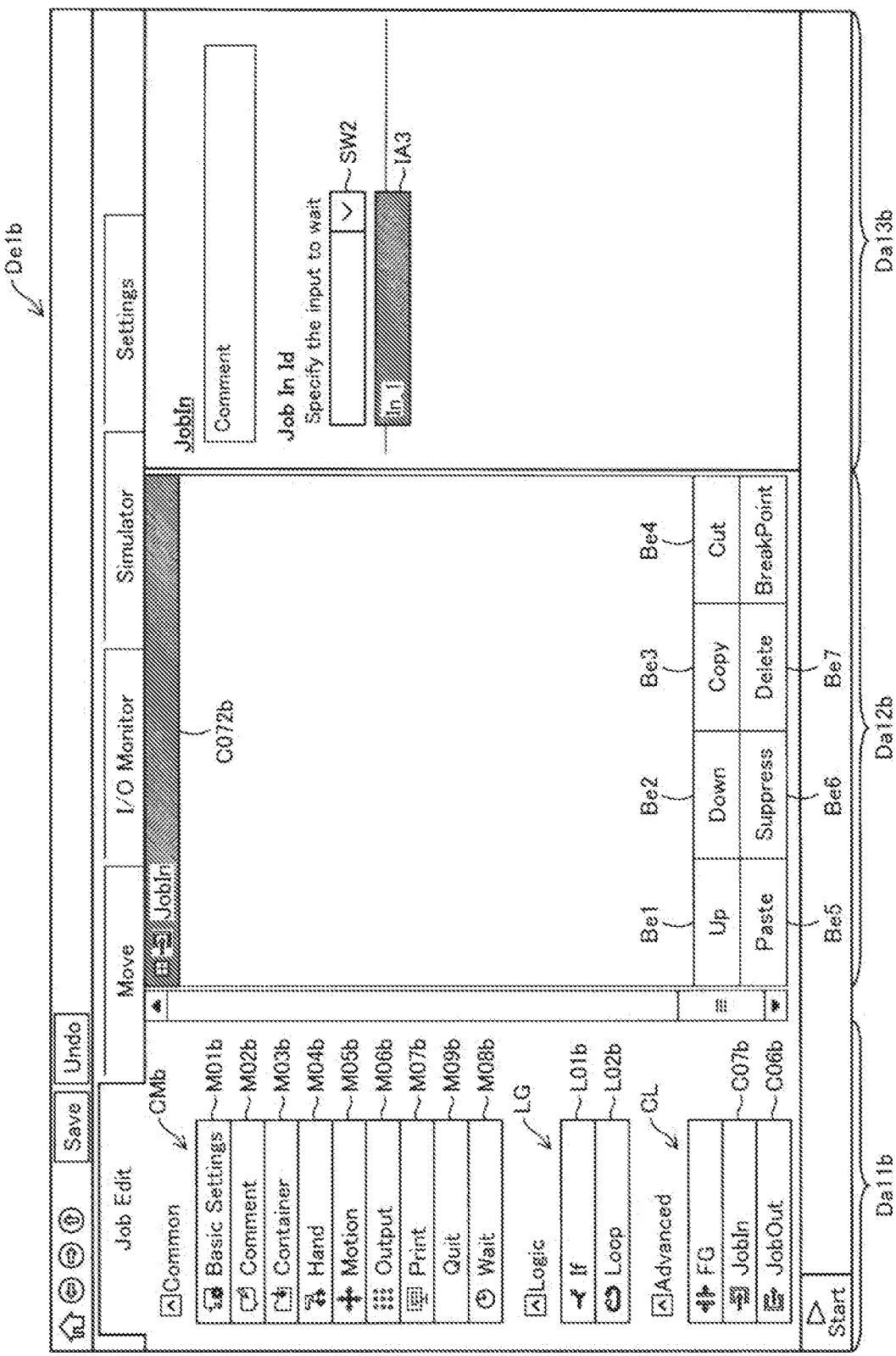
FIG. 33 illustrates the input/output edit screen when an input port of the job input of "JobIn" is designated.

FIG. 33 illustrates the input/output edit screen De1b when the input port of the job input of the "JobIn" C072b is designated. As the user interface SW2 is clicked from the state of the input/output edit image screen De1b of FIG. 32, a candidate for the input port of the job input of the "JobIn" C072b is displayed. In FIG. 33, "In_1" IA3 representing only the input image Si21b (refer to FIG. 26) set as the job image J2b at this time is displayed as a candidate for the input port of the job input.

Figure 34:
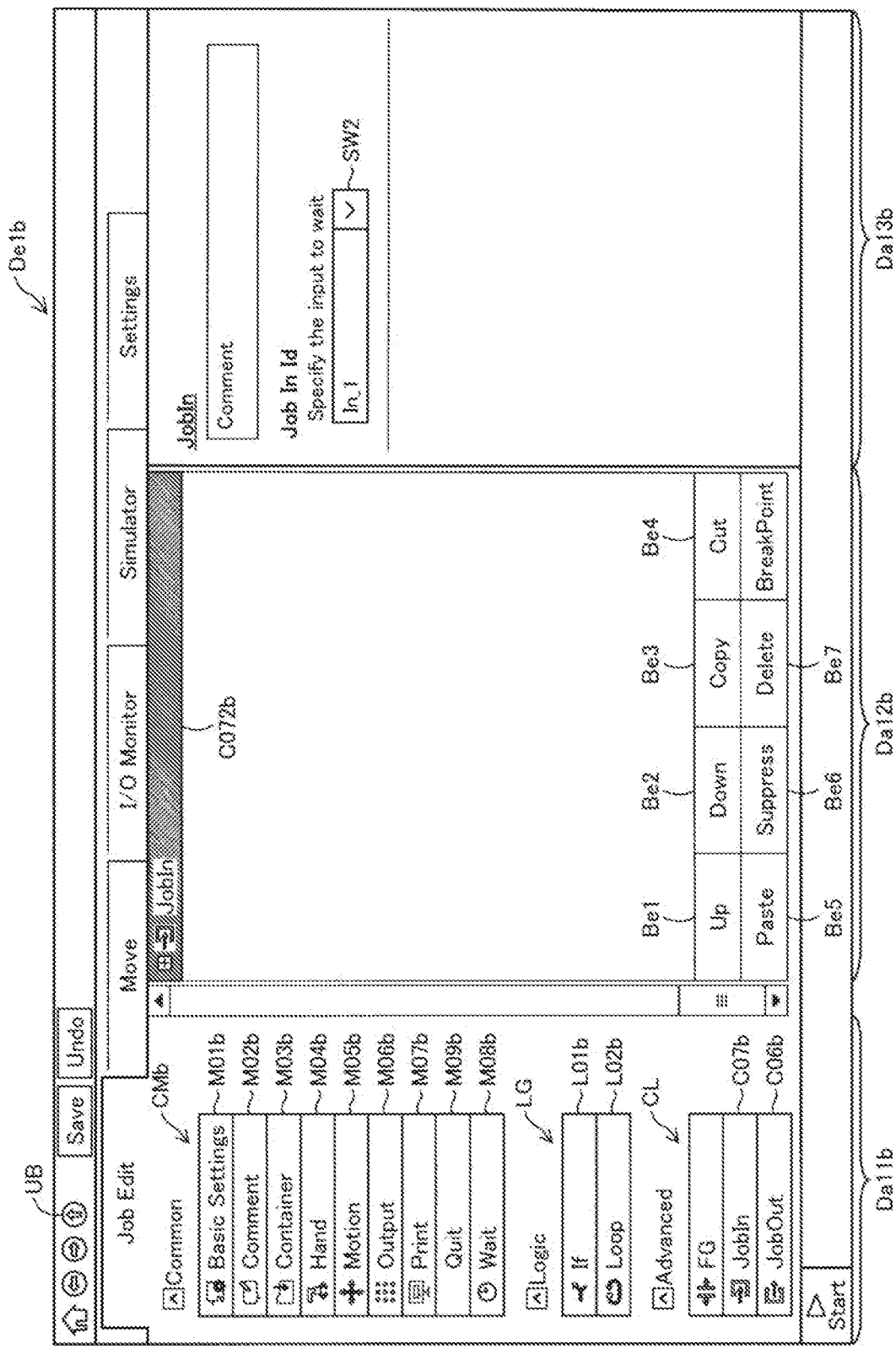
FIG. 34 illustrates the input/output edit screen in a state where "In_1" representing the input image of the job image is selected, in a user interface.

FIG. 34 illustrates the input/output edit screen De1b in a state where the "In_1" representing the input image Si21b of the job image J2b is selected, in the user interface SW2. After this, when the button UB is pressed, the input/output edit screen De0b is displayed (refer to FIG. 26).

The job image J1b representing the job of the robot 100 in the embodiment is also referred to as "first image". The output image So11b following the job image J1b is also referred to as "first input/output image". The job image J2b of the processing device 800 is also referred to as "second image". The input image Si21b following the job image J2b is also referred to as "second input/output image".

C. Third Embodiment

Figure 35:
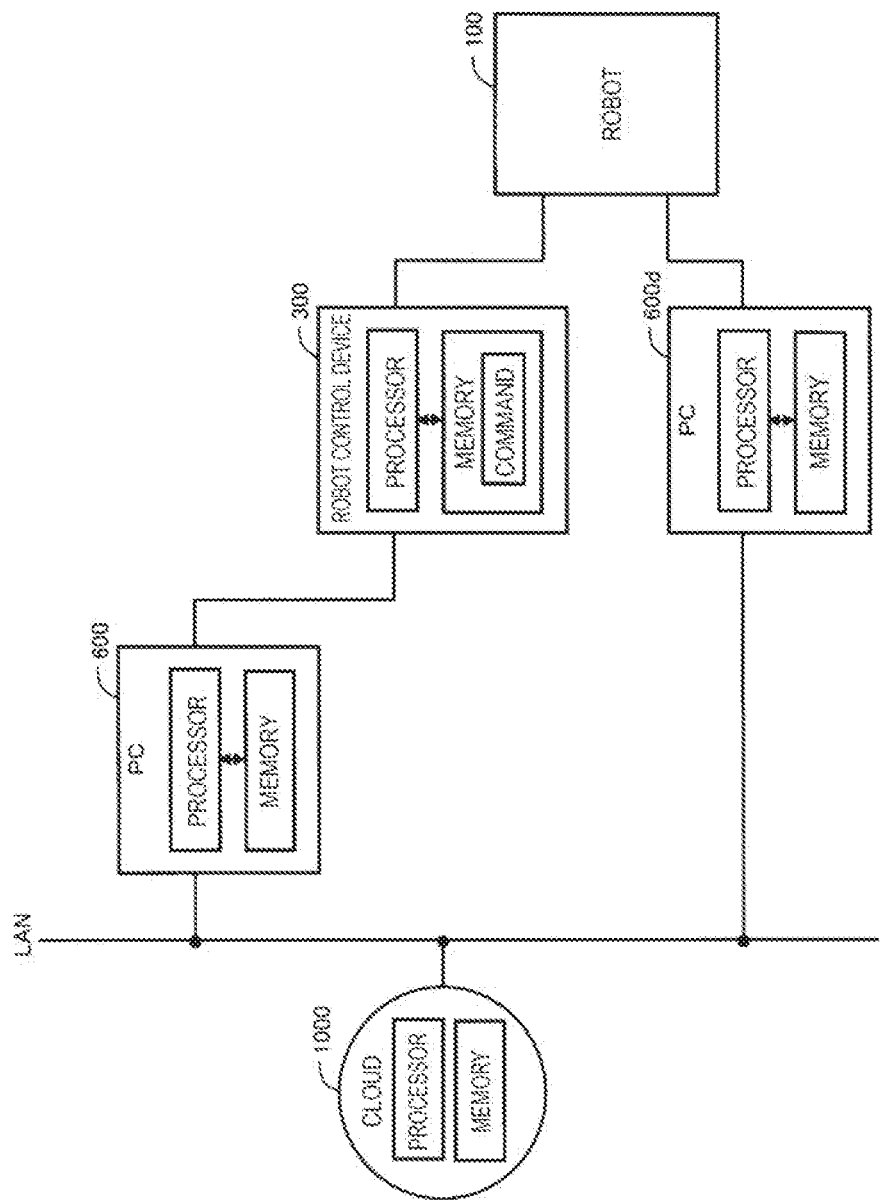
FIG. 35 is a conceptual diagram illustrating an example in which the control device of the robot is configured with a plurality of processors.

FIG. 35 is a conceptual diagram illustrating an example in which the control device of the robot is configured with a plurality of processors. The example is different from FIG. 1 in that the robot control device 300 of the robot 100 is provided on the outside of the robot 100. Further, in the example, in addition to the robot 100 and the robot control device 300, personal computers 600 and 600d that serve as setting devices and a cloud service 1000 provided via a network environment, such as LAN, are drawn. The personal computers 600 and 600d respectively include a processor and a memory. In addition, in the cloud service 1000, the processor and the memory can also be used. The processor executes computer-executable commands. It is possible to realize the robot control device and the setting device of the robot 100 by using a part or all of the plurality of processors.

D. Other Aspects

D1. Another Aspect 1

(1) In the first embodiment, the "Job 1 Robot" J1 that serves as the first image is followed by a plurality of inputs and outputs (refer to FIG. 4). However, as illustrated in the second embodiment, the first image may be followed by only one output (refer to J1b of FIG. 15). In other words, the first image may be followed by one or more first input/output images that respectively represent one or more robot inputs and outputs.

In the above-described first embodiment, the "Job 2 Robot" J2 that serves as the second image is followed by a plurality of inputs and outputs (refer to FIG. 4). However, as illustrated in the first embodiment and the second embodiment, the second image may be followed by only one input (refer to J3 of FIG. 4 and J2b of FIG. 15). In other words, the second image may be an image followed by one or more second input/output images that respectively represent device input/output of the input/output of the processing device.

In addition, in the specification, "one or more inputs and outputs" is a concept including "one or more inputs which is not followed by output", "one or more outputs which are not followed by input", and "one or more inputs and one or more outputs".

(2) In the above-described embodiment, the creation of the program file 305 (refer to S140 of FIG. 2) is performed after creation of a sequence (refer to S110 of FIG. 2), setting of properties (refer to S120 of FIG. 2), and jogging and teaching (refer to S130 in FIG. 2). However, the creation of the program file 305 can also be performed, for example, when creating (refer to S110 in FIG. 2) a sequence via the sequence edit screens De1 and De1b and setting (refer to S120 in FIG. 2) the properties. In the aspect, for example, the program file 305 may be created as the user presses a predetermined button that can be provided on the sequence edit screens De1 and De1b. In addition, the creation of the program file 305 can also be a function that is automatically performed every time the contents are changed in the creation (refer to SI10 in FIG. 2) of the sequence and the setting (refer to S120 in FIG. 2) of the properties via the sequence edit screens De1 and De1b.

(3) In the above-described embodiment, the value of the parameter that determines the control point of the robot 100 is determined by the jogging and teaching (refer to S130 in FIG. 2). However, it is also possible for the user to directly move the arm 110 of the robot 100, and to determine the value of the parameter that determines the control point of the robot 100. In addition, by machine learning and simulation, it is also possible to determine the value of the parameter that determines the control point of the robot 100.

(4) In the above-described embodiment, the display 602 of the setting device 600 functions as a display unit for displaying the input/output edit screen. However, it is also possible to make the display having a teaching pendant function as a display unit for displaying the input/output edit screen. In addition, it is preferable that the display unit for displaying the input/output edit screen is a touch panel which functions as an input device capable of receiving information.

D2. Another Aspect 2

In the first embodiment, on the input/output edit screen De0, the input/output image can be added to the "Job 1 Robot" J1 (refer to FIG. 6). In addition, on the input/output edit screen De0, it is also possible to add the input/output image to the jobs (in the first embodiment, "Job 2 Device" J2 and "Job 3 Warning Lamp" J3) other than the "Job 1 Robot" J1 (refer to FIG. 7). In the second embodiment, on the input/output edit screen De0b, it is possible to add the input/output image to the job image Jib of the robot 100 (refer to FIGS. 16 to 18). In the second embodiment, on the input/output edit screen De0b, it is possible to add the input/output image to the job image (in the second embodiment, job image J2b) of the configuration element other than the robot 100 (refer to FIGS. 21 to 23).

However, it is also possible to adopt an aspect in which the input/output image cannot be added on the input/output edit screen and the input/output image can be added on the sequence edit screen (refer to FIGS. 9, 27, 28, 31, and 32). Further, it is also possible to employ a configuration in which the input/output image can be added on the input/output edit screen only for one of the robots and the configuration other than the robot.

D3. Another Aspect 3

(1) On the input/output edit screens De0 and De0b of the above-described embodiments, the input/output image which is an input/output image of the robot 100 and is correlated with the input/output image of other configuration elements (here, the processing device 800 or the warning lamp 900), is an image different from the output image which is not correlated with the input/output image of other configuration elements (refer to FIGS. 4, 7, 15, and 23).

However, the first input/output image which is a first input/output image representing the input of the robot and is correlated with the second input/output image representing the output of the processing device, may be a display which is the same as the first input/output image that is not correlated with the second input/output image representing the output of the processing device.

(2) On the input/output edit screens De0 and De0b of the above-described embodiments, the input/output image which is an input/output image of other configuration elements (the processing device 800 or the warning lamp 900) other than the robot 100 and is correlated with the input/output image of the robot, is an image different from the output image which is not correlated with the input/output image of the robot (refer to FIGS. 4, 7, 15, and 23).

However, the second input/output image which is a second input/output image representing the input of the processing device and is correlated with the first input/output image representing the output of the robot, may be an image which is the same as the second input/output image that is not correlated with the first input/output image representing the output of the robot.

D4. Another Aspect 4

(1) On the sequence edit screens De1 and De1b of the above-described embodiments, it is possible to select an image representing one operation among the images representing a plurality of operations and to edit the operation sequence of the robot by arranging the image on the screen (refer to FIGS. 9 and 28 to 34). However, it is also possible to employ an aspect in which the setting device 600 that serves as a control device does not provide such a sequence edit screen, and provides an edit screen that can edit the program list in which the operation sequence is expressed in a programming language.

(2) On the sequence edit screen De1 of the above-described first embodiment, it is possible to set the properties with respect to the input/output of the robot 100 in which the input/output image is displayed on the input/output edit screen De0 and the input/output of the other configuration elements in which the input/output image is displayed on the input/output edit screen De0 (refer to FIG. 9). On the sequence edit screen De1b of the above-described second embodiment, it is also possible to set the properties with respect to the input/output of the robot 100 and the input/output of other configuration elements (refer to FIGS. 28 to 30 and 32 to 34).

However, it is also possible to employ an aspect in which the setting device 600 that serves as a control device does not provide such a sequence edit screen, and provides an edit screen that can set the parameters that correspond to the properties, for example, in the program list in which the operation sequence is expressed in a programming language.

In addition, it is also possible to employ an aspect in which the setting device 600 that serves as a control device does not provide such a sequence edit screen, and can set the properties of the input/output, for example, on the input/output edit screen.

D5. Another Aspect 5

In the above-described embodiment, on the input/output edit screen De0, by associating the input/output image of the robot 100 and the input/output image of other configuration elements with each other, it is possible to designate whether or not the processing to be executed in association with an output for designating the input/output relationship in one of the robot 100 and other configuration elements and the processing to be executed in association with an input for designating the input/output relationship in the other one are synchronized with each other (refer to Da01 of FIG. 4).

However, on the input/output edit screen, it is also possible to employ an aspect in which such a designation cannot be made, and on other screens, such as the sequence edit screen, it is possible to designate whether or not the processing on the input side and the processing on the output side are synchronized with each other.

D6. Another Aspect 6

(1) In the above-described first embodiment, the initial value of the variable L1_R is 0, and is set to 1 in a case where a predetermined condition is satisfied (refer to Cj21 of FIG. 11 and t12 of FIG. 12). In addition, the initial value of the variable L1_S is 0, and is set to 1 in a case where a predetermined condition is satisfied (refer to Cj22 of FIG. 11 and t14 of FIG. 12). However, the initial value of the variable for realizing the synchronous processing may be a value other than 0, and a value set in a case where a predetermined condition is satisfied may be a value other than 1. The initial value can be any value, such as 10 or 100. A value to be set in a case where a predetermined condition is satisfied can be any value different from the initial value.

(2) In the above-described first embodiment, by preparing the variable L1_S on the transmission side and the variable L1_R on the reception side and by rewriting the variables on the reception side to the job on the transmission side, the synchronous processing is realized (refer to FIGS. 10 to 12). However, the synchronous processing can also be processing other than processing based on such variables or parameters. For example, while providing a command for monitoring the state of another job in a certain job, the synchronous processing may be performed based on the command.

D7. Another Aspect 7

In the above-described first embodiment, by associating the input/output image of the robot 100 and the input/output image of other configuration elements with each other, it is possible to designate whether the processing to be executed in association with a target output in one of the robot 100 and other configuration elements and the processing to be executed in association with a target input in the other one are performed as sequential processing without synchronization or as batch processing without synchronization (refer to Si2 and Si3 of FIG. 4).

However, on the input/output edit screen, it is also possible to employ an aspect in which such a designation cannot be made, and on other screens, such as the sequence edit screen, it is possible to designate whether the processing on the input side and the processing on the output side are asynchronous sequential processing or asynchronous batch processing.

D8. Another Aspect 8

(1) In the above-described first embodiment, the initial value of the variable L3_R is 0, and is increased only by 1 in a case where a predetermined condition is satisfied (refer to Cj17 and Cj25 of FIG. 13 and t22, t24, and t25 of FIG. 14). In addition, the variable L3_R is reduced only by 1 in a case where a predetermined condition is satisfied (refer to Cj32 of FIG. 13 and t23, t26, and t27 of FIG. 14).

However, the initial value of the variable for realizing the asynchronous processing may be a value other than 0, and an amount of change (that is, change amount) to be performed in a case where a predetermined condition is satisfied may be a value other than 1. The initial value can be any value, such as 10 or 100. The change amount can be any value, such as 5 or 70.

In addition, the processing performed in a case where a predetermined condition is satisfied in the job on the transmission side is not limited to the increase in the variable by the predetermined amount, but may be the decrease in the variable by the predetermined amount. The processing performed in a case where a predetermined condition is satisfied in the job on the reception side is not limited to the decrease in the variable by the predetermined amount, but may be the decrease in the variable by the predetermined amount. However, it is preferable that the direction of the modification of the variable performed in the job on the transmission side in a case where the condition is satisfied and the direction of the modification of the variable performed in the job on the reception side in a case where the condition is satisfied are opposite to each other.

(2) In the above-described first embodiment, by preparing the variable L3_R on the reception side and by rewriting the variables on the reception side to the job on the transmission side, the asynchronous sequential processing and the asynchronous batch processing are realized (refer to FIGS. 10, 13, and 14). However, the asynchronous sequential processing and the asynchronous batch processing can also be processing other than processing based on such variables or parameters. For example, while providing a command for monitoring the state of another job in a certain job, the asynchronous sequential processing and the asynchronous batch processing may be performed based on the command.

E. Still Other Aspects (1) Still Another Aspect 1

Application Example 1

A control device is provided. The control device includes: a first image that represents one robot; one or more first input/output images that respectively represent a robot input/output which is an input/output of the robot; a second image that represents one peripheral device; one or more second input/output images that respectively represent an device input/output which is an input/output of the peripheral device; a display control unit that is capable of displaying an input/output edit screen that is capable of accepting an input/output relationship in which an output of the robot is an input of the peripheral device by associating a first input/output image selected among the one or more first input/output images with a second input/output image selected among the one or more second input/output images, on a display unit; and an operation control unit that controls the robot based on the input/output relationship.

According to the aspect, by designating the input/output relationship in the collaboration between the peripheral device that operates together with the robot and the robot by a visual operation via the input/output edit screen, it is possible to create a sequence of the collaboration with the robot.

Application Example 2

In the above-described control device, it is possible to employ an aspect in which the display control unit is capable of displaying an input/output edit screen on which the first input/output image can be added to the first image and the second input/output image can be added to the second image, on the display unit as the input/output edit screen.

According to the aspect, the user can add the correlated input/output to the robot and the peripheral device without using different screens.

Application Example 3

In the above-described control device, it is possible to employ an aspect in which the display control unit is capable of displaying the input/output edit screen on which a first input/output image that is a first input/output image representing an input of the robot and is correlated with the second input/output image representing an output of the peripheral device, is an image different from a first input/output image that is the first input/output image representing the input of the robot and is not correlated with the second input/output image representing the output of the peripheral device, among the one or more first input/output images, on the display unit as the input/output edit screen.

According to the aspect, the user can easily specify the first input/output image which is not correlated with the output of the peripheral device, and can correlate the output of the peripheral device with the second input/output image. As a result, it is possible to easily designate the input/output relationships between the robot and the peripheral device.

Application Example 4

In the above-described control device, it is possible to employ an aspect in which the display control unit is capable of displaying the input/output edit screen on which a second input/output image that is a second input/output image representing the input of the peripheral device and is correlated with the first input/output image representing the output of the robot, is an image different from a second input/output image that is the second input/output image representing the input of the peripheral device and is not correlated with the first input/output image representing the output of the robot, among the one or more second input/output images, on the display unit as the input/output edit screen.

According to the aspect, the user can easily specify the second input/output image which is not correlated with the output of the robot, and can correlate the output of the robot with the first input/output image. As a result, it is possible to easily designate the input/output relationships between the robot and the peripheral device.

Application Example 5

In the above-described control device, it is possible to employ an aspect in which the display control unit is capable of displaying the input/output edit screen on which a first input/output image that is a first input/output image representing the output of the robot and is correlated with the second input/output image representing the input of the peripheral device, is an image different from a first input/output image that is the first input/output image representing the output of the robot and is not correlated with the second input/output image representing the input of the peripheral device, among the one or more first input/output images, on the display unit as the input/output edit screen.

According to the aspect, the user can easily specify the first input/output image which is not correlated with the input of the peripheral device, and can correlate the input of the peripheral device with the second input/output image. As a result, it is possible to easily designate the input/output relationships between the robot and the peripheral device.

Application Example 6

In the above-described control device, it is possible to employ an aspect in which the display control unit is capable of displaying the input/output edit screen on which a second input/output image that is a second input/output image representing an output of the peripheral device and is correlated with the first input/output image representing an input of the robot, is a image different from a second input/output image that is the second input/output image representing the output of the peripheral device and is not correlated with the first input/output image representing the input of the robot, among the one or more second input/output images, on the display unit as the input/output edit screen.

According to the aspect, the user can easily specify the second input/output image which is not correlated with the input of the robot, and can correlate the input of the robot with the first input/output image. As a result, it is possible to easily designate the input/output relationships between the robot and the peripheral device.

Application Example 7

In the above-described control device, it is possible to employ an aspect in which the display control unit is capable of displaying a sequence edit screen which is a sequence edit screen on which an operation sequence of the robot can be edited by selecting images representing one or more operations among images representing a plurality of operations and arranging the images on a screen, and on which properties of robot input/output of the first input/output image displayed on the input/output edit screen and device input/output of the second input/output image displayed on the input/output edit screen can be set, on the display unit.

According to the aspect, it is possible to set the properties of each input/output on the sequence edit screen after designating the input/output relationship in the collaboration of the peripheral device that operates together with the robot and the robot on the input/output edit screen.

Application Example 8

In the above-described control device, it is possible to employ an aspect in which the display control unit is capable of displaying an input/output edit screen on which it is possible to designate whether or not processing to be executed in association with the output in the robot and processing to be executed in association with the input in the peripheral device are synchronized with each other, in the association of the one or more first input/output images and the one or more second input/output images, on the display unit as the input/output edit screen.

According to the aspect, it is possible to easily create a sequence of the robot and the peripheral device followed by the synchronous processing and the asynchronous processing.

Application Example 9

In the above-described control device, it is possible to employ an aspect in which, in a case of performing a designation such that the processing to be executed in association with the output in the robot and the processing to be executed in association with the input in the peripheral device are synchronized with each other, processing for setting a first variable to a predetermined first value different from an initial value in a case where a state where the processing to be executed in association with the output can be executed is achieved and for executing the processing to be executed in association with the output in a case where a second variable becomes a second value waiting until the second variable different from the first variable becomes the predetermined second value different from an initial value in the robot, and processing for setting the second variable to the second value and for executing the processing to be executed in association with the input in a case where the first variable becomes the first value waiting until the first variable becomes the first value in the peripheral device, are designated as a sequence to be executed by the operation control unit.

According to the aspect, it is possible to realize the synchronous processing designated on the input/output edit screen with a simple mechanism.

Application Example 10

In the above-described control device, it is possible to employ an aspect in which the display control unit is capable of displaying an input/output edit screen on which it is possible to designate whether processing to be executed in association with the output in the robot and processing to be executed in association with the input in the peripheral device are performed as sequential processing without synchronization or as batch processing without synchronization, in the association of the one or more first input/output images and the one or more second input/output images, on the display unit as the input/output edit screen.

According to the aspect, it is possible to easily create a sequence of the robot and the peripheral device followed by the asynchronous sequential processing and the asynchronous batch processing.

Application Example 11

In the above-described control device, it is possible to employ an aspect in which, in a case of performing a designation such that the processing to be executed in association with the output in the robot and the processing to be executed in association with the input in the peripheral device are not synchronized with each other and a designation of the sequential processing, processing for changing a third variable only by a predetermined change amount from an initial value in a case where the processing to be executed in association with the output is executed in the robot, and processing for changing the third variable in a direction opposite to the change only by the change amount and for executing the processing to be executed in association with the input in a case where the third variable becomes a value different from the initial value waiting until the third variable becomes a value different from the initial value in the peripheral device, are designated as a sequence to be executed by the operation control unit.

According to the aspect, it is possible to realize the asynchronous sequential processing designated on the input/output edit screen with a simple mechanism. As a result, the processing is performed on the input side only as much as the number of times that corresponds to the number of times the condition is satisfied on the output side with a simple mechanism.

Application Example 12

In the above-described control device, it is possible to employ an aspect in which, in a case of performing a designation such that the processing to be executed in association with the output in the robot and the processing to be executed in association with the input in the peripheral device are not synchronized with each other and a designation of the batch processing, processing for changing a third variable only by a predetermined change amount from an initial value in a case where the processing to be executed in association with the output is executed in the robot, and processing for setting the third variable to the initial value and for executing the processing to be executed in association with the input in a case where the third variable becomes a value different from the initial value waiting until the third variable becomes a value different from the initial value in the peripheral device, are designated as a sequence to be executed by the operation control unit.

According to the aspect, it is possible to realize the asynchronous batch processing designated on the input/output edit screen with a simple mechanism. As a result, the processing is performed on the input side one time regardless of the number of times the condition is satisfied, triggered by the fact that the condition is satisfied on the output side with a simple mechanism.

Application Example 13

The technology disclosed in the specification can also be an aspect of a robot controlled by the above-described control device.

Application Example 14

The technology disclosed in the specification can also be an aspect of a robot system including the above-described control device and a robot controlled by the control device.

(2) Still Another Aspect 2

Application Example 1

A control device for controlling a robot is provided. The control device includes: a first image that represents one robot and is followed by one or more first input/output images that respectively represent a robot input/output which is an input/output of the robot; a second image that represent one peripheral device operating together with the robot and is followed by one or more second input/output images that respectively represent a device input/output which is an input/output of the peripheral device; a display control unit that is capable of displaying an input/output edit screen that is capable of designating an input/output relationship in which an output of one of the robot and the peripheral device is an input of the other one by associating a first input/output image selected among the one or more first input/output images with a second input/output image selected among the one or more second input/output images, on a display unit; and an operation control unit that controls the robot based on the input/output relationship edited via the input/output edit screen.

Application Example 2

In the above-described control device, it is possible to employ an aspect in which the display control unit is capable of displaying an input/output edit screen on which the first input/output image can be added to the first image and the second input/output image can be added to the second image, on the display unit as the input/output edit screen.

Application Example 3

In the above-described control device, it is possible to employ an aspect in which the display control unit is capable of displaying the input/output edit screen on which a first input/output image that is a first input/output image representing an input of the robot and is correlated with the second input/output image representing an output of the peripheral device, is an image different from a first input/output image that is the first input/output image representing the input of the robot and is not correlated with the second input/output image representing the output of the peripheral device, among the one or more first input/output images, on the display unit as the input/output edit screen.

Application Example 4

In the above-described control device, it is possible to employ an aspect in which the display control unit is capable of displaying the input/output edit screen on which a second input/output image that is a second input/output image representing the input of the peripheral device and is correlated with the first input/output image representing the output of the robot, is an image different from a second input/output image that is the second input/output image representing the input of the peripheral device and is not correlated with the first input/output image representing the output of the robot, among the one or more second input/output images, on the display unit as the input/output edit screen.

Application Example 5

In the above-described control device, it is possible to employ an aspect in which the display control unit is capable of displaying the input/output edit screen on which a first input/output image that is a first input/output image representing the output of the robot and is correlated with the second input/output image representing the input of the peripheral device, is an image different from a first input/output image that is the first input/output image representing the output of the robot and is not correlated with the second input/output image representing the input of the peripheral device, among the one or more first input/output images, on the display unit as the input/output edit screen.

Application Example 6

In the above-described control device, it is possible to employ an aspect in which the display control unit is capable of displaying the input/output edit screen on which a second input/output image that is a second input/output image representing an output of the peripheral device and is correlated with the first input/output image representing an input of the robot, is a image different from a second input/output image that is the second input/output image representing the output of the peripheral device and is not correlated with the first input/output image representing the input of the robot, among the one or more second input/output images, on the display unit as the input/output edit screen.

Application Example 7

In the above-described control device, it is possible to further employ an aspect in which the display control unit is capable of displaying a sequence edit screen which is a sequence edit screen on which an operation sequence of the robot can be edited by selecting images representing one or more operations among images representing a plurality of operations and arranging the images on a screen, and on which properties of robot input/output of the first input/output image displayed on the input/output edit screen and device input/output of the second input/output image displayed on the input/output edit screen can be set, on the display unit.

Application Example 8

In the above-described control device, it is possible to employ an aspect in which the display control unit is capable of displaying an input/output edit screen on which it is possible to designate whether or not processing to be executed in association with the output for designating the input/output relationship in the one and processing to be executed in association with the input for designating the input/output relationship in the other one are synchronized with each other, in the association of the one or more first input/output images and the one or more second input/output images, as the input/output edit screen.

Application Example 9

In the above-described control device, it is possible to employ an aspect in which, in a case of performing a designation such that the processing to be executed in association with the output for designating the input/output relationship in the one and the processing to be executed in association with the input for designating the input/output relationship in the other one are synchronized with each other, processing for setting a first variable to a predetermined first value different from an initial value in a case where a state where the processing to be executed in association with the output can be executed is achieved and for executing the processing to be executed in association with the output in a case where a second variable becomes a second value waiting until the second variable different from the first variable becomes the predetermined second value different from an initial value in the one, and processing for setting the second variable to the second value and for executing the processing to be executed in association with the input in a case where the first variable becomes the first value waiting until the first variable becomes the first value in the other one, are designated as a sequence to be executed by the operation control unit.

Application Example 10

In the above-described control device, it is possible to employ an aspect in which the display control unit is capable of displaying an input/output edit screen on which it is possible to designate whether processing to be executed in association with the output for designating the input/output relationship in the one and processing to be executed in association with the input for designating the input/output relationship in the other one are performed as sequential processing without synchronization or as batch processing without synchronization, in the association of the one or more first input/output images and the one or more second input/output images, on the display unit as the input/output edit screen.

Application Example 11

In the above-described control device, it is possible to employ an aspect in which, in a case of performing a designation such that the processing to be executed in association with the output for designating the input/output relationship in the one and the processing to be executed in association with the input for designating the input/output relationship in the other one are not synchronized with each other and a designation of the sequential processing, processing for changing a third variable only by a predetermined change amount from an initial value in a case where the processing to be executed in association with the output is executed in the one, and processing for changing the third variable in a direction opposite to the change only by the change amount and for executing the processing to be executed in association with the input in a case where the third variable becomes a value different from the initial value waiting until the third variable becomes a value different from the initial value in the other one, are designated as a sequence to be executed by the operation control unit.

Application Example 12

In the above-described control device, it is possible to employ an aspect in which, in a case of performing a designation such that the processing to be executed in association with the output for designating the input/output relationship in the one and the processing to be executed in association with the input for designating the input/output relationship in the other one are not synchronized with each other and a designation of the batch processing, processing for changing a third variable only by a predetermined change amount from an initial value in a case where the processing to be executed in association with the output is executed in the one, and processing for setting the third variable to the initial value and for executing the processing to be executed in association with the input in a case where the third variable becomes a value different from the initial value waiting until the third variable becomes a value different from the initial value in the other one, are designated as a sequence to be executed by the operation control unit.

(3) All of the plurality of configuration elements included in each of the aspects of the above-described invention are not indispensable, and in order to solve a part or all of the above-described problems, or to achieve a part or all of the effects described in the specification, it is possible to change, delete, and replace a part of the configuration element among the plurality of configuration elements, with other new configuration elements, and to delete a part of the restricted contents, in an appropriate manner. In addition, in order to solve a part or all of the above-described problems, or in order to achieve a part or all of the effects described in the specification, by combining a part or all of the technical features included in one aspect of the above-described invention with a part or all of the technical features included in another aspect of the above-described invention, it is also possible to make one independent aspect of the invention.

The entire disclosure of Japanese Patent Application No. 2018-066731, filed Mar. 30, 2018 is expressly incorporated by reference herein.

What is claimed is:

1. A control device comprising:
a processor that is configured to execute computer-executable instructions so as to control a robot,
wherein the processor is configured to:
display a first image that represents the robot, one or more first input/output images that respectively represent a robot input/output of the robot, a second image that represents a peripheral device, one or more second input/output images that respectively represent a device input/output of the peripheral device, and an input/output edit screen that accepts an input/output relationship in which an output of the robot is an input of the peripheral device by associating a first input/output image selected among the one or more first input/output images with a second input/output image selected among the one or more second input/output images, on a display; and
control the robot based on the input/output relationship,
wherein each of the output of the robot and the input of the peripheral device causes the robot and the peripheral device to perform a synchronous operation or an asynchronous operation that is synchronously or asynchronously performed between the robot and the peripheral device, respectively,
when the first input/output image corresponds to the synchronous operation of the robot, the second input/output image corresponds to only the synchronous operation of the peripheral device, and
when the first input/output image corresponds to the asynchronous operation of the robot, the second input/output image corresponds to only the asynchronous operation of the peripheral device.

2. The control device according to claim 1,
wherein the processor is configured to display the input/output edit screen, on which the first input/output image is configured to be added to the first image and the second input/output image is configured to be added to the second image, on the display.

3. The control device according to claim 1,
wherein the processor is configured to display the input/output edit screen, on which one of the one or more first input/output images representing an input of the robot and is correlated with one of the one or more second input/output images representing an output of the peripheral device is different from another of the one or more first input/output images representing the input of the robot and is not correlated with another of the one or more second input/output images representing the output of the peripheral device.

4. The control device according to claim 1,
wherein the processor is configured to display the input/output edit screen, on which one of the one or more second input/output images representing the input of the peripheral device and is correlated with one of the one or more first input/output images representing the output of the robot is different from another of the one or more second input/output images representing the input of the peripheral device and is not correlated with another of the one or more first input/output images representing the output of the robot, on the display.

5. The control device according to claim 1,
wherein the processor is configured to display the input/output edit screen, on which one of the one or more first input/output images representing the output of the robot and is correlated with one of the one or more second input/output images representing the input of the peripheral device is different from another of the one of the one or more first input/output images representing the output of the robot and is not correlated with another of the one or more second input/output images representing the input of the peripheral device, on the display.

6. The control device according to claim 1,
wherein the processor is configured to display the input/output edit screen, on which one of the one or more second input/output images representing an output of the peripheral device and is correlated with one of the one or more first input/output images representing an input of the robot is different from another of the one or more second input/output images representing the output of the peripheral device and is not correlated with another of the one or more first input/output images representing the input of the robot, on the display.

7. The control device according to claim 1,
wherein the processor is configured to display a sequence edit screen on which an operation sequence of the robot is conjured to be edited by selecting images representing one or more operations among images representing a plurality of operations and arranging the images on the sequence edit screen and on which properties of the robot input/output of the first input/output image displayed on the input/output edit screen and the device input/output of the second input/output image displayed on the input/output edit screen are configured to be set, on the display.

8. The control device according to claim 1,
wherein the processor is configured to display the input/output edit screen, on which one of the synchronous operation and the asynchronous operation is configured to be designated, on the display.

9. The control device according to claim 1,
wherein the asynchronous operation is configured with sequential processing and batch processing, and
the processor is configured to display the input/output edit screen, one of the sequential processing and the batch processing is configured to be designated, on the display.

10. A robot comprising:
an arm configured to move, and
a processor that is configured to execute computer-executable instructions so as to control the robot,
wherein the processor is configured to:
display a first image that represents the robot one or more first input/output images that respectively represent a robot input/output of the robot, a second image that represents a peripheral device, one or more second input/output images that respectively represent a device input/output of the peripheral device, and an input/output edit screen that accepts an input/output relationship in which an output of the robot is an input of the peripheral device by associating a first input/output image selected among the one or more first input/output images with a second input/output image selected among the one or more second input/output images, on a display; and
control the robot based on the input/output relationship,
wherein each of the output of the robot and the input of the peripheral device causes the robot and the periaheral device to perform a synchronous operation or an asynchronous operation that is synchronously or asynchronously performed between the robot and the peripheral device respectively,
when the first input/output image corresponds to the synchronous operation of the robot, the second input/output image corresponds to only the synchronous operation of the peripheral device, and
when the first input/output image corresponds to the asynchronous operation of the robot, the second input/output image corresponds to only the asynchronous operation of the peripheral device.

11. A robot system comprising:
a robot; and
a control device that comprises a processor, the processor being configured to execute computer-executable instructions so as to control the robot;
wherein the processor is configured to:
display a first image that represents the robot, one or more first input/output images that respectively represent a robot input/output of the robot, a second image that represents a peripheral device, one or more second input/output images that respectively represent a device input/output of the peripheral device, and an input/output edit screen that accepts an input/output relationship in which an output of the robot is an input of the peripheral device by associating a first input/output image selected among the one or more first input/output images with a second input/output image selected among the one or more second input/output images, on a display; and
control the robot based on the input/output relationship,
wherein each of the output of the robot and the input of the peripheral device causes the robot and the peripheral device to perform a synchronous operation or an asynchronous operation that is synchronously or asynchronously performed between the robot and the peripheral device, respectively,
when the first input/output image corresponds to the synchronous operation of the robot the second input/output image corresponds to only the synchronous operation of the peripheral device, and
when the first input/output image corresponds to the asynchronous operation of the robot, the second input/output image corresponds to only the asynchronous operation of the peripheral device.

12. The robot system according to claim 11,
wherein the processor is configured to display the input/output edit screen, on which the first input/output image is configured to be added to the first image and the second input/output image is configured to be added to the second image, on the display.

13. The robot system according to claim 11,
wherein the processor is configured to display the input/output edit screen, on which one of the one or more first input/output images representing an input of the robot and is correlated with one of the one or more second input/output images representing an output of the peripheral device is different from another of the one or more first input/output images representing the input of the robot and is not correlated with another of the one or more second input/output images representing the output of the peripheral device on the display.

14. The robot system according to claim 11, wherein the processor is configured to display the input/output edit screen, on which one of the one or more second input/output images representing the input of the peripheral device and is correlated with one of the one or more first input/output images representing the output of the robot is different from another of the one or more second input/output images representing the input of the peripheral device and is not correlated with another of the one or more first input/output images representing the output of the robot, on the display.

15. The robot system according to claim 11, wherein the processor is configured to display the input/output edit screen, on which one of the one or more first input/output images representing the output of the robot and is correlated with one of the one or more second input/output images representing the input of the peripheral device is different from another of the one of the one or more first input/output images representing the output of the robot and is not correlated with another of the one or more second input/output images representing the input of the peripheral device, on the display.

16. The robot system according to claim 11, wherein the processor is configured to display the input/output edit screen, on which one of the one or more second input/output images representing an output of the peripheral device and is correlated with one of the one or more first input/output images representing an input of the robot is different from another of the one or more second input/output images representing the output of the peripheral device and is not correlated with another of the one or more first input/output images representing the input of the robot, on the display.

17. The robot system according to claim 11, wherein the processor is configured to display a sequence edit screen, on which an operation sequence of the robot is configured to be edited by selecting images representing one or more operations among images representing a plurality of operations and arranging the images on the sequence edit screen and on which properties of the robot input/output of the first input/output image displayed on the input/output edit screen and the device input/output of the second input/output image displayed on the input/output edit screen are configured to be set, on the display.

18. The robot system according to claim 11, wherein the processor is configured to display the input/output edit screen, on which one of the synchronous operation and the asynchronous operation is configured to be designated, on the display.

19. The robot system according to claim 11, wherein the asynchronous operation is configured with sequential processing and batch processing, and the processor is configured to display the input/output edit screen, on which one of the sequential processing and the batch processing is configured to be designated, on the display.

* * * * *